US012501470B2

(12) United States Patent
Lee et al.

(10) Patent No.: US 12,501,470 B2
(45) Date of Patent: Dec. 16, 2025

(54) METHOD AND DEVICE FOR SELF-INTERFERENCE CANCELLATION IN WIRELESS COMMUNICATION SYSTEM

(71) Applicant: Samsung Electronics Co., Ltd., Gyeonggi-do (KR)

(72) Inventors: Kwonjong Lee, Gyeonggi-do (KR); Youngjoon Kim, Gyeonggi-do (KR); Hyojin Lee, Gyeonggi-do (KR); Juho Lee, Gyeonggi-do (KR); Sunghyun Choi, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 712 days.

(21) Appl. No.: 17/727,113

(22) Filed: Apr. 22, 2022

(65) Prior Publication Data

US 2022/0353880 A1 Nov. 3, 2022

(30) Foreign Application Priority Data

Apr. 23, 2021 (KR) .......................... 10-2021-0053044

(51) Int. Cl.
*H04L 5/14* (2006.01)
*G10L 19/00* (2013.01)
(Continued)

(52) U.S. Cl.
CPC ..... *H04W 72/542* (2023.01); *H04W 72/1273* (2013.01)

(58) Field of Classification Search
CPC ............... H04L 5/0062; H04L 25/0328; H04L 25/03286; H04L 25/03292; H04L 5/0044;
(Continued)

(56) References Cited

U.S. PATENT DOCUMENTS 7,991,621 B2 * 8/2011 Oh .......................... G10L 19/22
381/11
10,985,898 B2 * 4/2021 Kim .................... H04W 52/146
(Continued)

FOREIGN PATENT DOCUMENTS

KR 1020180009866 1/2018
KR 10-2021-0012303 2/2021

OTHER PUBLICATIONS

International Search Report dated Jul. 22, 2022 issued in counterpart application No. PCT/KR2022/005674, 7 pages.
(Continued)

*Primary Examiner* — Sithu Ko
*Assistant Examiner* — Vanneilian Lalchinthang
(74) *Attorney, Agent, or Firm* — The Farrell Law Firm, P.C.

(57) ABSTRACT

The disclosure relates to a 5G or 6G communication system for supporting a higher data transmission rate. The disclosure provides a method performed by a user equipment (UE), the method comprises receiving, from a base station, data in a slot including a first signal transmission section and a second signal transmission section, identifying whether the received data includes a first data in the first signal transmission section for self-interference channel estimation of the base station, in case that the received data includes a first data in the first signal transmission section, decoding the first data using a first transmission scheme for the first signal transmission section, and in case that the data includes a second data in the second signal transmission section, decoding the second data using a second transmission scheme for the second signal transmission section.

18 Claims, 37 Drawing Sheets

(51) Int. Cl.
*H04L 27/26* (2006.01)
*H04W 72/04* (2023.01)
*H04W 72/1273* (2023.01)
*H04W 72/542* (2023.01)

(58) Field of Classification Search
CPC ... H04L 5/0042; H04L 1/0023; H04L 1/0068; H04W 72/542; H04W 72/1231; H04W 52/243; H04W 72/1289; H04W 72/127; H04B 7/04013; H04B 7/0413; H04B 7/0617; H04B 7/0682; H04B 7/0691; H04B 7/10; G10L 19/22
USPC .......................................................... 370/335
See application file for complete search history.

(56) References Cited

U.S. PATENT DOCUMENTS

| | | | |
|---|---|---|---|
| 11,791,861 B2* | 10/2023 | Menkhoff | H04B 1/525 |
| | | | 455/552.1 |
| 11,937,189 B2* | 3/2024 | Haghighat | H04W 52/146 |
| 2014/0254455 A1* | 9/2014 | Nikopour | H04W 72/1273 |
| | | | 370/312 |
| 2016/0366109 A1* | 12/2016 | Lablans | G06Q 20/34 |
| 2017/0180160 A1* | 6/2017 | Moorti | H04L 27/2651 |
| 2018/0006796 A1* | 1/2018 | Hui | H04B 7/15557 |
| 2018/0184409 A1* | 6/2018 | Min | H04W 72/12 |
| 2019/0115999 A1* | 4/2019 | Sundman | H04L 1/0003 |
| 2020/0106545 A1* | 4/2020 | Askar | H04W 72/541 |
| 2020/0213072 A1* | 7/2020 | Baek | H04W 52/367 |
| 2020/0267747 A1* | 8/2020 | Nammi | H04W 72/23 |
| 2021/0028814 A1 | 1/2021 | Lee et al. | |
| 2022/0014226 A1* | 1/2022 | Kim | H01P 5/19 |

OTHER PUBLICATIONS

Korean Office Action dated May 7, 2025 issued in counterpart application No. 10-2021-0053044, 15 pages.

* cited by examiner

3510

3520

3530

3540

3550

3560

3570

3580

METHOD AND DEVICE FOR SELF-INTERFERENCE CANCELLATION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2021-0053044, filed on Apr. 23, 2021, in the Korean Intellectual Property Office, the entire disclosure of which is incorporated herein by reference.

BACKGROUND

1. Field

The disclosure relates generally to a configuration method and device supporting a full duplex operation in a wireless communication system.

2. Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

The present disclosure has been made to address the above-mentioned problems and disadvantages, and to provide at least the advantages described below.

According to an aspect of the disclosure, a method performed by a UE may comprise receiving, from a base station, data in a slot including a first signal transmission section and a second signal transmission section, identifying whether the received data includes a first data in the first signal transmission section for self-interference channel estimation of the base station, in case that the received data includes a first data in the first signal transmission section, decoding the first data using a first transmission scheme for the first signal transmission section, and in case that the data includes a second data in the second signal transmission section, decoding the second data using a second transmission scheme for the second signal transmission section.

According to an aspect of the disclosure, a method performed by a base station may comprises transmitting, to a user equipment (UE), configuration information including information on a first signal transmission section for self-interference channel estimation of a base station, identifying data to be transmitted to the UE in a slot including a first signal transmission section and a second signal transmission section, in case that the data includes a first data in the first signal transmission section, transmitting the first data using a first transmission scheme for the first signal transmission section, and in case that the data includes a second data in the second signal transmission section, transmitting the second data using a second transmission scheme for a second signal transmission section.

According to an aspect of the disclosure, a base station in a wireless communication system may comprise a transceiver, and a processor configured to transmit, through the transceiver to a user equipment (UE), configuration information including information on a first signal transmission section for self-interference channel estimation of the base station, identify, through the transceiver, data to be transmitted to the UE in a slot including a first signal transmission section and a second signal transmission section, in case that the data includes a first data in the first signal transmission section, transmit, through the transceiver, the first data using a first transmission scheme for the first signal transmission section, and in case that the data includes a second data in the second signal transmission section, transmit, through the transceiver, the second data using a second transmission scheme for a second signal transmission section.

According to an aspect of the disclosure, a UE in a wireless communication system may comprise a transceiver, and a processor configured to receive, through the transceiver from a base station, data in a slot including a first signal transmission section and a second signal transmission section, identify whether the received data includes a first data in the first signal transmission section for self-interference channel estimation of the base station, in case that the received data includes a first data in the first signal transmission section, decode the first data using a first transmission scheme for the first signal transmission section, and in case that the data includes a second data in the second signal transmission section, decode the second data using a second transmission scheme for a second signal transmission section.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
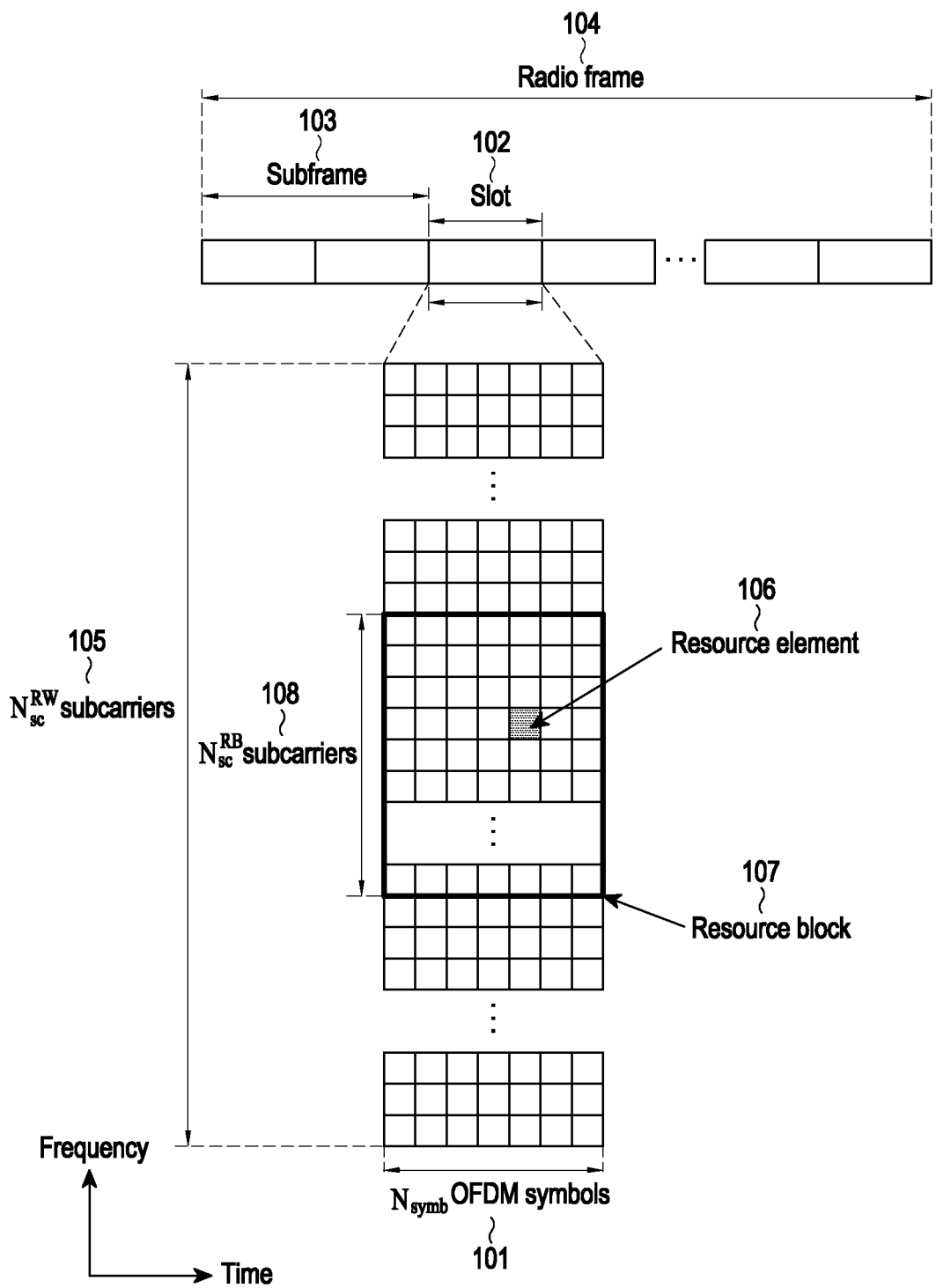
FIG. 1 is a view illustrating a basic structure of a time-frequency domain in long term evolution (LTE), according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

The disclosure provides a method and device for effectively canceling self-interference in a wireless communication system.

The disclosure provides a resource allocation method and device for self-interference cancellation in a wireless communication system.

The disclosure provides an antenna configuration for full-duplex or half-duplex communication in a wireless communication system supporting MIMO and a communication method and device using the same.

According to the disclosure, it is possible to efficiently cancel self-interference by reducing the complexity of self-interference channel estimation.

In describing embodiments, the description of technologies that are known in the art and are not directly related to the disclosure is omitted.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided to inform one of ordinary skilled in the art of the category of the disclosure. The disclosure is defined by the appended claims.

The blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate a means for performing the functions described in connection with a block(s) of each flowchart. Since the computer program instructions may be stored in a computer-available or computer-readable memory that may be oriented to a computer or other programmable data processing device to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing device. Also, the computer or other programmable data processing device may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" may include a software element or a hardware element such as a field-programmable gate array (FPGA) or an application specific integrated circuit (ASIC). A unit plays a certain role. However, the term "unit" is not limited as meaning a software or hardware element. A "unit" may be configured in a storage medium that may be addressed or may be configured to reproduce one or more processors. Accordingly, as an example, a "unit" includes elements, such as software elements, object-oriented software elements, class elements, task elements, processes, functions, attributes, procedures, subroutines, segments of program codes, drivers, firmware, microcodes, circuits, data, databases, data architectures, tables, arrays, and variables. A function provided in an element or a "unit" may be combined with additional elements or may be split into sub elements or sub units. Further, an element or a "unit" may be implemented to reproduce one or more CPUs in a device or a security multimedia card. According to embodiments, a " . . . unit" may include one or more processors.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

Hereinafter, the operational principle of the disclosure is described below with reference to the accompanying drawings. The terms as used herein are defined considering the functions in the disclosure and may be replaced with other terms according to the intention or practice of the user or operator. Therefore, the terms should be defined based on the overall disclosure. Hereinafter, the base station may be an entity allocating resource to terminal and may be at least one of a gNode B, eNode B, Node B, base station, wireless access unit, base station controller, or node over network. The terminal may include a UE, mobile station (MS), cellular phone, smartphone, computer, or multimedia system capable of performing communication functions. The disclosure is not limited to the above examples. Described below is technology for receiving broadcast information from a base station by a UE in a wireless communication system. Disclosed are a communication technique for merging, with an Internet of things (IoT) technology, a 5G communication system for supporting a data transmission rate higher than that of a 4G system; and a system therefor. The disclosure can be applied for intelligent services based on 5G communication technology and IoT related technology (for example, smart homes, smart buildings, smart cities, smart cars or connected cars, healthcare, digital education, retail businesses, and security and safety related services).

Hereinafter, terms denoting broadcast information, terms denoting control information, communication coverage-related terms, terms denoting state variations (e.g., events), terms denoting network entities, terms denoting messages, or terms denoting device components are provided solely for illustration purposes. The disclosure is not limited to the terms, and other terms equivalent in technical concept may also be used.

For ease of description, hereinafter, some of the terms and names defined in the 3rd generation partnership project LTE (3GPP LTE) standards may be used. However, the disclosure is not limited by such terms and names and may be likewise applicable to systems conforming to other standards.

Wireless communication systems evolve beyond voice-centered services to broadband wireless communication systems to provide high data rate and high-quality packet data services, such as 3GPP high speed packet access (HSPA), LTE, evolved universal terrestrial radio access (E-UTRA)), LTE-advanced (LTE-A), LTE-pro, 3GPP2 high rate packet data (HRPD), ultra-mobile broadband (UMB), and Institute of Electrical and Electronics Engineers (IEEE) 802.16e communication standards.

As a representative example of such a broadband wireless communication system, an LTE system adopts OFDM for downlink and single carrier frequency division multiple access (SC-FDMA) for uplink. An uplink includes a wireless link where the UE (or MS) transmits data or control signals to the base station, and downlink (or download) includes a wireless link where the base station transmits data or control signals to the UE. Such a multiple access scheme allocates and operates time-frequency resources carrying data or control information per user not to overlap, i.e., to maintain orthogonality, to thereby differentiate each user's data or control information.

Post-LTE communication systems, e.g., 5G communication systems, are required to freely reflect various needs of users and service providers and thus to support services that meet various requirements. Services considered for 5G communication systems may include increased mobile broadband (eMBB), massive machine type communication (MMTC), and ultra-reliability low latency communication (URLLC).

According to an embodiment, eMBB aims to provide a further enhanced data transmission rate as compared with LTE, LTE-A, or LTE-pro. For example, eMBB for 5G communication systems needs to provide a peak data rate of 20 gigabits per second (Gbps) on download and a peak data rate of 10 Gbps on uplink in terms of one base station. The 5G communication system is also required to provide the increased user perceived data rate of the UE. To meet such requirements, various transmit/receive techniques, as well as MIMO, need to further be enhanced. The data transmission rate required for 5G communication systems may be met by using a broader frequency bandwidth than 20 megahertz (Mhz) in a frequency band ranging 3 gigahertz (Ghz) to 6 Ghz or a frequency band of 6 Ghz or more instead of the 2 Ghz band currently adopted in LTE.

mMTC is also considered to support application services, such as IoT in the 5G communication system. To efficiently provide IoT, mMTC may be required to support massive UEs in the cell, enhance the coverage of the UE and the battery time, and reduce UE costs. IoT terminals are attached to various sensors or devices to provide communication functionality, and thus, it needs to support a number of UEs in each cell (e.g., 1,000,000 UEs/kilometer $(km)^2$). Since mMTC-supportive UEs, by the nature of service, are highly likely to be located in shadow areas not covered by the cell, such as the underground of a building, much broader coverage may be required, as compared with other services that the 5G communication system provides. mMTC-supportive UEs, due to the need for being low cost and difficulty in frequently exchanging batteries, may be required to have a very long battery life.

The URLLC, as a cellular-based wireless communication service used for a specific purpose (mission-critical), may be a service used for remote control for robots or machinery, industrial automation, unmanned aerial vehicles, remote health care, and emergency alerts, and may be required to provide communication that provides ultra-low latency and ultra-high reliability. For example, URLLC-supportive services need to meet an air interface latency of less than 0.5 milliseconds simultaneously with a packet error rate of $10^{-5}$ or less. Thus, for URLLC-supportive services, the 5G communication system may be required to be designed to provide a shorter transmit time interval (TTI) than those for other services and allocate a broad resource in the frequency band. However, the aforementioned mMTC, URLLC, and eMBB are merely examples of different service types, and the service types to which the disclosure is applied are not limited to the above-described examples.

Services considered in the 5G communication system described above should be merged together based on one framework. In other words, for efficient resource management and control, it is preferable that the services are integrated into a single system and controlled and transmitted, rather than being independently operated.

Although LTE, LTE-A, LTE Pro, or new radio (NR) systems are described as examples in connection with embodiments, embodiments may also apply to other communication systems with a similar technical background or channel form. Further, embodiments may be modified in such a range as not to significantly depart from the scope of the disclosure under the determination by one of ordinary skill in the art and such modifications may be applicable to other communication systems.

The frame architecture for the LTE and LTE-A system is described below with reference to the drawings.

FIG. 1 is a view illustrating a basic structure of a time-frequency domain in LTE, according to an embodiment. The basic structure of the time-frequency domain may be a radio resource domain where the data or control channel is transmitted in the LTE system.

Referring to FIG. 1, the horizontal axis refers to the time domain, and the vertical axis refers to the frequency domain. In the time domain, the minimum transmission unit is OFDM symbols 101, and $N_{symb}$ OFDM symbols 101 come together to configure one slot 102, and two slots come together to configure one subframe 103. The length of the slot 102 is 0.5 milliseconds (ms), and the length of the subframe 103 is 1.0 ms. The radio frame 104 is a time domain unit consisting of ten subframes 103. In the frequency domain, the minimum transmission unit is subcarrier 105, and the bandwidth of the overall system transmission band consists of a total of $N_{BW}$ subcarriers 105.

The basic resource unit in the time-frequency domain is resource element (RE) 106 which may be represented with an OFDM symbol index and a subcarrier index. RB or physical RB (PRB) 107 is defined with Nya, contiguous OFDM symbols 101 in the time domain and $N_{RB}$ contiguous subcarriers 108 in the frequency domain. Accordingly, one RB 107 includes $N_{symb} \times N_{RB}$ REs 106. Generally, the minimum transmission unit of data is the RB. Generally, in the LTE system, $N_{symb}=7$, $N_{RB}=12$, and, $N_{BW}$ and $N_{RB}$ are proportional to the bandwidth of system transmission band.

In the LTE system, the scheduling information on downlink data or uplink data is transferred through downlink control information (DCI) from the base station to the terminal. DCI may include information about whether the scheduling information is for uplink data or downlink data, whether the DCI is compact DCI of which the size of control information is small, whether spatial multiplexing using multiple antennas applies, or whether the DCI is for power control. Further, a DCI format defined according to the above-described information may be applied and operated. For example, DCI format 1, which is the scheduling control information about download data, is configured to include the following pieces of control information.

Resource allocation type 0/1 flag: notifies whether resource allocation type is type 0 or type 1. Type 0 allocates resources in RB group (RBG) units by applying bitmap scheme. In the LTE system, the basic unit of scheduling is RB represented in time and frequency domain resources, and RBG consists of a plurality of RBs and becomes the basic unit of scheduling in the type 0 scheme. Type 1 allows for allocation of a particular RB in the RBG.

RB assignment: indicates RB allocated for data transmission. Resource represented according to system bandwidth and resource allocation scheme is determined.

Modulation and coding scheme (MCS): indicates the size of transport block that is data to be transmitted and modulation scheme used for data transmission.

Hybrid automatic repeat request (HARQ) process number: indicates process number of HARQ.

New data indicator: indicates whether HARQ initial transmission or re-transmission.

Redundancy version: indicates redundancy version of HARQ.

Transmit power control (TPC) command for physical uplink control channel (PUCCH): indicates TPC command for uplink control channel PUCCH.

The DCI undergoes channel coding and modulation and is transmitted through the downlink physical control channel (e.g., a physical downlink control channel (PDCCH)).

The cyclic redundancy check (CRC) is added to the DCI message payload, and the CRC is scrambled with the radio network temporary identifier (RNTI) that is the identity (ID) of the UE. Different RNTIs are used for the purposes of the DCI message, e.g., UE-specific data transmission, power control command, or random access response (RAR). The RNTI is not explicitly transmitted, but the RNTI is included in the CRC calculation process and transmitted. Upon receiving the DCI message transmitted on the PDCCH, the UE identifies the CRC using the allocated RNTI, and when the CRC is identified to be correct, the UE may be aware that the message has been transmitted thereto.

Figure 2:
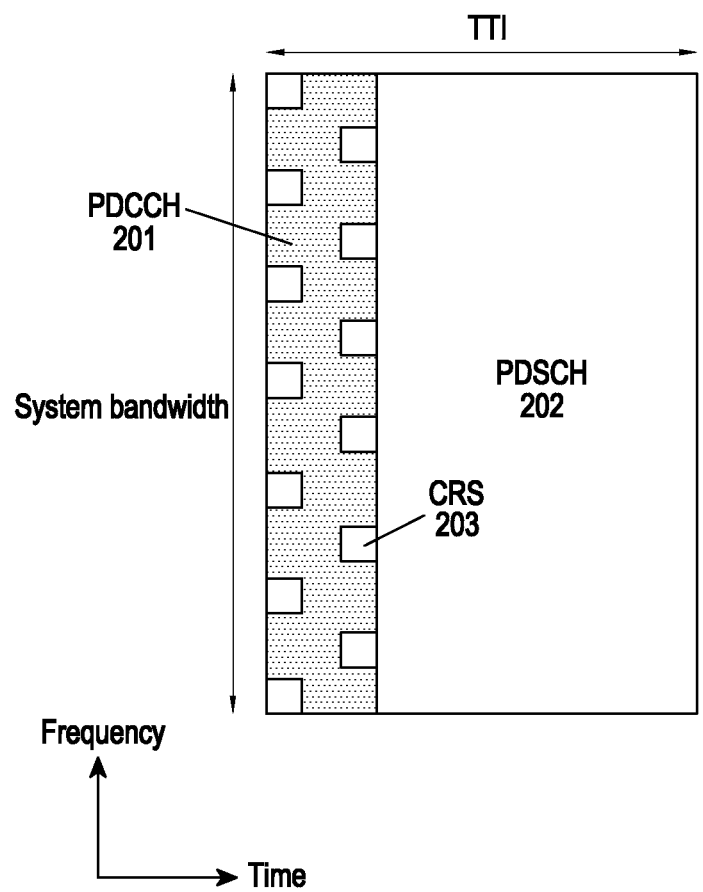
FIG. 2 illustrates a downlink control channel of LTE, according to an embodiment.

FIG. 2 illustrates a downlink control channel of LTE (e.g., a PDCCH that is a downlink physical channel through which DCI of LTE is transmitted), according to an embodiment.

Referring to FIG. 2, the PDCCH 201 is time-multiplexed with the physical downlink shared channel (PDSCH) 202, which is a data transmission channel, and is transmitted over the overall system bandwidth. The region for the PDCCH 201 is represented with the number of OFDM symbols, and this is indicated to the UE via the control format indicator (CFI) that is transmitted via the physical control format indicator channel (PCFICH).

The PDCCH 201 may be allocated to the OFDM symbols which are positioned in the head of the subframe, allowing the UE to decode the download scheduling allocation as quick as possible. This provides the advantage of being able to reduce the decoding latency for downlink shared channel (DL-SCH), i.e., the overall download transmission latency.

Since one PDCCH carries one DCI message, and multiple UEs may simultaneously be scheduled for the download and uplink, multiple PDCCHs are simultaneously transmitted in each cell. As a reference signal for decoding the PDCCH 201, the cell-specific reference signal (CRS) 203 is used. The CRS 203 is transmitted in each subframe over the entire band, and the scrambling and resource mapping are varied depending on the cell ID. Since the CRS 203 is a reference signal commonly used for all the UEs, UE-specific beamforming cannot be used. Accordingly, the multi-antenna transmission (TX) scheme for LTE PDCCH is limited to open-loop TX diversity. The number of CRS ports is implicitly known to the UE from the decoding of the physical broadcast channel (PBCH).

The resource allocation of the PDCCH 201 is based on the CCE, and one CCE is constituted of nine RE groups (REGs), i.e., a total of 36 REs. The number of CCEs necessary for a particular PDCCH 201 may be 1, 2, 4, or 8, and this differs depending on the channel coding rate of the DCI message payload. As such, different numbers of CCEs are used to implement the link adaptation of the PDCCH 201.

The UE needs to detect a signal while it is unaware of the information about the PDCCH 201. LTE defines the search space that denotes a set of CCEs for blind decoding. The search space consists of a plurality of sets in the aggregation level of each CCE, and this is not explicitly signaled but is implicitly defined via the function and subframe number by the ID of the UE. In each subframe, the UE decodes the PDCCH 201 for all possible resource candidates that may be created from the CCEs in the set search space and processes the information declared by the CRC check to be valid for the UE.

The search space is divided into a UE-specific search space and a common search space. A predetermined group of UEs or all the UEs may investigate the common search space of the PDCCH 201 to receive cell-common control information, e.g., paging message, or dynamic scheduling for system information. For example, scheduling allocation information about DL-SCH for transmitting system information block (SIB)-1 containing cell service provider information may be received by investigating the common search space of the PDCCH 201.

In LTE, the overall PDCCH region is constituted of a CCE set in the logical region, and there is a search space constituted of a set of CCEs. The search space may be divided into a common search space and a UE-specific search space, and the search space for the LTE PDCCH is defined as shown in Table 1.

TABLE 1

The set of PDCCH candidates to monitor are defined in terms of search spaces, where a search space $S_k^{(L)}$ at aggregation level $L \in \{1, 2, 4, 8\}$ is defined by a set of PDCCH candidates. For each serving cell on which PDCCH is monitored, the CCEs corresponding to PDCCH candidate $m$ of the search space $S_k^{(L)}$ are given by $L \{(Y_k + m') \bmod \lfloor N_{CCE,k} / L \rfloor\} + i$ where $Y_k$ is defined below, $i = 0,...,L - 1$. For the common search space $m' = m$. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where $m = 0,...,M^{(L)} - 1$.
$M^{(L)}$ is the number of PDCCH candidates to monitor in the given search space.
Note that the carrier indicator field value is the same as ServCellIndex
For the common search spaces, $Y_k$ is set to 0 for the two aggregation levels $L = 4$ and $L = 8$.
For the UE-specific search space $S_k^{(L)}$ at aggregation level L, the variable $Y_k$ is defined by
$Y_k = (A \cdot Y_{k-1}) \bmod D$
where $Y_{-1} = n_{RNTI} \neq 0$, $A = 39827$, $D = 65537$ and $k = \lfloor n_s/2 \rfloor$, $n_s$ is the slot number within a radio frame. The RNTI value used for $n_{RNTI}$ is defined in subclause 7.1 in downlink and subclause 8 in uplink.

According to the definition of the search space for the PDCCH described above, the UE-specific search space is not explicitly signaled but is implicitly defined via the subframe number and function by the ID of the UE. In other words, the UE-specific search space may be varied depending on the subframe number, meaning that it may be varied depending on times. This addresses the problem that a particular UE among UEs cannot use the search space due to the other UEs (blocking issue).

If a certain UE cannot be scheduled in a subframe because all the CCEs that it investigates are already in use by other UEs scheduled in the same subframe, such an issue may not occur in the next subframe because the search space is varied over time. For example, although the UE-specific search spaces of UE #1 and UE #2 partially overlap each other in a particular subframe, the overlap may be predicted to differ in the next subframe because the UE-specific search space is varied per subframe.

According to the definition of the search space for the PDCCH described above, the common search space is defined as a set of CCEs previously agreed on because a predetermined group of UEs or all the UEs need to receive the PDCCH. In other words, the common search space may not vary depending on the ID of the UE or subframe number. Although the common search space exists for transmission of various system messages, it may also be used to transmit the control information for individual UEs. Thus, the common search space may be used to address the UE's failure to be scheduled due to insufficient available resources in the UE-specific search space.

The search space is a set of candidate control channels constituted of CCEs that the UE needs to attempt to decode on the aggregation level, and since there are several aggregation levels to bundle up one, two, four, or eight CCEs, the UE has a plurality of search spaces. The number of PDCCH candidates that the UE needs to monitor in the search space defined as per the aggregation level in the LTE PDCCH is defined as shown in the following table.

TABLE 2

| | Search space $S_k^{(L)}$ | | Number of |
|---|---|---|---|
| Type | Aggregation level L | Size [in CCEs] | PDCCH Candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Referring to Table 2, the UE-specific search space supports aggregation level $\{1, 2, 4, 8\}$, where it has $\{6, 6, 2, 2\}$ PDCCH candidates, respectively. The common-specific search space supports aggregation level $\{4, 8\}$, where it has $\{4, 2\}$ PDCCH candidates, respectively. The common search space only supports $\{4, 8\}$ aggregation levels for improving the coverage property because the system message is generally required to reach the cell border.

The DCI transmitted in the common search space is defined only for particular DCI formats, e.g., 0/1A/3/3A/1C, which are ones for the power control purpose for the UE group or system message. In the common search space, the DCI formats having spatial multiplexing are not supported. The download DCI format that should be decoded in the UE-specific search space is varied depending on the transmission mode set for the UE. Since the transmission mode is set via radio resource control (RRC) signaling, the exact subframe number as to whether the setting is effective for the UE is not designated. Accordingly, the UE may be operated not to lose communication by always performing decoding on DCI format 1A regardless of the transmission mode.

Described above are conventional methods for transmitting/receiving downlink control channel and DCI in LTE and LTE-A and the search space.

Described below in detail is a downlink control channel in a 5G communication system which is currently under discussion, with reference to the drawings.

Figure 3:
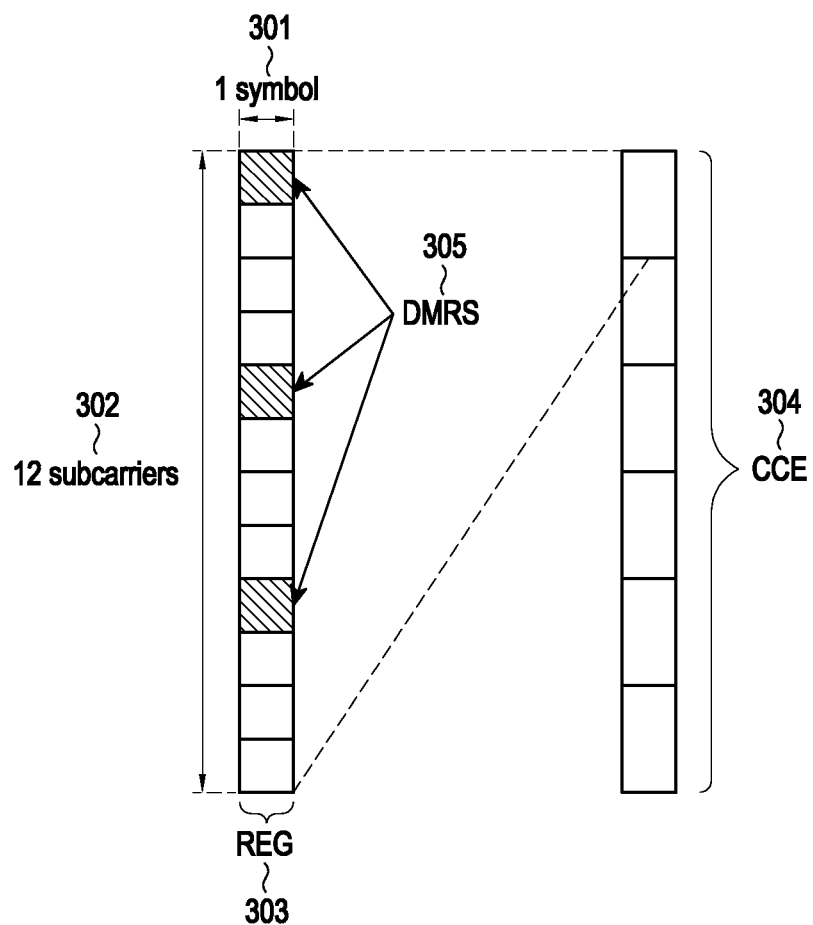
FIG. 3 illustrates a transmission resource of a downlink control channel in 5G, according to an embodiment.

FIG. 3 illustrates a transmission resource of a downlink control channel (e.g., a basic unit of time and frequency resource constituting a download control channel) in 5G, according to an embodiment.

Referring to FIG. 3, the basic unit, i.e., the REG 303, of the time and frequency resource constituting the control channel includes one OFDM symbol 301 along the time axis and 12 subcarriers 302 along the frequency axis, i.e., one RB. By assuming one OFDM symbol 301 as the basic unit on the time axis in constituting the basic unit of the control channel, the data channel and the control channel may be time-multiplexed in one subframe. By leaving the control channel ahead of the data channel, the user's processing time may be reduced, making it easier to meet the latency time requirements. By setting the basic unit on the frequency axis for the control channel to one RB 302, frequency multiplexing between the control channel and the data channel may be carried out more efficiently.

Various sizes of control channel regions may be configured by joining REGs 303 as shown in FIG. 3. As an example, if the basic unit for allocation of a downlink control channel in 5G is a control channel element (CCE) 304, one CCE 304 may be composed of multiple REGs 303. When the REG 303 of FIG. 3 may consist of 12 REs, and one CCE 304 consists of six REGs 303, the CCE 304 may consist of 72 REs. When the download control region is set, the region may be constituted of multiple CCEs 304, and a particular download control channel may be mapped to one or more CCEs 304 according to the aggregation level in the control region and be transmitted. The CCEs 304 in the control region may be distinguished with numbers, in which case the numbers may be assigned according to a logical mapping scheme.

The basic unit, i.e., REG 303, of the downlink control channel shown in FIG. 3 may include all of the REs where the DCI is mapped and the REs where the demodulation reference signal (DMRS) 305, which is a reference signal for decoding the same, is mapped. As shown in FIG. 3, the DMRS 305 may be transmitted in three REs in one REG 303. For reference, since the DMRS 305 is transmitted using the same precoding as the control signal mapped in the REG 303, the UE may decode the control information even without information about what precoding has been applied by the base station.

Figure 4:
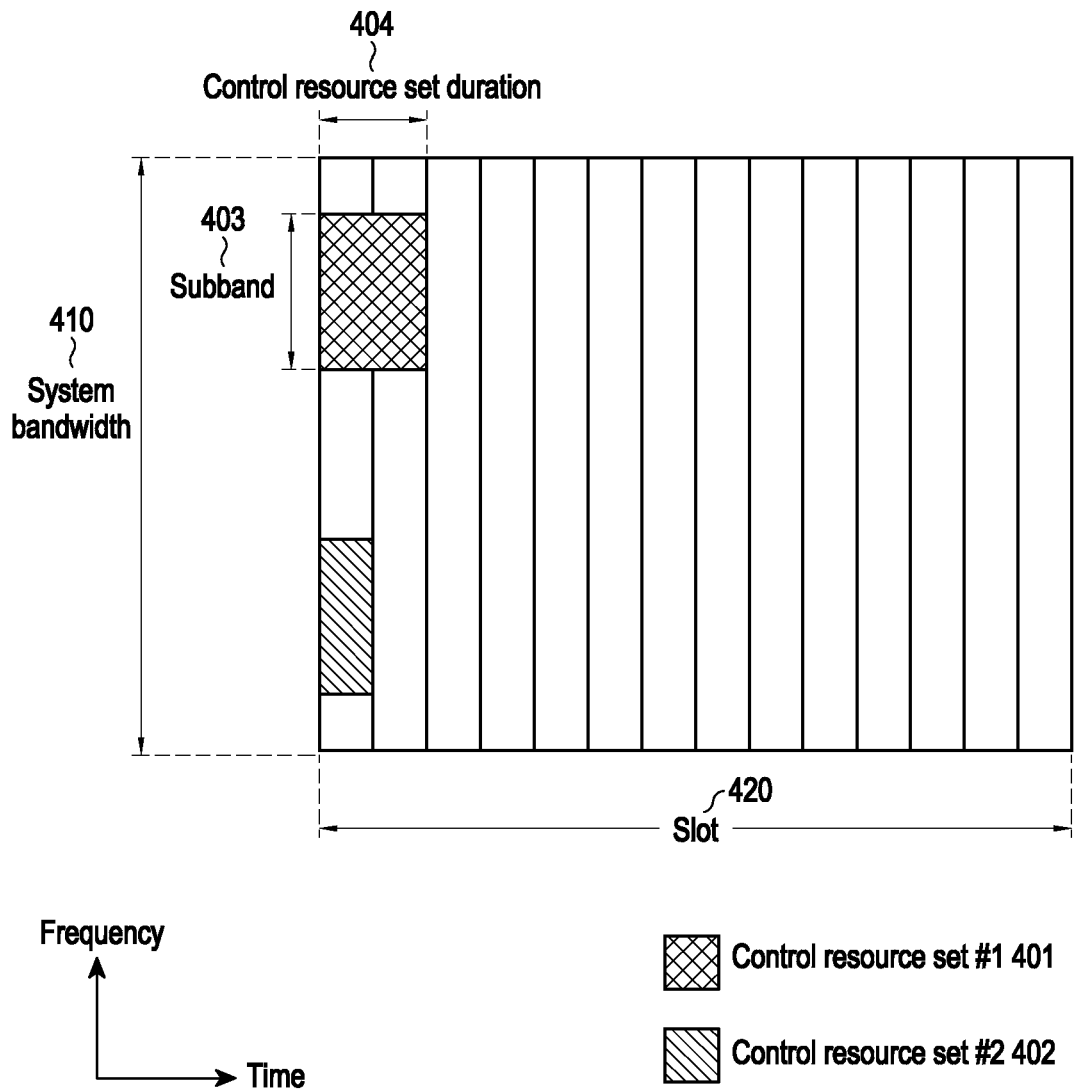
FIG. 4 illustrates a configuration for a control region in 5G, according to an embodiment.

FIG. 4 illustrates a configuration for a control region (e.g., a control resource set (CORESET) in which a downlink control channel is transmitted) in 5G, according to an embodiment.

Referring to FIG. 4, one slot includes 7 OFDM symbols. FIG. 4 illustrates an example in which two control regions (control region #1 401 and control region #2 402) are set in one slot 420 on the time axis while the system bandwidth 410 is set on the frequency axis. The frequency of the control regions 401 and 402 may be set as specific subband 403 in the entire system bandwidth 410. The time length of the control regions 401 and 402 may be set to one or more OFDM symbols, and the time length of the control regions 401 and 402 may also be defined as control resource set duration 404. In the example of FIG. 4, control region #1 401 is configured with a control region length of two symbols, and control region #4 402 is configured with a control region length of one symbol.

The control region in 5G, described above, may be configured in the UE by the base station through higher layer signaling (e.g., system information, master information block (MIB), or RRC signaling). Configuring a control region in a UE includes providing the UE with information such as the location of the control region, subband, resource allocation of the control region, and control resource set duration. For example, the information shown in Table 3, below, may be included.

TABLE 3

- configuration information 1. frequency-axis RB allocation information
- configuration information 2. control region start symbol
- configuration information 3. control resource set duration
- configuration information 4. REG bundling size (2, 3 or 6)
- configuration information 5. transmission mode (interleaved transmission scheme or non-interleaved transmission scheme)
- configuration information 6. DMRS configuration information (precoder granularity)
- configuration information 7. search space type (common search space, group-common search space, or UE-specific search space)
- configuration information 8. DCI format to be monitored in the corresponding control region
- other information The configuration information set forth in Table 3 is an example of the disclosure, and other various pieces of information, necessary for transmitting the downlink control channel, than the configuration information in Table 3 may be configured in the UE.

DCI in 5G is described below in detail.

In the 5G system, scheduling information about uplink data (physical uplink shared channel (PUSCH)) or downlink data (PDSCH) is transferred from the base station to the UE through DCI.

The UE may monitor the DCI format for fallback and the DCI format for non-fallback for PUSCH or PDSCH. The fallback DCI format may be composed of fixed fields between the base station and the UE, and the non-fallback DCI format may include configurable fields.

The fallback DCI for PUSCH scheduling may include the information set forth below in Table 4.

TABLE 4

- Identifier for DCI formats - [1] bit
- Frequency domain resource assignment - 
  $[\ \lceil\ \log_2(N_{RB}^{UL,BWP}(N_{RB}^{UL,BWP}+1)/2\ \rceil\ ]$ bits
- Time domain resource assignment - X bits
- Frequency hopping flag - 1 bit.
- MCS - [5] bits
- New data indicator - 1 bit
- Redundancy version - [2] bits
- HARQ process number - [4] bits
- TPC command for scheduled PUSCH - [2] bits
- UL/supplementary UL (SUL) indicator - 0 or 1 bit According to an embodiment, the non-fallback DCI for PUSCH scheduling may include the information set forth below in Table 5.

TABLE 5

- Carrier indicator - 0 or 3 bits
- Identifier for DCI formats - [1] bits
- Bandwidth part indicator - 0, 1 or 2 bits
- Frequency domain resource assignment
  • For resource allocation type 0, $\lceil N_{RB}^{UL,BWP}/P \rceil$ bits
  • For resource allocation type 1, $\lceil \log_2(N_{RB}^{UL,BWP}(N_{RB}^{UL,BWP} + 1)/2) \rceil$ bits
- Time domain resource assignment - 1, 2, 3 or 4 bits
- VRB-to-PRB mapping assignment for resource allocation type 1.
  • 0 bit if only resource allocation type 0 is configured;
  • 1 bit otherwise.
- Frequency hopping flag location type 0 is for resource allocation type 1.
  • 0 bit if only resource allocation type 0 is configured;
  • 1 bit otherwise.
- Modulation and coding scheme - 5 bits
- New data indicator - 1 bit
- Redundancy version - 2 bits as defined in section x.x of [6, TS38.214]
- HARQ process number - 4 bits
- 1st downlink assignment index - 1 or 2 bits
  • 1 bit for semi-static HARQ-ACK codebook;
  • 2 bits for dynamic HARQ-ACK codebook with single HARQ-ACK codebook.
- 2nd downlink assignment index - 0 or 2 bits
  • 2 bits for dynamic HARQ-ACK codebook with two HARQ-ACK sub-codebooks;
  • 0 bit otherwise.
- TPC command for scheduled PUSCH - 2 bits $$SRS \text{ resource indicator } r \left\lceil \log_2\left(\sum_{k=1}^{L_{max}} \binom{N_{SRS}}{k}\right) \right\rceil \text{ or } \lceil \log_2(N_{SRS}) \rceil \text{ bits}$$

• $\left\lceil \log_2\left(\sum_{k=1}^{L_{max}} \binom{N_{SRS}}{k}\right) \right\rceil$ bits for non–codebook based PUSCH transmission;

• $\lceil \log_2(N_{SRS}) \rceil$ bits for codebook based PUSCH transmission.
- Precoding information and number of layers - up to 6 bits
- Antenna ports - up to 5 bits
- SRS request - 2 bits
- CSI request - 0, 1 2, 3, 5 or 6 bits
- CBG transmission information - 0, 2, 4, 6 or 8 bits
- PTRS-DMRS association - 2 bits
- beta_offset indicator - 2 bits
- DMRS sequence initialization - 0 or 1 bit
- UL/SUL indicator - 0 or 1 bit According to an embodiment, the fallback DCI for PDSCH scheduling may include the information set forth below in Table 6.

TABLE 6

- Identifier for DCI formats - [1] bit
- Frequency domain resource assignment -[ [ $\log_2(N_{RB}^{DL,BWP}(N_{RB}^{DL,BWP} + 1)/2)$ ]] bits
- Time domain resource assignment - X bits
- virtual RB (VRB)-to-PRB mapping - 1 bit.
- MCS - [5] bits
- New data indicator - 1 bit
- Redundancy version - [2] bits
- HARQ process number - [4] bits
- Downlink assignment index - 2 bits
- TPC command for scheduled PUCCH - [2] bits
- PUCCH resource indicator - [2] bits
- PDSCH-to-HARQ feedback timing indicator - [3] bits According to an embodiment, the non-fallback DCI for PDSCH scheduling may include the information set forth below in Table 7.

TABLE 7

- Carrier indicator - 0 or 3 bits
- Identifier for DCI formats - [1] bits
- Bandwidth part indicator - 0, 1 or 2 bits
- Frequency domain resource assignment
  • For resource allocation type 0, $[N_{RB}^{DL,BWP}/P]$bits
  • For resource allocation type 1, $[\log_2(N_{RB}^{DL,BWP}(N_{RB}^{DL,BWP} + 1)/2]$bits
- Time domain resource assignment -1, 2, 3, or 4 bits
- VRB-to-PRB mapping - 0 or 1 bit, only for resource allocation type 1.
  • 0 bit if only resource allocation type 0 is configured;
  • 1 bit otherwise.
- PRB bundling size indicator - 1 bit
- Rate matching indicator - 0, 1, 2 bits
- zero power (ZP) channel state information (CSI)-reference signal (RS) trigger - X bits
  For transport block 1:
  - MCS - 5 bits
  - New data indicator - 1 bit
  - Redundancy version - 2 bits
  For transport block 2:
  - MCS - 5 bits
  - New data indicator - 1 bit
  - Redundancy version - 2 bits
- HARQ process number - 4 bits
- Downlink assignment index - 0 or 4 bits
- TPC command, for scheduled PUCCH - 2 bits
- PUCCH resource indicator
- PDSCH-to-HARQ_feedback timing indicator - 3 bits
- Antenna ports - up to 5 bits
- Transmission configuration indication - 3 bits
- SRS request - 2 bits
- CBG transmission information - 0, 2, 4, 6, or 8 bits
- CBG flushing out information - 0 or 1 bit
- DMRS sequence initialization - 0 or 1 bit The DCI undergoes channel coding and modulation and may be transmitted through the downlink physical control channel, PDCCH. The CRC is added to the DCI message payload, and the CRC is scrambled with the RNTI that is the ID of the UE.

Different RNTIs are used for the purposes of the DCI message, e.g., UE-specific data transmission, power control command, or RAR. The RNTI is not explicitly transmitted, but the RNTI is included in the CRC calculation process and transmitted. If the UE receives the DCI message transmitted on the PDCCH, the UE may identify the CRC using the allocated RNTI. If the result of identifying the CRC is correct, the UE may know that the message is transmitted to the UE.

For example, the DCI scheduling the PDSCH for system information (SI) may be scrambled to ST-RNTI. The DCI scheduling a PDSCH for an RAR message may be scrambled to random access (RA)-RNTI. The DCI scheduling a PDSCH for a paging message may be scrambled with physical (P)-RNTI. The DCI providing a slot format indicator (SFI) may be scrambled to SFI-RNTI. The DCI providing TPC may be scrambled to TPC-RNTI. The DCI for scheduling a UE-specific PDSCH or PUSCH may be scrambled with cell RNTI (C-RNTI).

If a specific UE receives a data channel, i.e., PUSCH or PDSCH, scheduled through the PDCCH, data is transmitted/received along with DMRS in the scheduled resource area.

Figure 5:
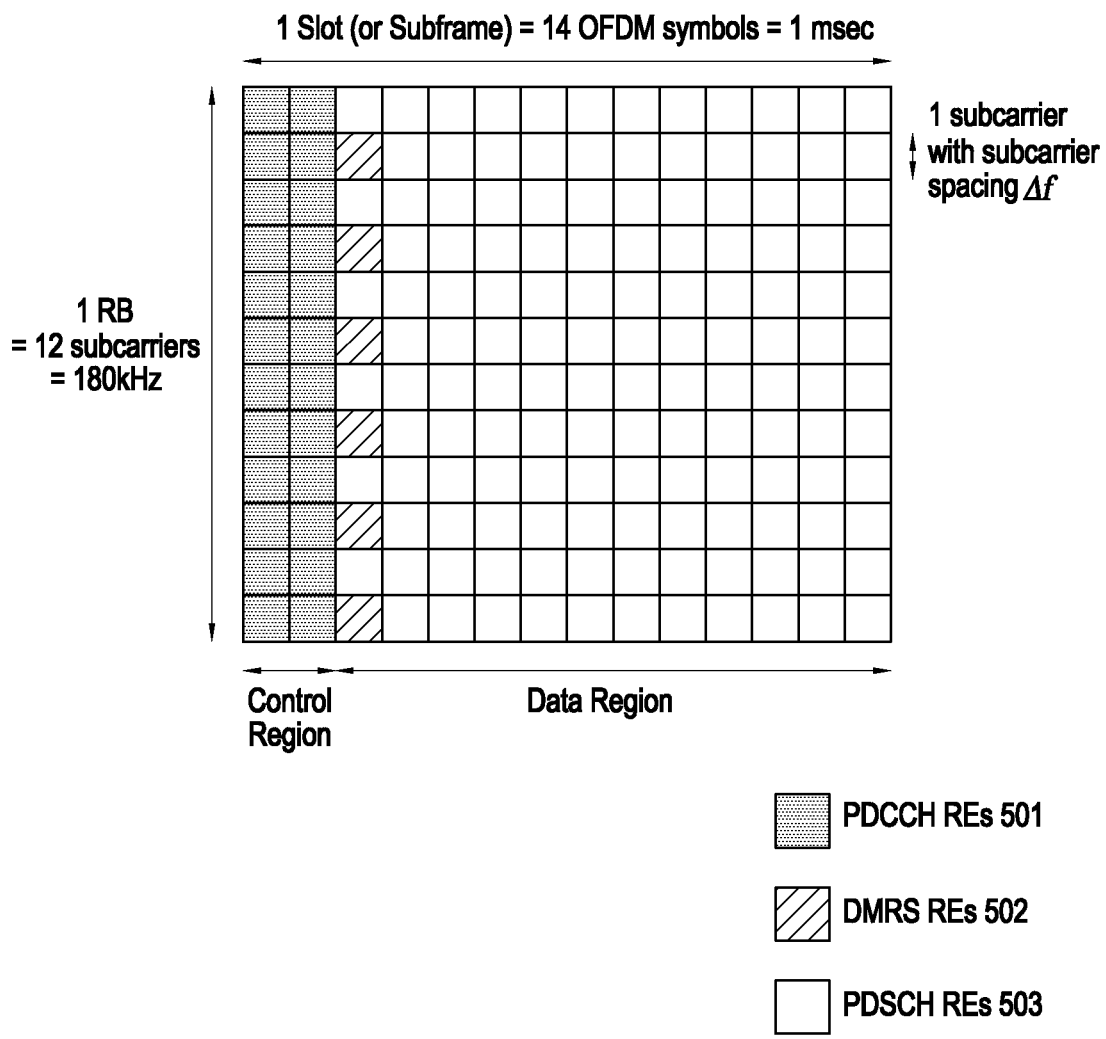
FIG. 5 illustrates a configuration for a downlink resource block (RB) structure in 5G, according to an embodiment.

FIG. 5 illustrates a configuration for a downlink RB structure (e.g., a configuration for a downlink RB structure) in 5G, according to an embodiment.

More specifically, FIG. 5 illustrates an example in which a specific UE uses 14 OFDM symbols as one slot (or subframe) in downlink, the PDCCH is transmitted in the first two OFDM symbols, and the DMRS is transmitted in the third symbol. In the case of FIG. 5, in a specific RB where the PDSCH is scheduled, the PDSCH is transmitted, with data mapped to the REs, in which no DMRS is transmitted in the third symbol, and the REs of the fourth to last symbols. Subcarrier spacing Δf represented in FIG. 5 is 15 kilohertz (kHz) in the LTE/LTE-A system and one of {15, 30, 60, 120, 240, 480} kHz in the 5G system.

In the cellular system, the base station should transmit a reference signal to measure the downlink channel status. In the 3GPP LTE-A system, the UE may measure the channel status between the UE and the base station using the CRS or CSI-RS that the base station transmits.

The channel state should be measured considering various factors, and it may include an amount of interference in downlink. The downlink interference amount includes an interference signal and thermal noise that are created by an antenna belonging to a neighbor base station, and the downlink interference amount is critical in the UE determining the channel status of downlink. As an example, in case a base station with one transmission antenna sends a signal to a UE with one reception antenna, the UE should determine the amount of interference to be received simultaneously during the period of receiving corresponding symbols and energy per symbol that may be received on downlink from the reference signal received from the base station and should determine an energy per symbol to interference density ratio (Es/Io). The determined Es/Io is converted into a data transmission speed or a value corresponding to the data transmission speed and is transmitted, in the form of a channel quality indicator (CQI), to the base station and may be used to determine at what data transmission speed the base station is to transmit data to the UE.

More specifically, in the LTE-A system, the UE sends information on the channel status of downlink to the base station so that it may be utilized for downlink scheduling by the base station. That is, the UE measures the reference signal transmitted from the base station on downlink and feedbacks the information extracted therefrom to the base station in a form as defined in the LTE-LTE-A standards. As described above, the information fed back by the UE in LTE/LTE-A may be referred to as channel state information, and the channel state information may include three pieces of information as follows.

Rank indicator (RI): the number of spatial layers that may be received by the UE in the current channel status Precoder matrix indicator (PMI): an indicator for a precoding matrix favored by the UE in the current channel status CQI: the maximum data rate at which the UE may perform reception in the current channel status.

The CQI may be replaced with the signal-to-interference plus noise ratio (SINR), the maximum error correction code rate and modulation scheme, or data efficiency per frequency which may be utilized similar to the maximum data rate.

The RI, PMI, and CQI are associated with one another and have meanings. As an example, the precoding matrix supported in the LTE/LTE-A is defined different per rank. Accordingly, the PMI value X when the RI is 1 and the PMI value X when the RI is 2 may be interpreted differently.

Further, as an example, it is assumed that when the terminal determines the CQI, the PMI value, X, that the terminal has provided to the base station has also been applied. In other words, reporting RI_X, PMI_Y, and CQI_Z to the base station by the UE is equal to reporting that the UE is able to receive the data rate corresponding to CQI_Z when the rank is RI_X, and PMI is PMI_Y. As such, the UE assumes the transmission scheme that is to be performed for the base station when computing the CQI, thereby enabling the securing of the optimized performance upon attending actual transmission in the corresponding transmission scheme.

In LTE/LTE-A, RI, PMI, and CQI, which are channel state information fed back by the UE, may be fed back periodically or aperiodically. When the base station is to aperiodically obtain channel state information about a specific UE, the base station may be configured to perform aperiodic feedback using the aperiodic feedback indicator (or channel state information request field or channel state information request information) contained in the DCI about the UE. Further, if receiving the indicator configured to perform aperiodic feedback in the nth subframe, the UE may include aperiodic feedback information (or channel state information) in data transmission in the n+kth subframe and perform uplink transmission. Here, k is a parameter defined in the 3GPP LTE release 11 standards, and this is 4 for frequency division duplexing (FDD) and may be defined as shown below in Table 8 (k for subframe number n in TDD UL/DL configuration) for time division duplexing (TDD).

TABLE 8

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | 7 | 4 | — | — | 6 | 7 | 4 |
| 1 | — | — | 6 | 4 | — | — | — | 6 | 4 | — |
| 2 | — | — | 4 | — | — | — | — | 4 | — | — |
| 3 | — | — | 4 | 4 | 4 | — | — | — | — | — |
| 4 | — | — | 4 | 4 | — | — | — | — | — | — |
| 5 | — | — | 4 | — | — | — | — | — | — | — |
| 6 | — | — | 7 | 7 | 5 | — | — | 7 | 7 | — |

When aperiodic feedback is configured, feedback information (or channel state information) may include RI, PMI, and CQI, and RI and PMI may not be fed back depending on the feedback configuration (or the channel state report configuration).

In the disclosure, an in-band full-duplex (hereinafter, simply "full-duplex") system refers to a system in which an uplink signal and a downlink signal may be simultaneously transmitted in the same band, same time resource, unlike the TDD or FDD system. In other words, in the full-duplex system, uplink and downlink signals may be mixed in the same cell, causing interference. In this case, the operation of the in-band full-duplex system may include uplink or downlink alone as necessary or may include both uplink and downlink. Further, interference in the in-band full-duplex transmission may include leakage due to signals, as well as signals transmitted in the band. Further, a full-duplex operation may be performed only in some of the used bands and may be carried out over the entire band. In the full-duplex system, simultaneous transmission occurs in the transmission unit and reception unit belonging to one node but, although the transmission unit and the reception unit belong to different nodes, such simultaneous transmission includes a full-duplex operation between the different nodes if information necessary for a full-duplex operation may be shared through mutual information sharing.

Additional types of interference that appear when a full-duplex system is used are classified into two types, self-interference and cross-link interference.

The self-interference includes interference at one node A when the node A receives a signal from another node B. In this case, the node may correspond to various communication entities, such as a base station, a UE, and an in-band access and backhaul (IAB). Although entities recognized as one node are physically separated, they may be recognized as a single node if wiredly or wirelessly connected to share information with each other. Therefore, self-interference may be interpreted as interference between two different nodes that may share information with each other. Further, self-interference may include signals received in a different band as well as signals received in the same band. Self-interference may also include out-of-band radiations caused by signal transmission in other bands. Since self-interference causes transmission and reception in a short distance as compared with a desired signal, it significantly reduces SINR of the desired signal. Therefore, the transmission performance of the full-duplex system is greatly affected by the performance of self-interference cancellation technology.

Cross-link interference includes interference received from downlink transmission of another base station received in the same band when a base station receives uplink from the UE and interference received from another UE's uplink transmission upon the UE's downlink reception. In the case of cross-link interference received by the uplink receiving base station from adaptation layer transmission of another base station, the distance from the interference transmission end to the interference reception end is larger than the distance from the UE, transmitting a signal required by the base station, to the reception end of the base station. The interference transmission power is generally larger by 10-20 decibels (dB) or more than the transmission power of the UE. Thus, it may significantly affect the reception SINR performance of the UE's uplink desired signal received by the base station. Further, the downlink receiving UE may receive cross-link interference from another UE using uplink in the same band. In this case, if the distance between the interfering UE and the downlink receiving UE is meaningfully shorter than the distance between the base station and the downlink receiving UE, it is possible to reduce the UE's downlink desired signal reception SINR performance. In this case, "meaningfully short" indicates that the reception power of interference with the downlink reception UE by the uplink UE is larger than or similar to the reception signal from the base station by the downlink reception UE so that it is short enough to be able to reduce the UE's downlink reception SINR performance.

Recently, as mobile and smart devices come in wide use, wireless traffic soars. To address a frequency shortage, full-duplex communication may be used. Full-duplex communication may obtain twice the frequency efficiency of half-duplex that is adopted in current wireless communication systems by simultaneous transmission/reception (the expression "transmission/reception" should be interpreted to mean "transmission or reception") at the same time and the same frequency. In implementing a full-duplex system, technology for self-interference cancellation should come first. A self-interference signal includes a transmission signal that acts as interference with a reception signal when transmission and reception are simultaneously performed, and provides the advantages of full-duplex communication, thereby removing noise.

Two types of full-duplex systems in cellular-based mobile communication systems will be described; one in which only the base station supports self-interference cancellation for supporting a full-duplex operation and the other in which both the base station and the UE support self-interference cancellation. Self-interference cancellation is not considered for the UE because of ease of implementation of separation self-interference cancellation, RF-circuit self-interference cancellation, and digital self-interference cancellation, in light of the form factor size and circuit structure.

The full-duplex system considered herein is a type of full-duplex system in which only the base station comes with the self-interference cancellation function by default, but the disclosure may apply to a type of full-duplex system in which the UE and the base station both have self-interference cancellation functions. Accordingly, the term "UE" or "base station" below not only denotes one base station or one UE but also should be appreciated as a device equipped with a transmission/reception function, and they may mean different transmission/reception devices performing transmission/reception.

Figure 6:
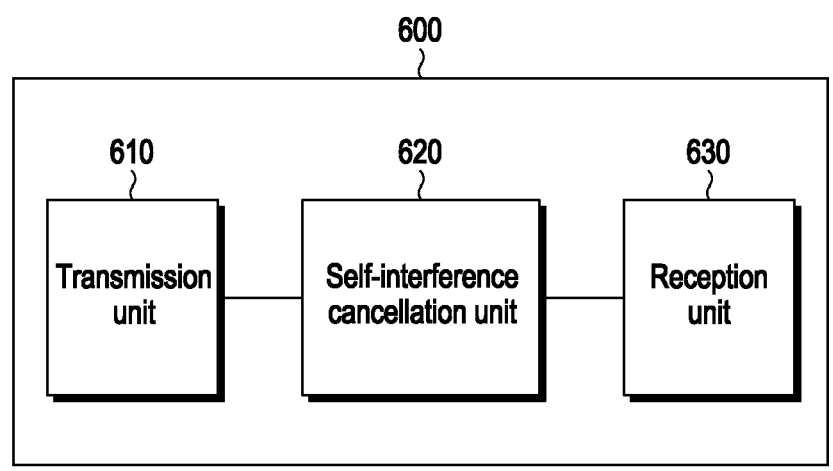
FIG. 6 illustrates a basic structure of a transceiver of a full-duplex system, according to an embodiment.

FIG. 6 illustrates a basic structure of a transceiver of a full-duplex system (e.g., a transmission/reception device having a self-interference cancellation function which is a major component of a full-duplex system), according to an embodiment.

The structure of the transmission/reception device is applicable to the base station and the UE in the same manner and does not specify any one structure of the base station and the UE. However, since a full-duplex system is assumed to be configured with the base station having a self-interference cancellation function by default, the transmission/reception device 600 is assumed to be a base station for convenience of description.

Referring to FIG. 6, a base station 600 includes a transmission unit 610 for transmitting downlink signals to the UE, a self-interference cancellation unit 620 for self-interference cancellation, and a reception unit 630 for receiving uplink signals from the UE. The detailed configuration method for each component of the base station 600 may be varied depending on methods for implementing the base station.

As described above, the transmission/reception device 600 may correspond to a UE. The UE may include a transmission unit 610 for transmitting uplink signals to the base station, a self-interference cancellation unit 620 for self-interference cancellation, and a reception unit 630 for receiving downlink signals from the base station.

Figure 7:
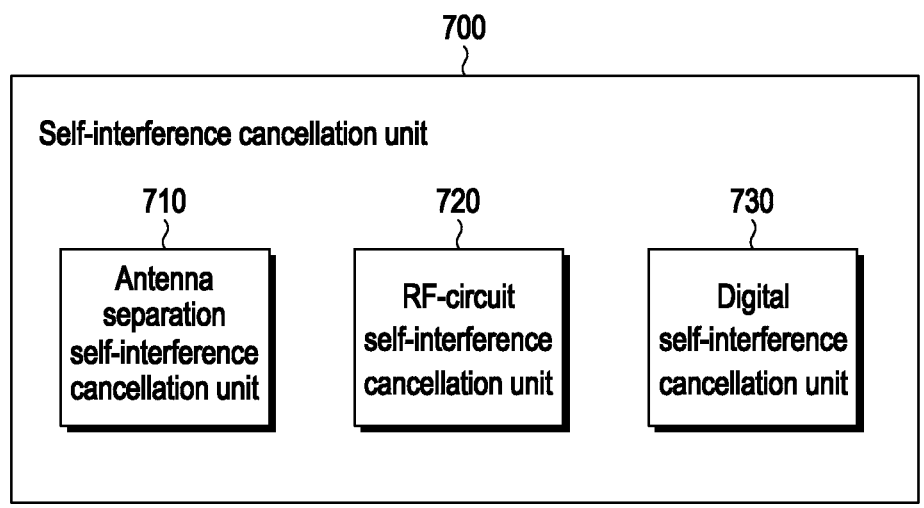
FIG. 7 illustrates a self-interference cancellation unit of a transceiver of a full-duplex system, according to an embodiment.

FIG. 7 illustrates a self-interference cancellation unit of a transceiver of a full-duplex system, according to an embodiment.

Referring to FIG. 7, the self-interference cancellation unit 700 may perform self-interference cancellation. The self-interference cancellation unit 700 of FIG. 7 includes an antenna separation self-interference cancellation unit 710, an RF-circuit self-interference cancellation unit 720, and a digital self-interference cancellation unit 730. However, the configuration of the self-interference cancellation unit 700 is not limited to those described above. Further, if necessary, the RF circuit self-interference cancellation unit 720 may be omitted, and the antenna separation self-interference cancellation unit 710 may also be excluded as necessary. Further, if necessary, transmission and reception may be performed without operating each self-interference cancellation unit 700.

FIG. 7 is a block diagram illustrating a full-duplex transceiver, according to an embodiment. The antenna self-interference cancellation of FIG. 7 may correspond to the antenna separation self-interference cancellation unit 710 of the disclosure, the RF self-interference cancellation may correspond to the RF-circuit self-interference cancellation unit 720, and the digital self-interference cancellation may correspond to the digital self-interference cancellation unit 730.

The antenna separation self-interference cancellation unit 710 may physically separate the transmission end and reception end of the base station and allow the self-interference to be sufficiently attenuated and received by the reception end of the base station. In this case, physical separation of the transmission-end antenna and the reception-end antenna may mean a method of separation using destructive interference of antennas, a method using a cycler in the same antenna, a method using a cross-pole structure, and a method using an isolator so that the downlink transmission signal of the base station is attenuated and received at the uplink reception end of the base station. However, physical separation is not limited to the above-described examples, but may mean separation methods that may allow the downlink transmission signal of the base station to be received at a reduced level by the uplink reception end of the base station.

The RF-circuit self-interference cancellation unit 720 may play a role to attenuate the strength of signal before the self-interference signal is quantized by the analog-to-digital converter (ADC). The RF circuit of the RF-circuit self-interference cancellation unit 720 may simulate the channel that was experienced by the self-interference signal which is the self-interference signal transmitted from the transmission end of the base station, passing through the radio channel and the antenna separation self-interference cancellation unit 710, and arriving at the RF-circuit self-interference cancellation unit 720.

For example, the reception signal y(t), which passes through the antenna separation self-interference cancellation unit 710 and the radio channel, for the analog domain transmission signal x(t) of the base station may be expressed as shown in Equation 1, below.

$$y(t)=x(t)*h(t)+n(t) \qquad \text{Equation 1}$$

In Equation 1, h(t) denotes the time domain impulse response of the radio channel and the antenna separation self-interference cancellation unit 710, and n(t) denotes white noise. In this case, the RF circuit of the RF-circuit self-interference cancellation unit 720 may generate a similar channel h'(t) that simulates h(t), using a time delay module, a phase shift module, or an amp module. Then, the transmission signal x(t) obtainable from the transmission end may be passed through the RF circuit to simulate (x(t)*h'(t)) the self-interference signal. Then, the transmission signal is subtracted from the self-interference signal and, resultantly, attenuates the self-interference signal as shown in Equation 2, below.

$$y'(t)=x(t)*h(t)-x(t)*h'(t)+n(t) \qquad \text{Equation 2}$$

In this case, the bandwidth where the performance of the RF-circuit self-interference cancellation unit 720 is maintained may vary depending on the bandwidth of the above-described components of the RF circuit, e.g., the time delay module, phase shift module, or amp module. For example, if the bandwidth where the performance of the RF-circuit self-interference cancellation unit 720 of the RF circuit is smaller than the system bandwidth, such a limit to the bandwidth of the RF-circuit self-interference cancellation unit comes from limitations in the analog circuit.

In addition, the digital self-interference cancellation unit 720 may cancel the self-interference signal X[n] from signal Y'[n] which is the frequency-domain signal into which signal y'(t) having passed through the RF-circuit self-interference cancellation unit is converted by the ADC after passing through the ADC. For example, as shown in Equation 3, below, the digital domain channel H[n] experienced by transmission signal X[n] is estimated and subtracted from reception signal Y[n]. In this case, the performance of the digital self-interference cancellation unit is determined by the similarity between the estimated channel H'[n] and the actual channel H[n]. In other words, as the similarity between H'[n] and H[n] increases, the performance of the digital self-interference cancellation unit increases.

$$Y'[n]=X[n]H[n]-X[n]H'[n]+n(t) \qquad \text{Equation 3}$$

Although LTE or LTE-A system is described in connection with embodiments, as an example, embodiments may also apply to other communication systems with a similar technical background or channel form. For example, communication systems to which embodiments are applied may include post-LTE-A, 5G mobile communication technology (e.g., 5G or NR). Further, embodiments may be modified in such a range as not to significantly depart from the scope of the disclosure under the determination by one of ordinary skill in the art and such modifications may be applicable to other communication systems.

The terms as used herein are defined considering the functions in the disclosure and may be replaced with other terms according to the intention or practice of the user or operator. Therefore, the terms should be defined based on the overall disclosure.

A number of different embodiments will now be described. As explained below, features related to one or more of the embodiments may be combined, or may exist independently of each other.

Figure 8:
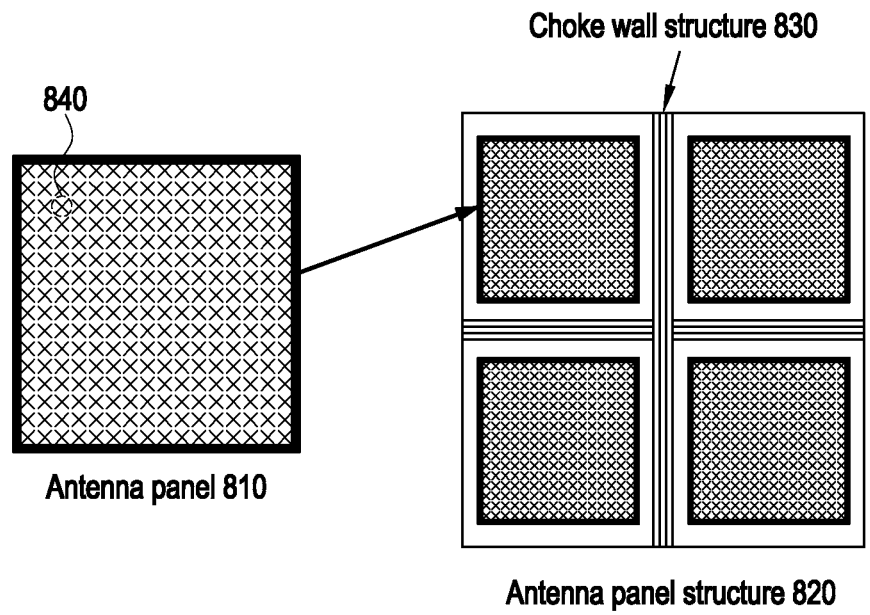
FIG. 8 illustrates an antenna configuration including a structure for interference cancellation between antennas for self-interference cancellation, according to an embodiment.

Embodiment 1 illustrates an antenna structure and a configuration method during a full-duplex operation. FIG. 8 illustrates an antenna configuration including a structure for interference cancellation between antennas for self-interference cancellation, according to an embodiment. In this example, a structure in which interference is canceled by placing a barrier rib between two antenna panels is considered, but it should be understood as applicable to a full-duplex operation having different antenna panels. For example, the technology of the disclosure is applicable to structures in which the antenna panels are sufficiently spaced apart, or an insulator or a barrier rib is inserted therebetween to reduce self-interference. In this embodiment, equipment with an antenna structure may include, e.g., base stations, UEs, or other equipment such as an integrated access backhaul (IAB), which follow the transmission method of the UE or the base station. Further, since full-duplex operation includes a half-duplex operation, the operation methods of the disclosure include configuration methods that consider not only full-duplex operation but also a half-duplex operation.

FIG. 8 illustrates an antenna configuration including a structure for interference cancellation between antennas for self-interference cancellation, according to an embodiment. More specifically, FIG. 8 is a view illustrating an antenna panel and configuration according to the disclosure.

Referring to FIG. 8, an antenna panel 810 is composed of several antenna arrays, and antenna elements 840 constituting the antenna array are structures capable of performing transmission and reception. In FIG. 8, the symbol X in the antenna panel denotes the antenna element included in the antenna panel. X denotes two antenna elements which represent antennas with different polarizations, installed in the same position. Although FIG. 8 illustrates, for convenience of description, that the antenna elements included in each panel are represented as 16 (horizontal)×16 (vertical)×2 (polarization), the method of the disclosure is applicable regardless of the configuration or number of antenna elements.

Different antenna elements included in the same antenna panel, if simultaneously performing transmission or reception at the same time, have difficulty in controlling self-interference due to a near-field coupling between the antenna elements, the antenna elements belonging to the same antenna panel perform transmission or reception. Therefore, each antenna panel may be said to select either transmission or reception and operate.

In FIG. 8, the antenna panel structure 820 includes four antenna panels 810 and a choke wall structure 830 therebetween, which corresponds to an antenna self-interference cancellation unit for self-interference cancellation. The choke wall structure considered herein is a structure in which several barrier rib structures are installed between the antenna panels to remove surface current for a specific band. The choke wall serves to remove near-field coupling and surface current that acts as self-interference between the antenna panels.

Figure 9:
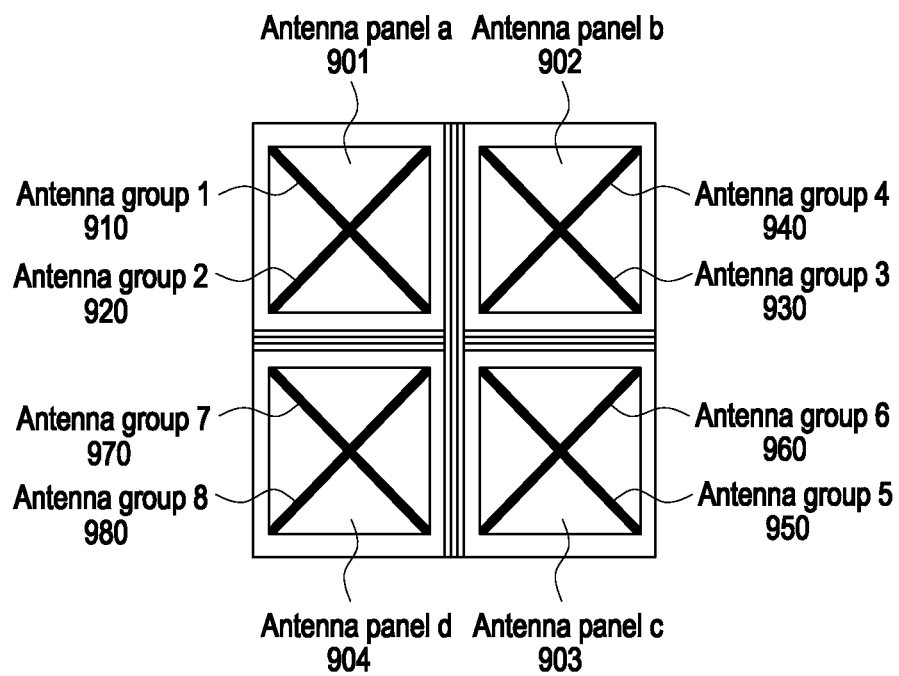
FIG. 9 schematically illustrates an antenna element in the antenna panel of FIG. 8, according to an embodiment.

FIG. 9 schematically illustrates an antenna element in the antenna panel of FIG. 8, according to an embodiment. In FIG. 9, the symbol X in each antenna panel denotes the antenna element included in each antenna panel. In the example of FIG. 8, each antenna panel is composed of antenna elements 16 (horizontal)×16 (vertical)×2 (polarization). The X in FIG. 9 indicates the direction of each pole. In other words, the antenna elements 16 (horizontal)×16 (vertical) which belong to the antenna panel corresponding to the +45-degree polarization are represented as one line and, likewise, the antenna elements 16 (horizontal)×16 (vertical) which belong to the antenna panel corresponding to the −45-degree polarization are represented as one line. This is why a hybrid beamforming structure is considered in which the antenna elements belonging to one panel use the same signal by configuring analog beamforming, and several antenna panels use digital beams. In the following description of the following embodiments, for convenience of description, several antennas are bundled up and represented as a single line as shown in FIG. 9. For convenience of description, the antenna panels are denoted as antenna panel a 901, antenna panel b 902, antenna panel c 903, and antenna panel d 904, in order from the top left antenna panel. Since each antenna panel has two polarizations, there are a total of eight sets for which transmission/reception are performed, with one signal configured as an analog beam. In the disclosure, the antenna element group 910 having the −45-degree polarization of the top left panel, the +45-degree pole antenna element group 920 of the top left panel, the −45-degree pole antenna element group 930 of the top right panel, the +45-degree pole antenna element group 940 of the top right panel, the −45-degree pole antenna element group 950 of the bottom right panel, the +45-degree pole antenna element group 960 of the bottom right panel, the −45-degree pole antenna element group 970 of the bottom left panel, and the +45-degree pole antenna element group 980 of the bottom left are denoted in order as antenna groups 1, 2, 3, 4, 5, 6, 7, and 8, respectively.

The antenna group of FIG. 9 represents the minimum unit capable of independently operating at the beam level. The antenna group of FIG. 9 represents the minimum unit capable of transmitting different signals. In other words, the antenna elements constituting the antenna group phase-shift or time-delay and transmit the same signal, thereby forming one analog beam. The antenna elements constituting the antenna group may be appreciated as one structure that receives or transmits the same digital signal.

Figure 10:
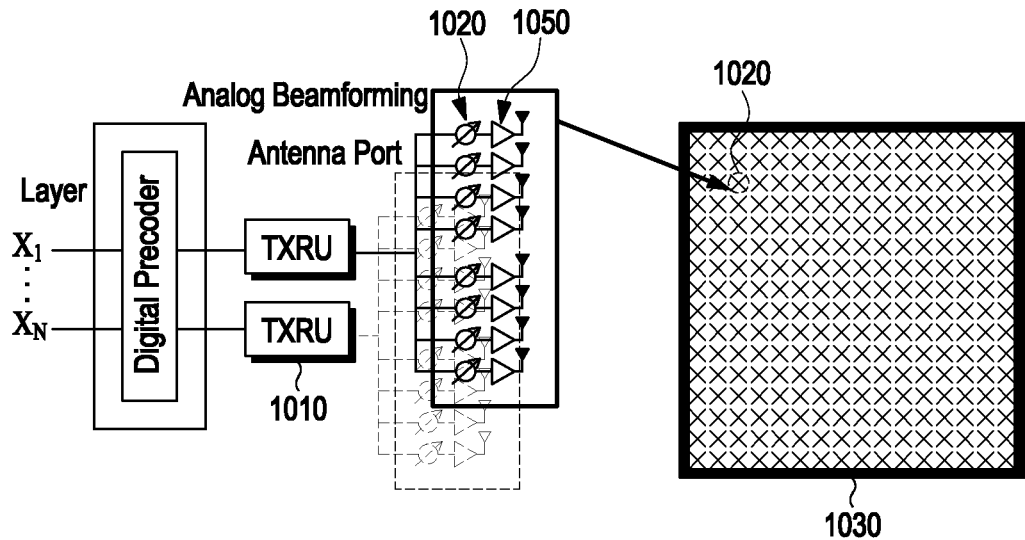
FIG. 10 illustrates a transceiver unit (TXRU) connected to an antenna panel and a transmission process, according to an embodiment.

FIG. 10 illustrates a TXRU connected to an antenna panel and a transmission process, according to an embodiment.

Referring to FIG. 10, several antenna elements 1020 are mapped to one TXRU 1010 and operated, and each has a PA 1050 and a phase shifter 1040. Depending on the configuration of the phase shifter of the antenna, one beam is formed, and one signal is transmitted. In this case, forming one beam includes the same signal being transmitted from different antenna elements and, at this time, a beam is formed using a time delay using the phase shifter and a difference in transmission position between antenna elements. Although it is illustrated that one TXRU is connected to one antenna group, the TXRU may be freely mapped to one of the antenna groups and perform transmission. According to the disclosure, the 4 antenna technique (4T4R), in which the number of antennas is doubled as compared with the 2 antenna technique (2T2R) increases the frequency intensity for data transmission/reception two times or more, enhancing coverage and increasing data transmission/reception rate. As data may be provided at a stable rate in broad coverage, a communication service may be provided with fewer base stations. Thus, it is possible to save network building costs and mitigate interference between base stations. In the example, 2T2R is exemplified for convenience of description, and the disclosure is overall applicable to transceivers used in other various communication systems, such as 1 antenna technique (1T1R), 4T4T, 6 antenna technique (6T6R), and 8 antenna technique (8T8R).

Figure 11:
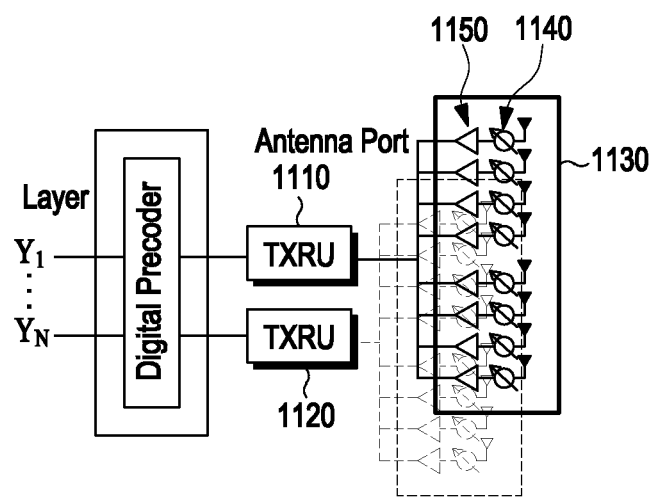
FIG. 11 illustrates a TXRU connected to an antenna panel and a reception process, according to an embodiment.

FIG. 11 illustrates a TXRU connected to an antenna panel and a reception process, according to an embodiment. In particular, FIG. 11 illustrates TXRUs 1110 and 1120 connected to the antenna panel of FIG. 9 and a reception process. Referring to FIG. 11, several antenna elements 1130 are mapped to one TXRU and operated, and each has a power amplifier (PA) 1150 and a phase shifter 1140. Depending on the configuration of the phase shifter of the antenna, one beam is formed, and one signal is received. In this case, forming one beam includes that the same signal is transmitted from different antenna elements and, at this time, a beam is formed using a time delay using the phase shifter and a difference in transmission position between antenna elements. In the illustrated example, one TXRU is connected to one antenna group, but the TXRU may be freely mapped to one of the antenna groups and perform transmission.

Figure 12:
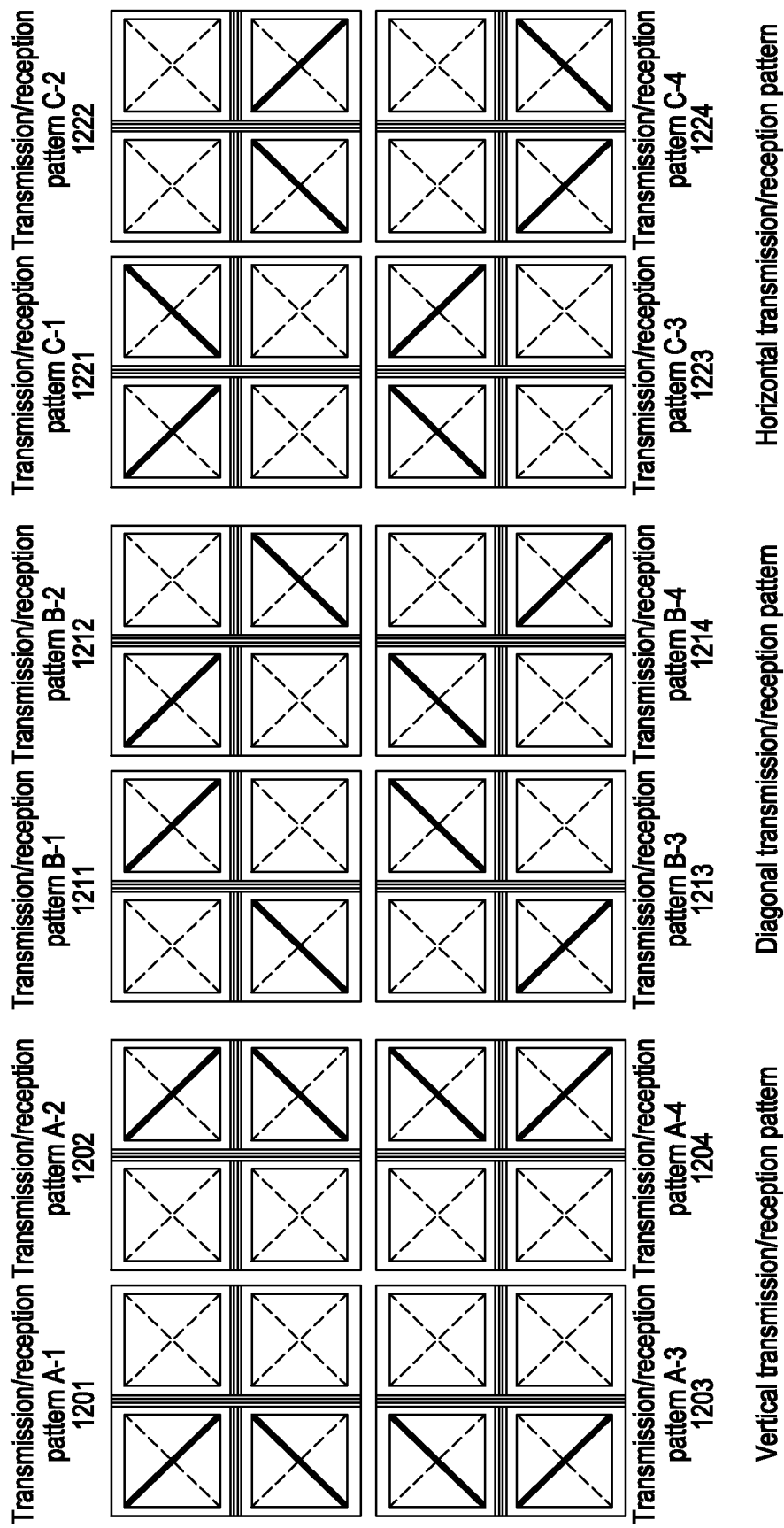
FIG. 12 illustrates an antenna configuration for transmission or reception using cross-poles in the antenna panel of FIG. 9, according to an embodiment.

FIG. 12 illustrates an antenna configuration for transmission or reception using cross-poles in the antenna panel of FIG. 9, according to an embodiment. In particular, FIG. 12 illustrates an operation for supporting 2T2R. For transmission or reception in the antenna structure of FIGS. 10 and 11, the antenna panel used for transmission or reception and the polarization direction of the antenna used in each antenna panel should be selected. In other words, the antenna group described in connection with FIG. 9 should be determined and operated. For example, in the case of 2 antenna (2T) transmission or reception, two of eight antenna groups may be selected to perform transmission or reception. In FIG. 12, the antenna group represented as a solid line is one antenna group bundled up for 2 antenna (2T) transmission or reception. The antenna group represented as a dashed line is an antenna group that does not consider transmission or reception in the corresponding transmission/reception pattern. A total of $_8C_2$=28 transmission or reception patterns, including the transmission or reception patterns shown may be taken into consideration. However, the transmission or reception patterns are ones that may obtain more gains in light of performance among the 28 patterns.

In FIG. 12, the vertical transmission/reception patterns 1201, 1202, 1203, and 1204 represented as transmission/ reception patterns A-1 to A-4 have a structure in which among upper and lower antenna panels, which are four antenna panels in total, two upper antenna groups and two lower antenna groups are combined to perform transmission or reception. The structure may be used to increase the vertical resolution of the beam.

In FIG. 12, the diagonal transmission/reception patterns 1211, 1212, 1213, and 1214 represented as transmission/reception patterns B-1 to B-4 have a structure in which among upper and lower antenna panels, which are four antenna panels in total, two diagonal antenna groups are combined to perform transmission or reception. The structure may be used to increase both the beam vertical resolution and horizontal resolution.

In FIG. 12, the diagonal transmission/reception patterns 1221, 1222, 1223, and 1224 represented as transmission/reception patterns C-1 to C-4 have a structure in which among upper and lower antenna panels, which are four antenna panels in total, two horizontal antenna groups are combined to perform transmission or reception. The structure may be used to increase the beam horizontal resolution.

In FIG. 12, the antenna groups bundled up into the transmission/reception pattern may be used independently or in combination. In this case, the antenna group combination may be used for the purpose of scheduling multiple UEs upon configuring a half-duplex operation as in embodiment 2. Further, the antenna group combination may be used to support a full-duplex operation as in embodiment 3. The antenna group combination may also be used to use uplink/downlink transmission, with the band split as in embodiment 4.

With reference to FIG. 12, an example of the transmission/reception pattern combination is as follows. In the case of 2T2R transmission to the maximum, if only one UE is simultaneously scheduled and used, the base station may perform transmission using only one of the transmission/reception patterns. If the optimal beam that may be received by the UE has several directions, although one UE is scheduled, several of the base station transmission/reception patterns may be combined and used. In this case, each transmission/reception pattern may be operated, with each transmission/reception beam form configured. Further, one transmission/reception pattern may be allocated to each of multiple UEs. The same transmission/reception pattern may be used for multiple UEs to perform transmission.

For example, when one UE is considered, transmission/reception pattern A-1 may be allocated to the UE to perform transmission/reception. Transmission/reception patterns A-1 and A-2 may be allocated to the UE to perform transmission/reception. Transmission/reception patterns A-1, A-2, and A-3 may be allocated to the UE to perform transmission/reception. Transmission/reception patterns A-1, A-2, A-3, and A-4 all may be allocated to the UE to perform transmission/reception.

When multiple UEs are considered, transmission/reception pattern A-1 may be allocated to several UEs to perform transmission/reception. Transmission/reception patterns A-1 and A-2 may be allocated to several UEs to perform transmission/reception. Transmission/reception patterns A-1 and A-2, respectively, may be allocated to the UEs. Transmission/reception patterns A-1 and A-2 may be shared by each UE. Transmission/reception patterns A-1, A-2, and A-3 may be allocated to the UE to perform transmission/reception. Transmission/reception patterns A-1, A-2, and A-3, respectively, may be allocated to the UEs. Transmission/reception patterns A-1, A-2, and A-3 may be shared by each UE. Transmission/reception patterns A-1, A-2, A-3, and A-4 all may be allocated to the UE to perform transmission/reception. Transmission/reception patterns A-1, A-2, A-3, and A-4, respectively, may be allocated to the UEs. Transmission/reception patterns A-1, A-2, A-3, and A-4 may be shared by each UE. Some transmission/reception patterns may be shared by the UEs, and the rest of the transmission/reception patterns may be distributed to the UEs.

Although in this example, only combinations of vertical transmission/reception patterns are considered, the same method may also be applicable to diagonal transmission/reception patterns or horizontal transmission/reception patterns. In some cases, some of the vertical transmission/reception patterns, horizontal transmission/reception patterns, or diagonal transmission/reception patterns may be combined and operated. In this case, such a combination may also include a combination of patterns that do not share an antenna group. For example, transmission/reception pattern A-1 and transmission/reception pattern B-1 share antenna group 8 (the bottom left antenna +45-direction antenna group), and are thus difficult to combine and use. However, since transmission/reception pattern A-1 and transmission/reception pattern B-3 share antenna panel D but share different antenna groups, they may be configured in the same combination.

Although in this example, only combinations of vertical transmission/reception patterns are considered, the same method may also be applicable to diagonal transmission/reception patterns or horizontal transmission/reception patterns. In some cases, some of the vertical transmission/reception patterns, horizontal transmission/reception patterns, or diagonal transmission/reception patterns may be combined and operated. In this case, such a combination may also include a combination of patterns that do not share an antenna group. For example, transmission/reception pattern A-1 and transmission/reception pattern B-1 share antenna group 8 (the bottom left antenna +45-direction antenna group), and are thus difficult to combine and use. However, since transmission/reception pattern A-1 and transmission/reception pattern B-3 share antenna panel D but share different antenna groups, they may be configured in the same combination.

FIG. 12 illustrates an operation for supporting 2T2R. For transmission or reception in the antenna structure of FIGS. 10 and 11, the antenna panel used for transmission or reception and the polarization direction of the antenna used in each antenna panel should be selected. In other words, the antenna group described in connection with FIG. 9 should be determined and operated. For example, in the case of 2T transmission or reception, two of eight antenna groups may be selected to perform transmission or reception.

Figure 13:
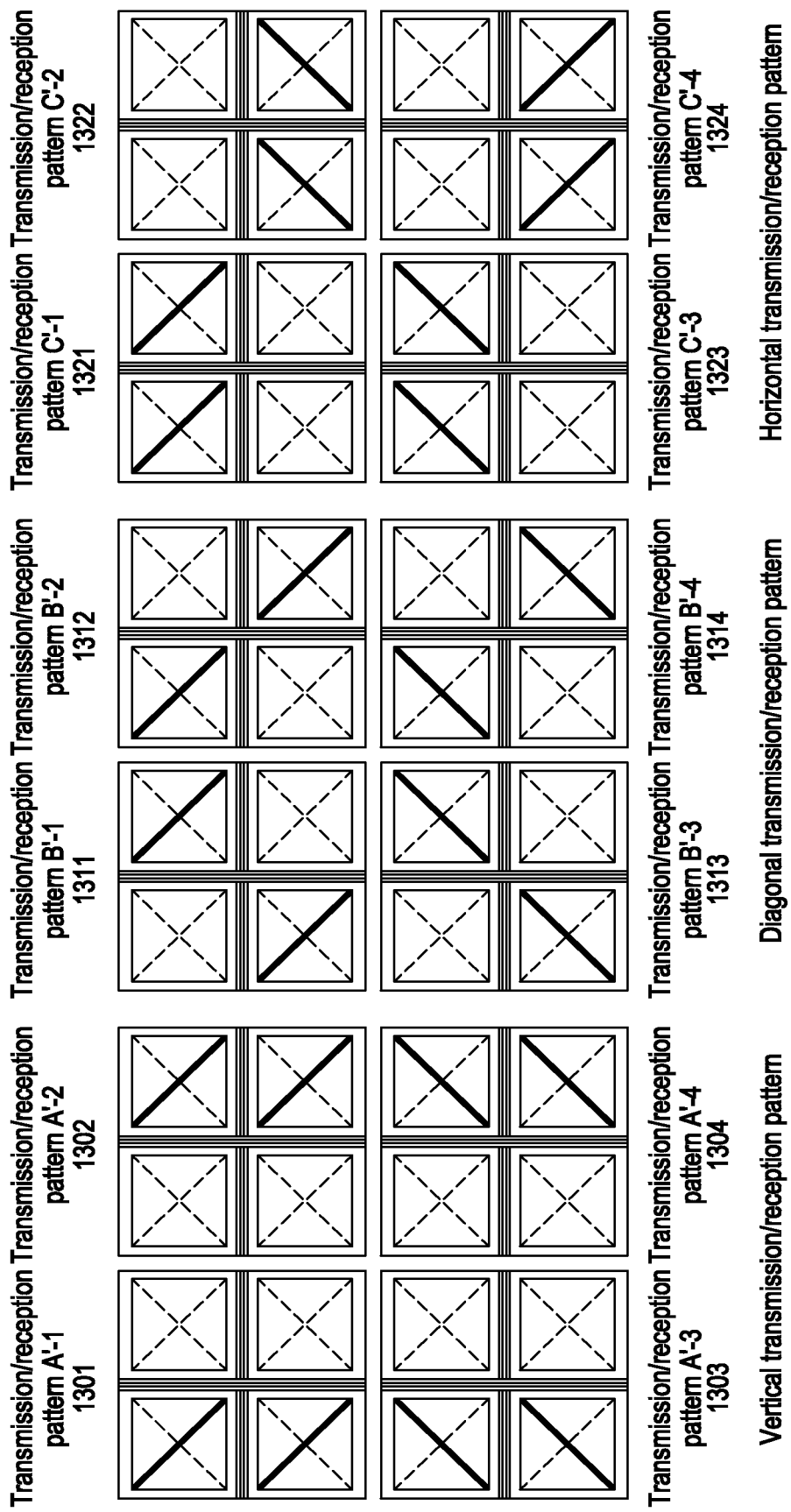
FIG. 13 illustrates an antenna configuration for transmission or reception without using cross-poles in the antenna panel of FIG. 9, according to an embodiment.

FIG. 13 illustrates an antenna configuration for transmission or reception without using cross-poles in the antenna panel of FIG. 9, according to an embodiment.

In FIG. 13, the antenna group represented as a solid line is one antenna group bundled up for 2T transmission or reception. The antenna group represented as a dashed line is an antenna group that does not consider transmission or reception in the corresponding transmission/reception pattern. A difference from the configuration of FIG. 12 is that the configuration of the antenna panel of FIG. 13 does not consider polarization. Therefore, although the UE may not necessarily obtain a high multiplexing gain, this configuration may be used for allocating a high beam gain.

In FIG. 13, the vertical transmission/reception patterns represented as transmission/reception patterns A'-1 to A'-4 1301, 1302, 1303, and 1304 have a structure in which among upper and lower antenna panels, which are four antenna panels in total, two upper antenna groups and two lower antenna groups are combined to perform transmission or reception. The structure may be used to increase the vertical resolution of the beam.

For example, when multiple UEs are considered, transmission/reception pattern A'-1 may be allocated to several UEs to perform transmission/reception. Transmission/reception patterns A'-1 and A'-2 may be allocated to several UE to perform transmission/reception. Transmission/reception patterns A'-1 and A'-2, respectively, may be allocated to the UEs. Transmission/reception patterns A'-1 and A'-2 may be shared by each UE. Transmission/reception patterns A'-1, A'-2, and A'-3 may be allocated to the UE to perform transmission/reception. Transmission/reception patterns A'-1, A'-2, and A'-3, respectively, may be allocated to the UEs. Transmission/reception patterns A'-1, A'-2, and A'-3 may be shared by each UE. Transmission/reception patterns A'-1, A'-2, A'-3, and A'-4 all may be allocated to the UE to perform transmission/reception. Transmission/reception patterns A'-1, A'-2, A'-3, and A'-4, respectively, may be allocated to the UEs. Transmission/reception patterns A'-1, A'-2, A'-3, and A'-4 may be shared by each UE. Some transmission/reception patterns may be shared by the UEs, and the rest of the transmission/reception patterns may be distributed to the UEs.

In FIG. 13, the diagonal transmission/reception patterns 1311, 1312, 1313, and 1314 represented as transmission/reception patterns B'-1 to B'-4 have a structure in which among upper and lower antenna panels, which are four antenna panels in total, two diagonal antenna groups are combined to perform transmission or reception. The structure may be used to increase both the beam vertical resolution and horizontal resolution.

In FIG. 13, the diagonal transmission/reception patterns 1321, 1322, 1323, and 1324 represented as transmission/reception patterns C'-1 to C'-4 have a structure in which among upper and lower antenna panels, which are four antenna panels in total, two horizontal antenna groups are combined to perform transmission or reception. The structure may be used to increase the beam horizontal resolution.

In FIG. 13, the antenna groups bundled up into the transmission/reception pattern may be used independently or in combination. In this case, The antenna group combination may be used for the purpose of scheduling multiple UEs upon configuring a half-duplex operation as in embodiment 2. Further, the antenna group combination may be used to support a full-duplex operation as in embodiment 3. The antenna group combination may also be used for uplink/downlink transmission, with the band split as in embodiment 4.

With reference to FIG. 13, an example of the transmission/reception pattern combination is as follows. In the case of 2T2R transmission to the maximum, if only one UE is simultaneously scheduled and used, the base station may perform transmission using only one of the transmission/reception patterns. If the optimal beam that may be received by the UE has several directions, although one UE is scheduled, several of the base station transmission/reception patterns may be combined and used. In this case, each transmission/reception pattern may be operated, with each transmission/reception beam form configured. Further, one transmission/reception pattern may be allocated to each of multiple UEs. The same transmission/reception pattern may be used for multiple UEs to perform transmission.

For example, when one UE is considered, transmission/reception pattern A'-1 may be allocated to the UE to perform transmission/reception. Transmission/reception patterns A'-1 and A'-2 may be allocated to the UE to perform transmission/reception. Transmission/reception patterns A'-1, A'-2, and A'-3 may be allocated to the UE to perform transmission/reception. Transmission/reception patterns A'-1, A'-2, A'-3, and A'-4 all may be allocated to the UE to perform transmission/reception.

For example, when multiple UEs are considered, transmission/reception pattern A'-1 may be allocated to several UEs to perform transmission/reception. Transmission/reception patterns A'-1 and A'-2 may be allocated to several UEs to perform transmission/reception. Transmission/reception patterns A'-1 and A'-2, respectively, may be allocated to the UEs. Transmission/reception patterns A'-1 and A'-2 may be shared by each UE. Transmission/reception patterns A'-1, A'-2, and A'-3 may be allocated to the UE to perform transmission/reception. Transmission/reception patterns A'-1, A'-2, and A'-3, respectively, may be allocated to the UEs. Transmission/reception patterns A'-1, A'-2, and A'-3 may be shared by each UE. Transmission/reception patterns A'-1, A'-2, A'-3, and A'-4 all may be allocated to the UE to perform transmission/reception. Transmission/reception patterns A'-1, A'-2, A'-3, and A'-4, respectively, may be allocated to the UEs. Transmission/reception patterns A'-1, A'-2, A'-3, and A'-4 may be shared by each UE. Some transmission/reception patterns may be shared by the UEs, and the rest of the transmission/reception patterns may be distributed to the UEs.

Although in this example, only combinations of vertical transmission/reception patterns are considered, the same method may also be applicable to diagonal transmission/reception patterns or horizontal transmission/reception patterns. In some cases, some of the vertical transmission/reception patterns, horizontal transmission/reception patterns, or diagonal transmission/reception patterns may be combined and operated. In this case, such a combination may also include a combination of patterns that do not share an antenna group. For example, transmission/reception pattern A'-1 and transmission/reception pattern B-1 share antenna group 8 (the bottom left antenna +45-direction antenna group), and are thus difficult to combine and use. However, since transmission/reception pattern A'-1 and transmission/reception pattern B'-3 share antenna panel d but share different antenna groups, they may be configured in the same combination.

Figure 14:
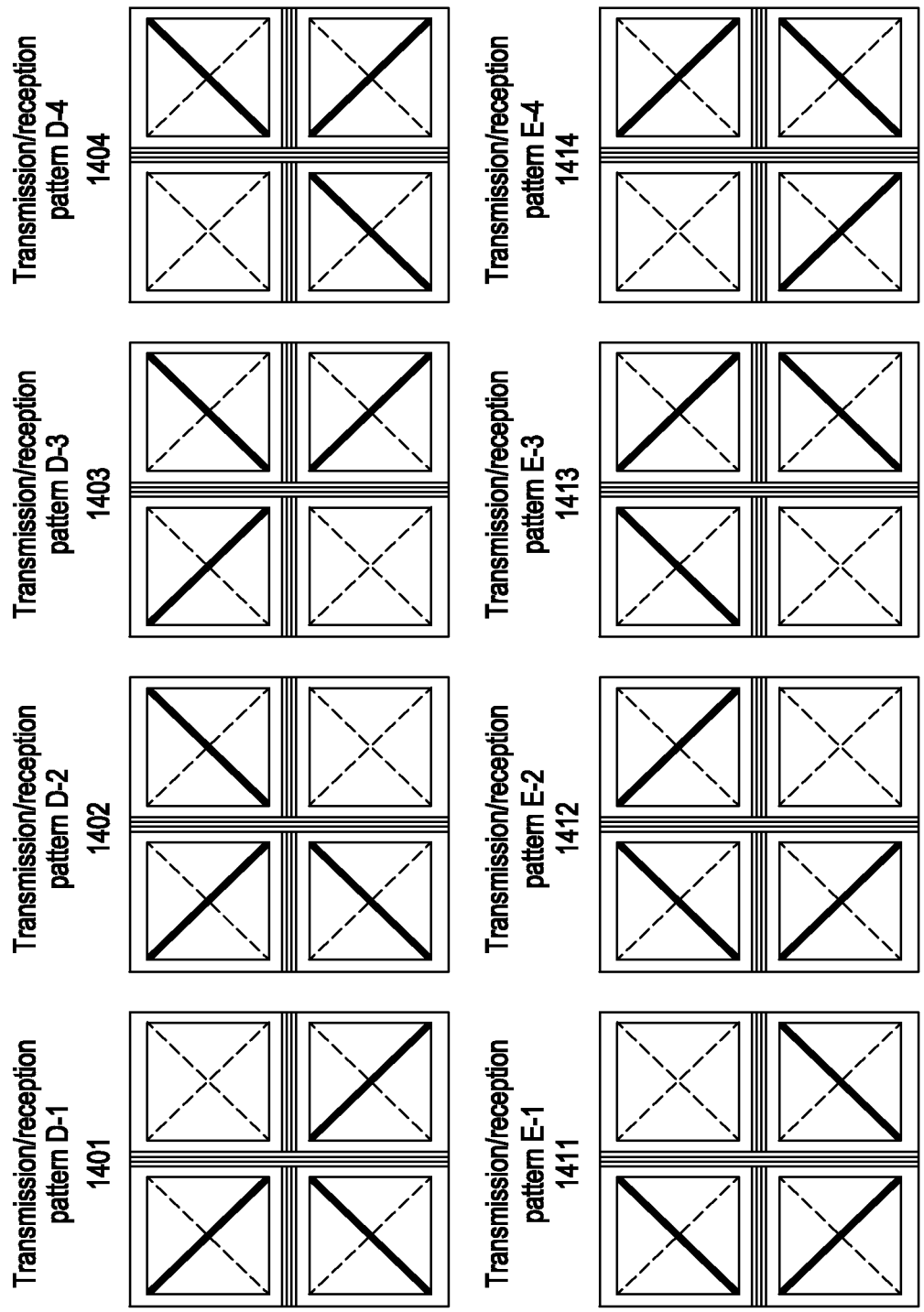
FIG. 14 illustrates an antenna configuration for transmission or reception using cross-poles in the antenna panel of FIG. 9, according to an embodiment.

FIG. 14 illustrates an antenna configuration for transmission or reception using cross-poles in the antenna panel of FIG. 9, according to an embodiment. In particular, FIG. 14 illustrates an operation for supporting a 3 antenna technique (3T3R). In FIG. 14, the transmission/reception patterns 1401, 1402, 1403, and 1404 represented as transmission/reception patterns D-1 to D-4, and the transmission/reception patterns 1411, 1412, 1413, and 1414 represented as transmission/reception patterns E-1 to E-4 have a structure in which among upper and lower antenna panels, which are four antenna panels in total, three antenna groups are combined to perform transmission or reception, respectively. For transmission or reception in the antenna structure of FIGS. 10 and 11, the antenna panel used for transmission or reception and the polarization direction of the antenna used in each antenna panel should be selected. In other words, the antenna group described in connection with FIG. 9 should be determined and operated. For example, in the case of 3 antenna (3T) transmission or reception, three of eight antenna groups may be selected to perform transmission or reception. In FIG. 14, the antenna group represented as a solid line is one antenna group bundled up for 3T transmission or reception. The antenna group represented as a dashed line is an antenna group that does not consider transmission or reception in the corresponding transmission/reception pattern. A total of $_8C_3=56$ transmission or reception patterns, including the transmission or reception patterns shown may be taken into consideration. However, the transmission or reception patterns are ones that may obtain more gains in light of performance among the 56 patterns.

In FIG. 14, the antenna groups bundled up into the transmission/reception pattern may be used independently or in combination. In this case, the antenna group combination may be used for the purpose of scheduling multiple UEs upon configuring a half-duplex operation as in embodiment 2. Further, the antenna group combination may be used to support a full-duplex operation as in embodiment 3. The antenna group combination may also be used for uplink/downlink transmission, with the band split as in embodiment 4.

With reference to FIG. 14, an example of the transmission/reception pattern combination is as follows. In the case of 3T3R transmission to the maximum, if only one UE is simultaneously scheduled and used, the base station may perform transmission using only one of the transmission/reception patterns. If the optimal beam that may be received by the UE has several directions, although one UE is scheduled, several of the base station transmission/reception patterns may be combined and used. In this case, each transmission/reception pattern may be operated, with each transmission/reception beam form configured. Further, one transmission/reception pattern may be allocated to each of multiple UEs. The same transmission/reception pattern may be used for multiple UEs to perform transmission.

When one UE is considered, transmission/reception pattern D-1 1401 may be allocated to the UE to perform transmission/reception. Transmission/reception patterns D-1 1401 and E-1 1411 may be allocated to the UE to perform transmission/reception.

When multiple UEs are considered, transmission/reception pattern D-1 1401 may be allocated to several UEs to perform transmission/reception. Transmission/reception patterns D-1 1401 and E-1 1411 may be allocated to several UEs to perform transmission/reception. Transmission/reception patterns D-1 and E-1, respectively, may be allocated to the UEs. Transmission/reception patterns D-1 and E-1 may be shared by each UE. Some transmission/reception patterns may be shared by the UEs, and the rest of the transmission/reception patterns may be distributed to the UEs.

Figure 15:
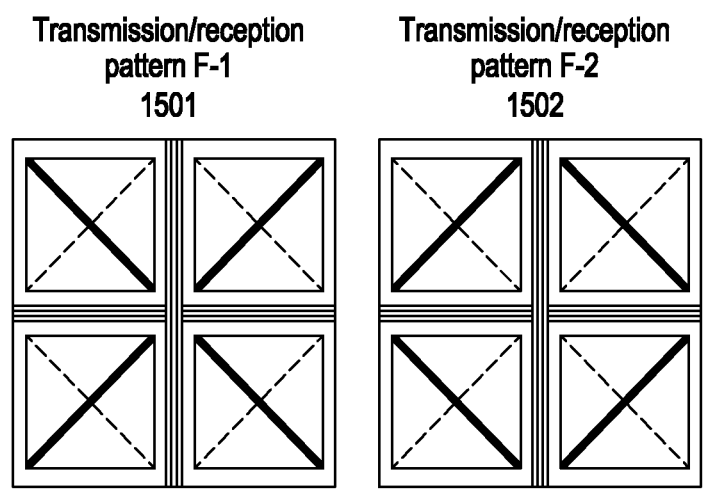
FIG. 15 illustrates an antenna configuration for transmission or reception using cross-poles in the antenna panel of FIG. 9, according to an embodiment.

FIG. 15 illustrates an antenna configuration for transmission or reception using cross-poles in the antenna panel of FIG. 9, according to an embodiment. In particular, FIG. 15 illustrates an operation for supporting 4T4R. For transmission or reception in the antenna structure of FIGS. 10 and 11, the antenna panel used for transmission or reception and the polarization direction of the antenna used in each antenna panel should be selected. In other words, the antenna group described in connection with FIG. 9 should be determined and operated. For example, in the case of 4 antenna (4T) transmission or reception, four of eight antenna groups may be selected to perform transmission or reception. In FIG. 15, the antenna group represented as a solid line is one antenna group bundled up for 4T transmission or reception. The antenna group represented as a dashed line is an antenna group that does not consider transmission or reception in the corresponding transmission/reception pattern. A total of 8C4=70 transmission or reception patterns, including the transmission or reception patterns shown may be taken into consideration. However, the transmission or reception patterns are patterns that may obtain improved gains based on performance among the 70 patterns.

In FIG. 15, the antenna groups bundled up into the transmission/reception pattern may be used independently or in combination. In this case, The antenna group combination may be used for the purpose of scheduling multiple UEs upon configuring a half-duplex operation as in embodiment 2. Further, the antenna group combination may be used to support a full-duplex operation as in embodiment 3. The antenna group combination may also be used for uplink/downlink transmission, with the band split as in embodiment 4.

With reference to FIG. 15, an example of the transmission/reception pattern combination is as follows. In the case of 4T4R transmission to the maximum, if only one UE is simultaneously scheduled and used, the base station may perform transmission using only one of the transmission/reception patterns. If the optimal beam that may be received by the UE has several directions, although one UE is scheduled, several of the base station transmission/reception patterns may be combined and used. In this case, each transmission/reception pattern may be operated, with each transmission/reception beam form configured. Further, one transmission/reception pattern may be allocated to each of multiple UEs. The same transmission/reception pattern may be used for multiple UEs to perform transmission.

When one UE is considered, transmission/reception pattern F-1 1501 may be allocated to the UE to perform transmission/reception. Transmission/reception patterns F-1 1501 and F-2 1502 may be allocated to the UE to perform transmission/reception.

When multiple UEs are considered, transmission/reception pattern F-1 may be allocated to several UEs to perform transmission/reception. Transmission/reception patterns F-1 and F-2 may be allocated to several UEs to perform transmission/reception. Transmission/reception patterns F-1 and F-2, respectively, may be allocated to the UEs. Transmission/reception patterns F-1 and F-2 may be shared by each UE. Some transmission/reception patterns may be shared by the UEs, and the rest of the transmission/reception patterns may be distributed to the UEs.

Figure 16:
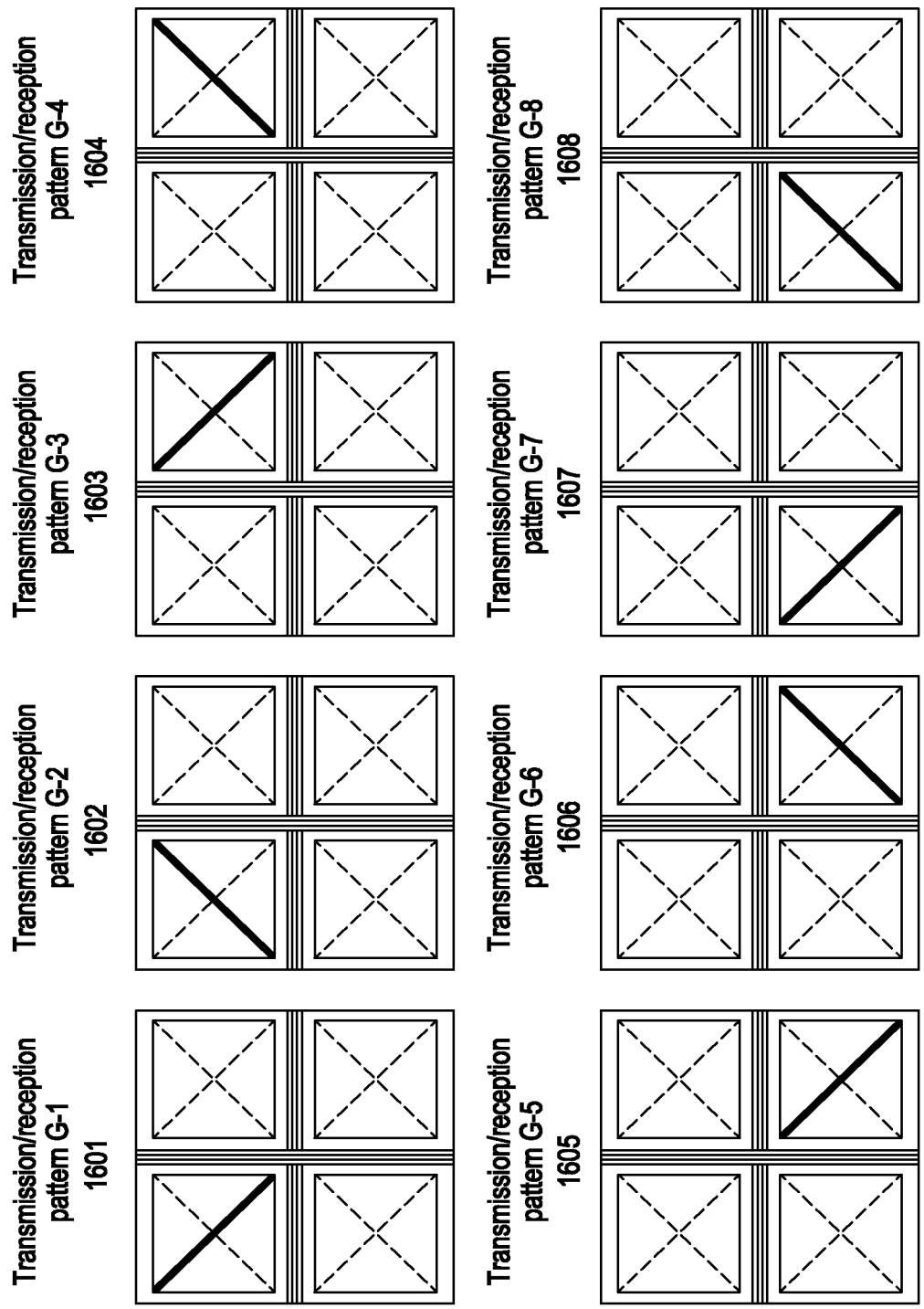
FIG. 16 illustrates an antenna configuration for transmission or reception in the antenna panel of FIG. 9, according to an embodiment.

FIG. 16 illustrates an antenna configuration for transmission or reception in the antenna panel of FIG. 9, according to an embodiment. In particular, FIG. 16 illustrates an operation for supporting 1T1R. The transmission/reception patterns G-1 to G-8 1601 to 1608 have a structure in which among upper and lower antenna panels, which are four antenna panels in total. For the configuration of FIG. 16, the antenna group described in connection with FIG. 9 should be determined and operated. For example, in the case of one antenna (1T) transmission or one antenna (1R) reception, one of eight antenna groups may be selected to perform transmission or reception. In FIG. 16, the antenna group represented as a solid line is an antenna group for 1T transmission or 1R reception. The antenna group represented as a dashed line is an antenna group that does not consider transmission or reception in the corresponding transmission/reception pattern. In the figure, a total of $_8C_1=8$ transmission or reception patterns are considered.

In FIG. 16, the antenna groups bundled up into the transmission/reception pattern may be used independently or in combination. In this case, The antenna group combination may be used for the purpose of scheduling multiple UEs upon configuring a half-duplex operation as in embodiment 2. Further, the antenna group combination may be used to support a full-duplex operation as in embodiment 3. The antenna group combination may also be used for uplink/ downlink transmission, with the band split as in embodiment 4.

With reference to FIG. 16, an example of the transmission/reception pattern combination is as follows. In the case of 1T1R transmission to the maximum, if only one UE is simultaneously scheduled and used, the base station may perform transmission using only one of the transmission/ reception patterns. If the optimal beam that may be received by the UE has several directions, although one UE is scheduled, several of the base station transmission/reception patterns may be combined and used. In this case, each transmission/reception pattern may be operated, with each transmission/reception beam form configured. Further, one transmission/reception pattern may be allocated to each of multiple UEs. The same transmission/reception pattern may be used for multiple UEs to perform transmission.

For example, when one UE is considered, transmission/ reception pattern G-1 1601 may be allocated to the UE to perform transmission/reception. Transmission/reception patterns G-1 1601 and G-2 1602 may be allocated to the UE to perform transmission/reception.

When multiple UEs are considered, transmission/reception pattern G-1 may be allocated to several UEs to perform transmission/reception. Transmission/reception patterns G-1 and G-2 may be allocated to several UEs to perform transmission/reception. Transmission/reception patterns G-1 and G-2, respectively, may be allocated to the UEs. Transmission/reception patterns G-1 and G-2 may be shared by each UE. Some transmission/reception patterns may be shared by the UEs, and the rest of the transmission/reception patterns may be distributed to the UEs.

The configuration methods shown in FIGS. 12 and 16 may be combined and used. For example, in the case of transmission/reception pattern A-1 of FIG. 12 and transmission/reception pattern G-3 of FIG. 16, no antenna group is shared, so that they may be combined to perform 3T3R transmission. Further, pattern A-1 may be used for transmission, and pattern G-3 may be used for reception. A detailed example thereof is described in connection with embodiment 2, embodiment 3, and embodiment 4.

Embodiment 2 concerns a method for scheduling multiple UEs upon configuring a half-duplex operation through an antenna combination of embodiment 1.

Figure 17:
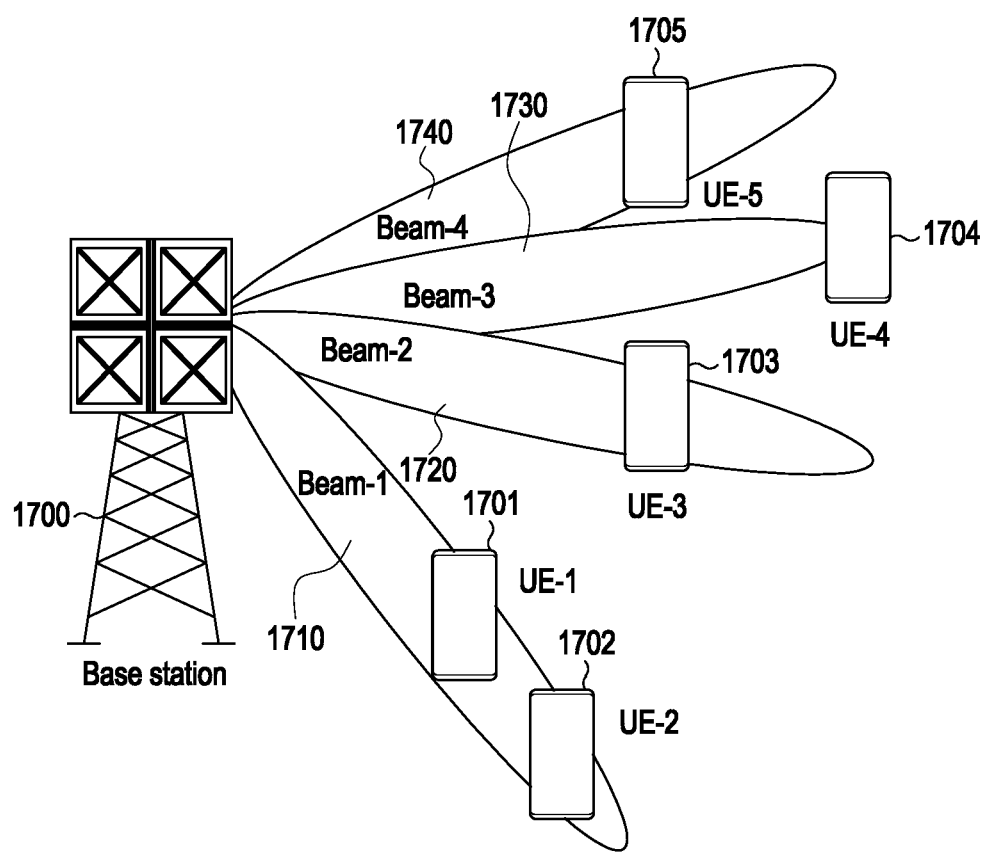
FIG. 17 illustrates a UE and a base station scheduling multiple UEs, according to an embodiment.

FIG. 17 illustrates a UE and a base station upon scheduling multiple UEs, according to an embodiment.

Referring to FIG. 17, if multiple UEs 1701, 1702, 1703, 1704, and 1705 receive information from one base station 1700 or transmit information to one base station 1700 as shown in FIG. 17, the base station 1700 may configure different beams 1710, 1720, 1730, and 1740 for the UEs and serve the different beams 1710, 1720, 1730, and 1740 to the UEs 1701, 1702, 1703, 1704, and 1705. Each beam may serve one or more UEs. To configure each different beam, a different antenna group should be configured and operated as described above in connection with embodiment 1. Included in this embodiment is a method for scheduling and operating a UE based on the antenna panel structure described in connection with embodiment 1.

Time division multiplexing (TDM), frequency division multiplexing (FDM), and/or spatial division multiplexing (SDM) may be used to schedule a plurality of UEs upon configuring a half-duplex operation.

Figure 18:
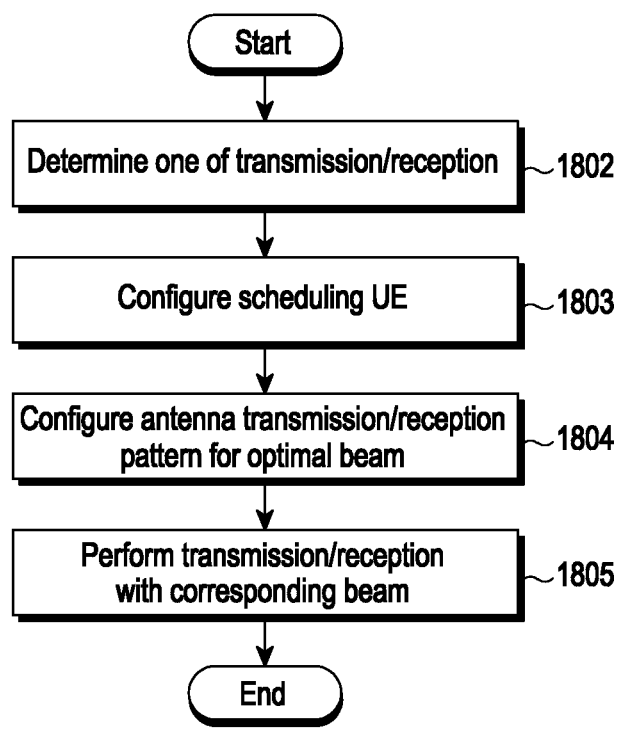
FIG. 18 illustrates a method for scheduling for a half-duplex operation, according to an embodiment.

FIG. 18 illustrates a method for scheduling upon a half-duplex operation, according to an embodiment. The transmission process of FIG. 18 may be considered when multiple UEs are scheduled and operated based on TDM, FDM, and/or SDM.

Referring to FIG. 18, the base station configures a UE to transmit or receive a signal at a corresponding time in step 1802. In step 1803, the UE is scheduled to communication with the base station (e.g., to communicate with the base station at a corresponding time among several UEs belonging to the base station). In general, one UE may be configured in an RB and, considering SDM, multiple UEs may be assigned to one RB. If using FDM, multiple UEs may be assigned to communicate at one time.

For FDM, an entire frequency band is split so that transmission/reception may be performed for several UEs. For example, referring to FIG. 17, when an entire bandwidth is 800 MHz, 400 MHz may be transmitted to UE-1 1701, and 400 MHz may be transmitted to UE-3 1703. In this case, since the optimal beam of UE-1 and the optimal beam of UE-3 differ from each other, for scheduling at the same time, different transmission/reception patterns of the base station 1700 may be used by configuring an antenna transmission/ reception pattern for an optimal beam in step 1804. In step 1805, transmission is performed with the optimal beam. For example, for UE-1 1701, transmission/reception pattern A-1 may be used to form beam-1 1710 and transfer it and, for UE 3 1703, transmission/reception pattern A-2 may be used to form beam 2 1720 and transfer it. In this case, a method for splitting RB units and transmitting them using FDM, and a method for splitting component carrier (CC) units and transmitting them using FDM is provided.

Receive a signal at a corresponding time means that the corresponding UE is able to receive data from the base station. Transmit a signal at a corresponding time means that the UE is able to transmit a signal to the base station.

Specifically, a configuration may be made according to the following process.

Figure 19:
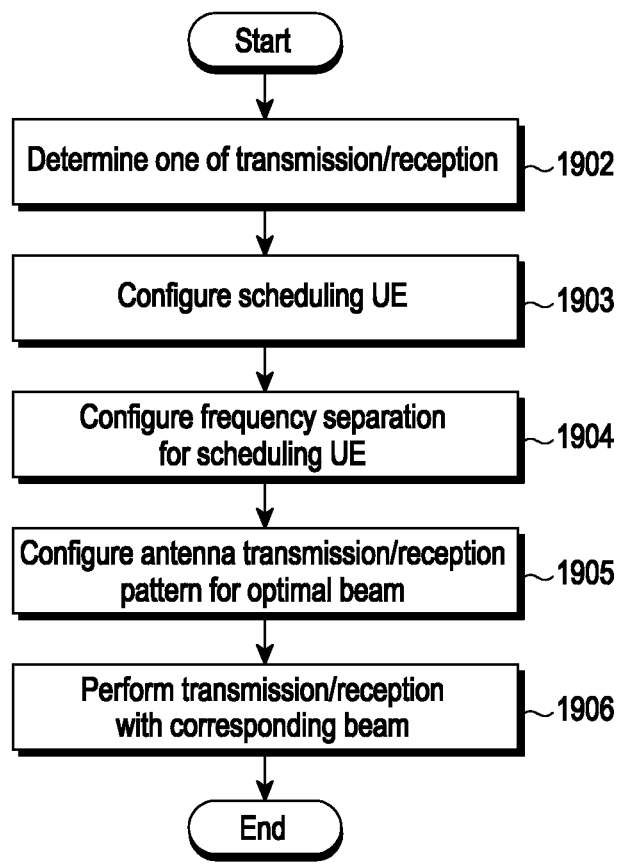
FIG. 19 illustrates a method for scheduling for a half-duplex operation, according to an embodiment.

FIG. 19 illustrates a method for scheduling upon a half-duplex operation, according to an embodiment. As shown in FIG. 19, if the UE receives information using FDM, multiple UEs may be configured, and transmission or reception is performed at a given time. If only a half-duplex configuration is supported, the base station determines only one of transmission or reception and performs it. Therefore, referring to FIG. 19, the base station determines an operation of either transmission or reception in step 1902. Then, the base station configures a UE group scheduled at the same time in step 1903. If multiple UEs are configured as a scheduling UE group, the base station distributes frequencies suitable for the UEs by configuring frequency separation in step 1904. For example, if four UEs are simultaneously scheduled, the entire bandwidth may be split by ¼. Or, the entire bandwidth may be unevenly split and used depending on priority. Thereafter, the base station configures an antenna transmission/reception pattern according to each UE in step 1905. Configuring (e.g., determining) an antenna transmission/reception pattern means that when each UE performs transmission/reception by 2T2R, the transmission/reception pattern to service each UE is determined as the transmission/ reception pattern of FIG. 12 or 13. If 1T1R, 3T3R, or 4T4R is considered, the transmission/reception pattern described above in connection with embodiment 1 is mapped. After the transmission/reception pattern to service each UE is mapped, the base station configures a beam pattern for the UE in each transmission/reception pattern and performs transmission/reception in step 1906. As in the above-described example, since the optimal beam for each UE may differ from UE to UE, a different transmission/reception beam may be allocated to each UE-configured bandwidth.

SDM and use a UE means that an entire frequency band is split so that transmission/reception may be performed for several UEs. For example, referring to FIG. 17, when an entire bandwidth is 800 MHz, 800 MHz may be transmitted to UE-1 1701, and 800 MHz may be transmitted to UE-3 1703. In this case, since the optimal beam of UE-1 and the optimal beam of UE-3 differ from each other, for scheduling at the same time, different transmission/reception patterns of the base station may be used to perform transmission. For example, for UE-1 1701, transmission/reception pattern A-1 may be used to form beam-1 1710 and transfer it and, for UE 3 1703, transmission/reception pattern A-2 may be used to form beam 2 1720 and transfer it.

Specifically, a configuration may be made according to the following process.

Figure 20:
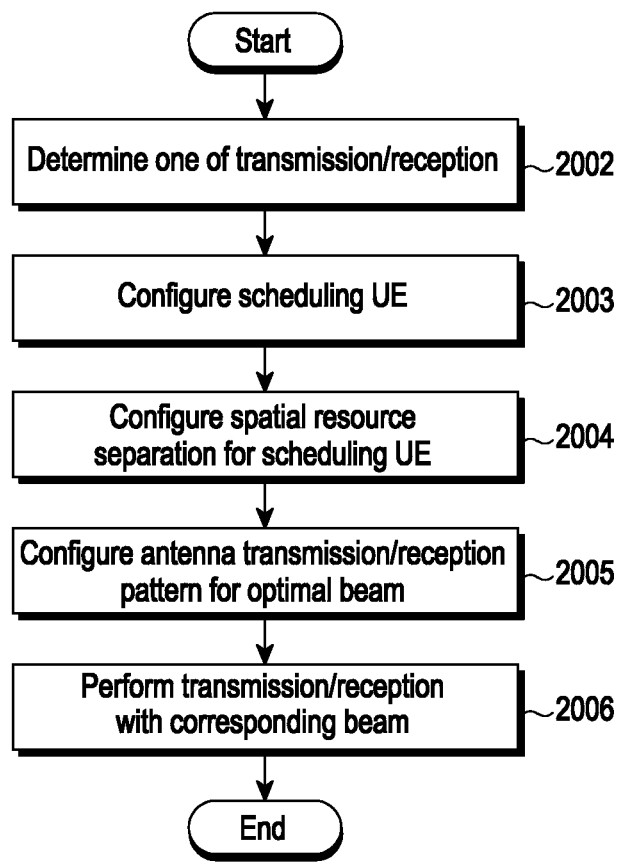
FIG. 20 illustrates a method for scheduling for a half-duplex operation, according to an embodiment.

FIG. 20 illustrates a method for scheduling for a half-duplex operation, according to an embodiment.

Referring to FIG. 20, if the UE receives information using SDM, multiple UEs may be configured, and transmission or reception is performed at the same time. If only a half-duplex configuration is supported, the base station determines only either transmission or reception at a given time and performs it. Accordingly, in step 2002, the base station determines an operation of either transmission or reception in step 2002. Then, the base station configures a UE group scheduled at the same time in step 2003. If multiple UEs are configured as a scheduling UE group, the base station distributes spatial resources suitable for the multiple UEs in step 2004. For example, if four UEs are simultaneously served by SDM, the base station may use different spatial resources and separate four UEs and perform transmission. Thereafter, the base station determines an antenna transmission/reception pattern according to each UE. Determining an antenna transmission/reception pattern means that when each UE performs transmission/reception by 2T2R, the transmission/reception pattern to service each UE is determined as the transmission/reception pattern of FIG. 12 or 13. If 1T1R, 3T3R, or 4T4R is considered, the transmission/reception pattern described above in connection with embodiment 1 is mapped. After the transmission/reception pattern to service each UE is mapped, the base station configures a beam pattern for the UE in each transmission/reception pattern in step 2005. As in the above-described example, since the optimal beam for each UE may differ from UE to UE, a different transmission/reception beam may be allocated to each UE-configured bandwidth, and transmission/reception is performed in step 2006.

The above-described TDM/FDM/SDM operation methods may be combined and used for multiple UEs. For example, when multiple UEs are present, several groups divided by TDM may be created and, among the groups, some may be divided by FDM and serviced while multiple UEs may be serviced by SDM.

Embodiment 3 concerns a method for scheduling multiple UEs for a full-duplex operation through an antenna combination of embodiment 1.

For example, when multiple UEs receive information from a base station or transmit information to a base station as shown in FIG. 17, the base station may configure a different beam for each UE and service the UEs. To configure each different beam, a different antenna group should be configured and operated as described above in connection with embodiment 1. Considered in this embodiment is a method for scheduling and operating a UE based on the antenna panel structure described in connection with embodiment 1. To support a full-duplex operation of the base station in addition to embodiment 2, the following restrictions should be considered for inter-antenna self-interference cancellation considered herein.

For example, for panels belonging to the same antenna panel, either transmission or reception should be determined, and the same operation should be performed. For example, this is described with reference to FIG. 9. When antenna group 1 910 is determined for transmission, antenna group 2 920 should perform transmission. However, other antenna groups 3 to 8 930, 940, 950, 960, 970, and 980 may be operated regardless of the configuration of antenna group 1. This is why an antenna self-interference function cannot be considered between antenna group 1 and antenna group 2. Accordingly, if there is no self-interference function for each antenna group, transmission/reception should be operated in the same direction.

To schedule multiple UEs for a full-duplex operation, TDM, FDM, and SDM may be considered.

Figure 21:
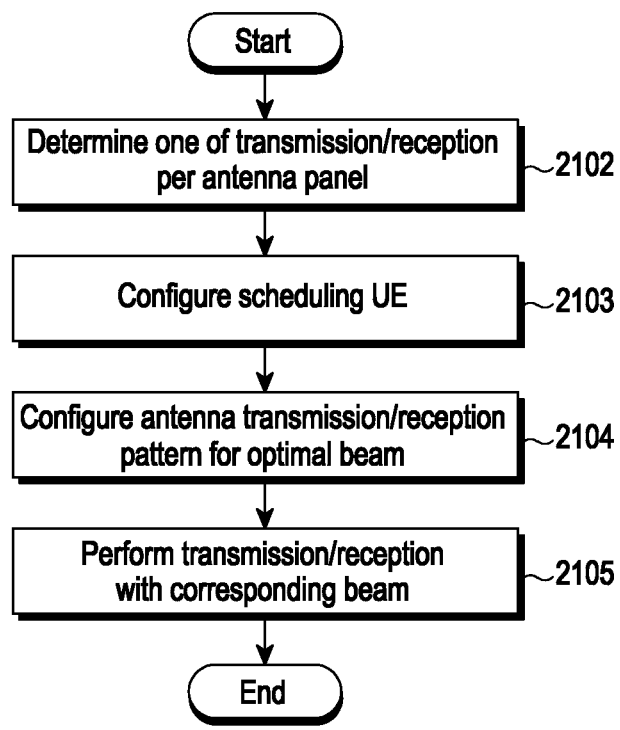
FIG. 21 illustrates a method for scheduling for an uplink/downlink simultaneous operation using a full-duplex or another band, according to an embodiment.

FIG. 21 illustrates a method for scheduling for an uplink/downlink simultaneous operation using a full-duplex or another band, according to an embodiment. The transmission process of FIG. 21 may be considered when multiple UEs are scheduled and operated based on TDM/FDM/SDM. FIG. 21 illustrates determining an antenna panel used for transmission or reception in step 2102, configuring a UE to be scheduled in step 2103, configuring an antenna pattern for the optimal beam upon transmission or reception for each UE in step 2104, and performing transmission or reception with the corresponding beam in step 2105.

The base station configures a UE to receive or transmit a signal at a corresponding time. Configure a UE means configuring a UE to communicate with the base station at a corresponding time from among several UEs belonging to the base station. In general, one UE may be configured in an RB and, considering SDM, multiple UEs may be assigned to one RB. If operated based on FDM, multiple UEs may be assigned to one time and operated. Receive a signal at a corresponding time means that the corresponding UE is able to receive data from the base station. Transmit a signal at a corresponding time means that the UE is able to transmit a signal to the base station.

UEs using FDM means that an entire frequency band is split so that transmission/reception may be performed for several UEs. For example, referring to FIG. 17, when an entire bandwidth is 800 MHz, 400 MHz may be transmitted/received to UE-1 1701, and 400 MHz may be transmitted/received to UE-3 1703. In this case, since the optimal beam of UE-1 and the optimal beam of UE-3 differ from each other, for scheduling at the same time, different transmission/reception patterns of the base station may be used to perform transmission. For example, for UE-1, transmission/reception pattern A-1 may be used to form beam-1 1710 and transfer it and, for UE 3, transmission/reception pattern A-2 may be used to form beam 2 1720 and transfer it. In this case, operation methods using FDM include a method for splitting into RB units and transmitting them and a method for splitting into CC units and transmitting them. Further, since the base station supports a full-duplex operation, other panels may be used to support transmission or reception for UE 1 1701, UE 3 1703, UE 4 1704 and UE 5 1705. For example, if UE 1 and UE 3 receive downlink reception information, uplink transmission may be schedule for UE 4 and UE 5 using a different panel. Specifically, a configuration may be made according to the following process.

Figure 22:
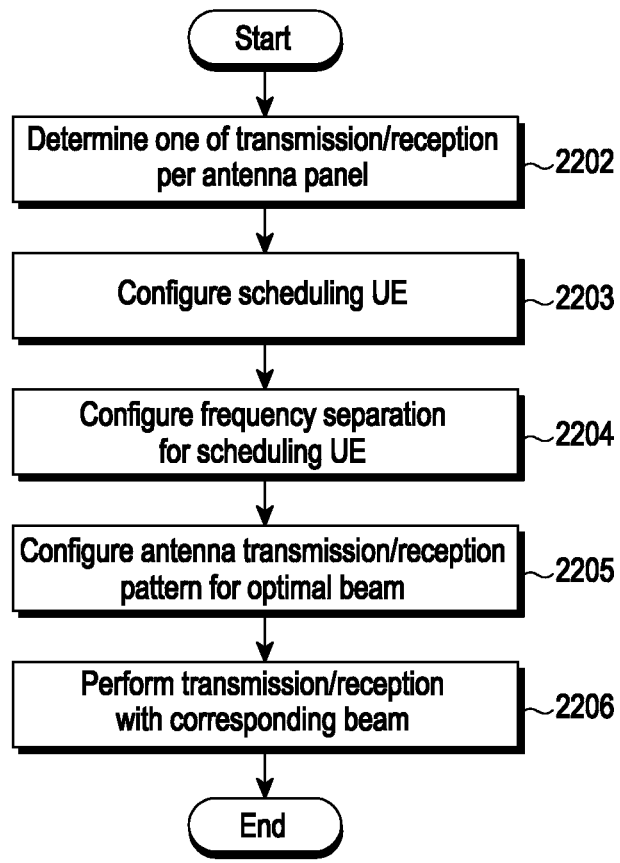
FIG. 22 illustrates a method for scheduling for an uplink/downlink simultaneous operation using a full-duplex or another band, according to an embodiment.

FIG. 22 illustrates a method for scheduling for an uplink/downlink simultaneous operation using a full-duplex or another band, according to an embodiment. As shown in FIG. 22, if the UE receives information based on FDM, multiple UEs may be configured, and transmission or reception is performed at the same time. In the case where full-duplex is supported, the base station determines transmission or reception for each panel and performs it.

Referring to FIG. 22, the base station determines one operation of transmission/reception for each antenna panel in step 2202. Then, the base station configures a UE group scheduled at the same time in step 2203. If multiple uplink/downlink UEs are simultaneously configured as a scheduling UE group, the base station distributes frequencies according to demand of each UE in step 2204. For example, if two UEs are simultaneously downlink-scheduled, the entire bandwidth may be split in half and used. Additionally, the entire bandwidth may be unevenly split and used depending on priority. Further, if two UEs are simultaneously uplink-scheduled, the entire bandwidth may be split in half and used. In addition, the entire bandwidth may be unevenly split and used depending on priority. In this case, the uplink UE and the downlink UE may use the same frequency.

Thereafter, the base station configures an antenna transmission/reception pattern according to each UE in step 2205. Configuring (e.g., determining) an antenna transmission/reception pattern means that when each UE performs transmission/reception by 2T2R, the transmission/reception pattern to service each UE is determined as the transmission/reception pattern of FIG. 12 or 13. If 1T1R, 3T3R, or 4T4R is used, the transmission/reception pattern described above in connection with embodiment 1 is mapped. After the transmission/reception pattern to service each UE is mapped, the base station configures a beam pattern for the UE in each transmission/reception pattern. As in the above-described example, since the optimal beam for each UE may differ from UE to UE, a different transmission/reception beam may be assigned to each UE-configured bandwidth, and transmission/reception is performed in step 2206.

What UEs transmit information using SDM, an entire frequency band is split so that transmission/reception may be performed for several UEs. For example, referring to FIG. 17, when an entire bandwidth is 800 MHz, 800 MHz may be transmitted to UE-1 1701, and 800 MHz may be transmitted to UE-3 1703. In this case, since the optimal beam of UE-1 and the optimal beam of UE-3 differ from each other, for scheduling at the same time, different transmission/reception patterns of the base station may be used to perform transmission. For example, for UE-1, transmission/reception pattern A-1 may be used to form beam-1 1710 and transfer it and, for UE 3, transmission/reception pattern A-2 may be used to form beam 2 1720 and transfer it.

Figure 23:
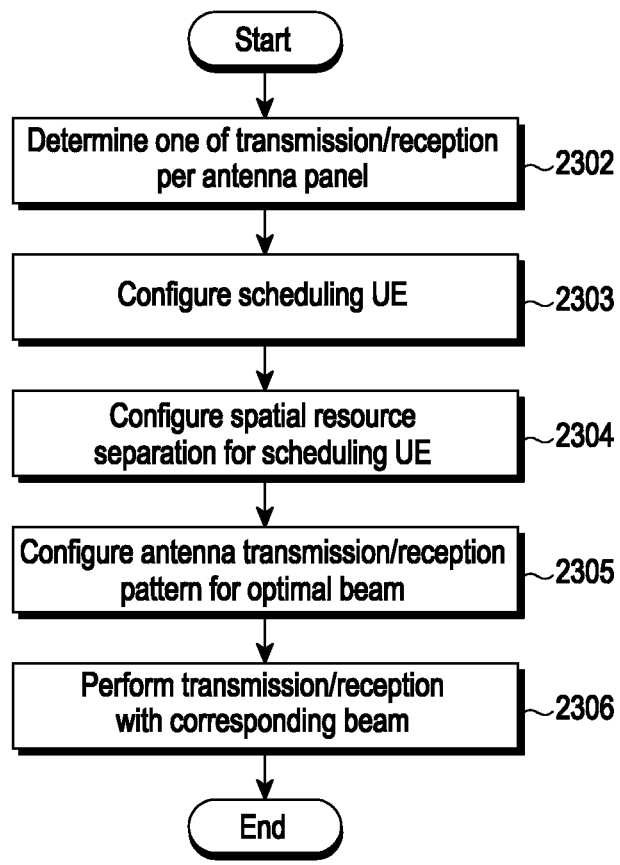
FIG. 23 illustrates a method for scheduling for an uplink/downlink simultaneous operation using a full-duplex or another band, according to an embodiment.

FIG. 23 illustrates a method for scheduling for an uplink/downlink simultaneous operation using a full-duplex or another band, according to an embodiment. As shown in FIG. 23, if the UE receives information using SDM, multiple UEs may be configured, and transmission or reception is performed at the same time. In the case where a full-duplex configuration is supported, the base station determines either transmission or reception for each panel and performs it.

Referring to FIG. 23, the base station determines an operation of transmission/reception for each antenna panel in step 2302. Then, the base station configures a UE group scheduled at the same time in step 2303. If multiple uplink/downlink UEs are simultaneously configured as a scheduling UE group, the base station may distribute spatial resources according to demand of each UE in step 2304. For example, if two UEs are simultaneously downlink-scheduled, all spatial resources may be split in half and used. Additionally, all spatial resources may be unevenly split and used depending on priority. Further, if two UEs are simultaneously uplink-scheduled, all spatial resources may be split in half and used. Or, all spatial resources may be unevenly split and used depending on priority. In this case, the uplink UE and the downlink UE may use the same frequency.

Thereafter, the base station configures an antenna transmission/reception pattern according to each UE in step 2305. Configuring (e.g., determining) an antenna transmission/reception pattern means that when each UE performs transmission/reception by 2T2R, the transmission/reception pattern to service each UE is determined as the transmission/reception pattern of FIG. 12 or 13. If 1T1R, 3T3R, or 4T4R is considered, the transmission/reception pattern described above in connection with embodiment 1 is mapped. After the transmission/reception pattern to service each UE is mapped, the base station configures a beam pattern for the UE in each transmission/reception pattern. As in the above-described example, since the optimal beam for each UE may differ from UE to UE, a different transmission/reception beam may be assigned to each UE-configured bandwidth, and transmission/reception is performed in step 2306.

The above-described TDM/FDM/SDM operation methods may be combined and used for multiple UEs. For example, when multiple UEs are present, several groups divided by TDM may be created and, among the groups, some may be divided by FDM and serviced while multiple UEs may be serviced by SDM.

Embodiment 4 concerns a method for scheduling multiple UEs for an uplink/downlink simultaneous operation, with the band split through the antenna combination of embodiment 1.

When multiple UEs receive information from a base station or transmit information to a base station as shown in FIG. 17, the base station may configure a different beam for each UE and service the UEs. To configure a different beam for each UE, a different antenna group should be configured and operated as described above in connection with embodiment 1. Considered in this embodiment is a method for scheduling and operating a UE based on the antenna panel structure described in connection with embodiment 1. To support uplink/downlink simultaneous operation of the base station, with the band split, in addition to embodiment 2, the following restrictions should be considered for inter-antenna self-interference cancellation considered herein.

For example, for panels belonging to the same antenna panel, either transmission or reception should be determined and performed. This operation is described with reference to FIG. 9. When antenna group 1 910 is determined as transmission, antenna group 2 920 should perform transmission. However, other antenna groups 3 930 to group 8 980 may be operated regardless of the configuration of antenna group 1. This is why an antenna self-interference function cannot be considered between antenna group 1 and antenna group 2. Accordingly, if there is no self-interference function for each antenna group, transmission/reception should be operated in the same direction.

To schedule multiple UEs for an uplink/downlink simultaneous operation with the band split, TDM/FDM/SDM may be considered.

The transmission process of FIG. 21 may be considered when multiple UEs are scheduled and operated using TDM/FDM/SDM. FIG. 21 illustrates the steps of determining whether to use transmission or reception for an antenna panel in step 2102; configuring a UE to be scheduled in step 2103; configuring an antenna pattern for the optimal beam upon transmission or reception for each UE in step 2104; and performing transmission or reception with the corresponding beam in step 2105.

The base station configures a UE to receive or transmit a signal at a corresponding time. Configure a UE means configuring a UE to communicate with the base station at a corresponding time from among several UEs belonging to the base station. In general, one UE may be configured in an RB and, considering SDM, multiple UEs may be assigned to one RB. If operated using FDM, multiple UEs may be assigned at a time and operated. Receive a signal at a corresponding time means that the corresponding UE is able to receive data from the base station. Transmit a signal at a corresponding time means that the UE is able to transmit a signal to the base station.

UEs using FDM means that an entire frequency band is split so that transmission/reception may be performed for several UEs. For example, referring to FIG. 17, when an entire bandwidth is 800 MHz, 400 MHz may be transmitted/received to UE-1 1701, and 400 MHz may be transmitted/received to UE-3 1703. In this case, since the optimal beam of UE-1 and the optimal beam of UE-3 differ from each other, for scheduling at the same time, different transmission/reception patterns of the base station may be used to perform transmission. For UE-1, transmission/reception pattern A-1 may be used to form beam-1 1710 and transfer it and, for UE 3, transmission/reception pattern A-2 may be used to form beam 2 1720 and transfer it. In this case, operation methods using FDM include a method for splitting information into RB units and transmitting RB units, and a method for splitting information into CC units and transmitting them. Further, since the base station supports a full-duplex operation, other panels may be used to support transmission or reception for UE 1 1701, UE 3 1703, UE 4 1704, and UE 5 1705. For example, if UE 1 and UE 3 receive downlink information, UE 4 and UE 5 may be scheduled to perform uplink transmission using a different panel.

If the UE receives information using FDM as shown in FIG. 22, multiple UEs may be configured, and transmission or reception is performed at the same time. In the case where a full-duplex configuration is supported, the base station determines only either transmission or reception for each panel and performs it. Referring to FIG. 22, the base station determines an operation of transmission/reception for each antenna panel in step 2202. Then, the base station configures a UE group scheduled at the same time in step 2203. If multiple uplink/downlink UEs are simultaneously configured as a scheduling UE group, the base station distributes frequencies according to a demand of each UE in step 2204. For example, if two UEs are simultaneously downlink-scheduled, the entire bandwidth may be split in half and used. Additionally, the entire bandwidth may be unevenly split and used depending on priority. Further, if two UEs are simultaneously uplink-scheduled, the entire bandwidth may be split in half and used. In addition, the entire bandwidth may be unevenly split and used depending on priority. In this case, the uplink UE and the downlink UE may use the same frequency.

Thereafter, the base station configures an antenna transmission/reception pattern according to each UE in step 2205. Configuring (e.g., determining) an antenna transmission/reception pattern means that when each UE performs transmission/reception by 2T2R, the transmission/reception pattern to service each UE is determined as the transmission/reception pattern of FIG. 12 or 13. If 1T1R, 3T3R, or 4T4R is considered, the transmission/reception pattern described above in connection with embodiment 1 is mapped. After the transmission/reception pattern to service each UE is mapped, the base station configures a beam pattern for the UE in each transmission/reception pattern. Since the optimal beam for each UE may differ from UE to UE, a different transmission/reception beam may be assigned to each UE-configured bandwidth when performing transmission/reception in step 2206.

UEs using SDM means that an entire frequency band is split so that transmission/reception may be performed for several UEs. For example, referring to FIG. 17, when an entire bandwidth is 800 MHz, 800 MHz may be transmitted to UE-1 1701, and 800 MHz may be transmitted to UE-3 1703. In this case, since the optimal beam of UE-1 and the optimal beam of UE-3 differ from each other, for scheduling at the same time, different transmission/reception patterns of the base station may be used to perform transmission. For example, for UE-1, transmission/reception pattern A-1 may be used to form beam-1 1710 and transfer it and, for UE 3, transmission/reception pattern A-2 may be used to form beam 2 1720 and transfer it.

FIG. 23 illustrates a method for scheduling for an uplink/downlink simultaneous operation using a full-duplex or another band, according to an embodiment.

If the UE receives information using SDM as shown in FIG. 23, multiple UEs may be configured, and transmission or reception is performed at the same time. In the case where an uplink/downlink simultaneous operation with the band split is supported, the base station determines either transmission or reception for each panel and performs it. Therefore, first, the base station determines one operation of transmission/reception for each antenna panel. Then, the base station configures a UE group scheduled at the same time. If multiple uplink/downlink UEs are simultaneously configured as a scheduling UE group, the base station may distribute spatial resources according to demand for each UE. For example, if two UEs are simultaneously downlink-scheduled, all spatial resources may be split by ½ and used. In addition, all spatial resources may be unevenly split and used depending on priority. Further, if two UEs are simultaneously uplink-scheduled, all spatial resources may be split in half and used. Additionally, all spatial resources may be unevenly split and used depending on priority. In this case, the uplink UE and the downlink UE may not use the same frequency.

Thereafter, the base station determines an antenna transmission/reception pattern according to each UE. Determining an antenna transmission/reception pattern means that when each UE performs transmission/reception by 2T2R, the transmission/reception pattern to service each UE is determined as the transmission/reception pattern of FIG. 12 or 13. If 1T1R, 3T3R, or 4T4R is considered, the transmission/reception pattern described above in connection with embodiment 1 is mapped. After the transmission/reception pattern to service each UE is mapped, the base station configures a beam pattern for the UE in each transmission/reception pattern. As in the above-described example, since the optimal beam for each UE may differ from UE to UE, a different transmission/reception beam may be assigned to each UE-configured bandwidth, and transmission/reception may be performed.

The above-described TDM/FDM/SDM operation methods may be combined and used for multiple UEs. For example, when multiple UEs are present, several groups divided by TDM may be created and, among the groups, some may be divided by FDM and serviced while multiple UEs may be serviced by SDM.

Described in connection with embodiment 5 is a method for measuring self-interference channel when several antenna panels are used to cancel self-interference and operate. This relates to a method for operating digital SIC for canceling self-interference that occurs between the antenna panels of the base station when multiple UEs are scheduled by the full-duplex operation according to embodiment 3 or an uplink/downlink simultaneous operation, with the band split, according to embodiment 4.

Figure 24:
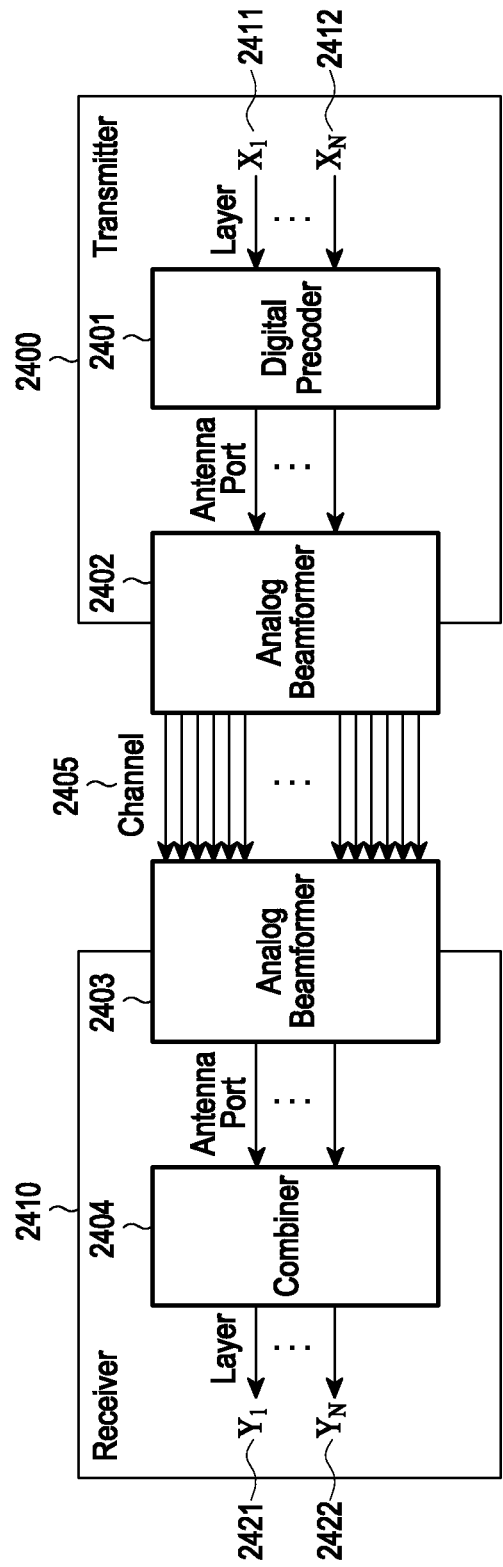
FIG. 24 illustrates a channel of self-interference, according to an embodiment.

FIG. 24 illustrates a channel of self-interference, according to an embodiment. In particular, FIG. 24 illustrates signal processing of a multi-antenna system using analog beamforming and multi-antenna technology by digital signal processing according to an embodiment.

FIG. 24 is a block diagram illustrating a transmitter 2400 and a receiver 2410 shown in FIGS. 10 and 11. Referring to FIG. 24, the transmitter 2400 of FIG. 24 is a transmitter that performs hybrid beamforming for a transmission beam using a digital precoder 2401 and an analog beamformer 2402. The receiver of FIG. 24 is a receiver that receives a transmission beam for carrying a transmission signal using a digital combiner 2404, which receives a signal for each antenna port, diversity-combines them, and outputs per-layer signals, and an analog beamformer 2403, which forms a reception beam. Although FIG. 24 illustrates that the receiver and the transmitter are separate components, the receiver and the transmitter may be included in one base station or may have connectivity therebetween. For example, they may be a transmitter and a receiver of an access unit (AU) for IAB and mobile terminate (MT) (IAB-MT) providing network access. The receiver and transmitter, respectively, may be a transmission end and a reception end included in one base station (or TAB node or IAB donor).

Referring to FIG. 24, the transmission end 2400 maps modulation symbols to a predetermined number (N) of layers, and the digital precoder 2401 may map the transmission signals $(X_1, \ldots, X_N)$ 2411, ..., 2412 of the N layers to P signals corresponding to P antenna ports. The analog beamformer 2402 assigns the precoded signals to P beams. The precoded signals are mapped to antenna ports which are virtual antennas.

As shown in FIG. 24, the signal generated by the transmitter is received, by the receiver, as the reception signals $(Y_1, \ldots, Y_N)$ 2421, ..., 2422 of N layers through the analog beamformer 2403 and the digital combiner 2404 via the channel 2405 As described above, the downlink transmission signal at the transmission end of the base station may cause self-interference when the reception end of the base station receives the uplink reception signal. In this case, the channel represented in FIG. 24 may be appreciated as a self-interference channel that causes self-interference between the transmission end and reception end in a base station and, for self-interference cancellation, precisely estimating the self-interference channel is needed.

Figure 25:
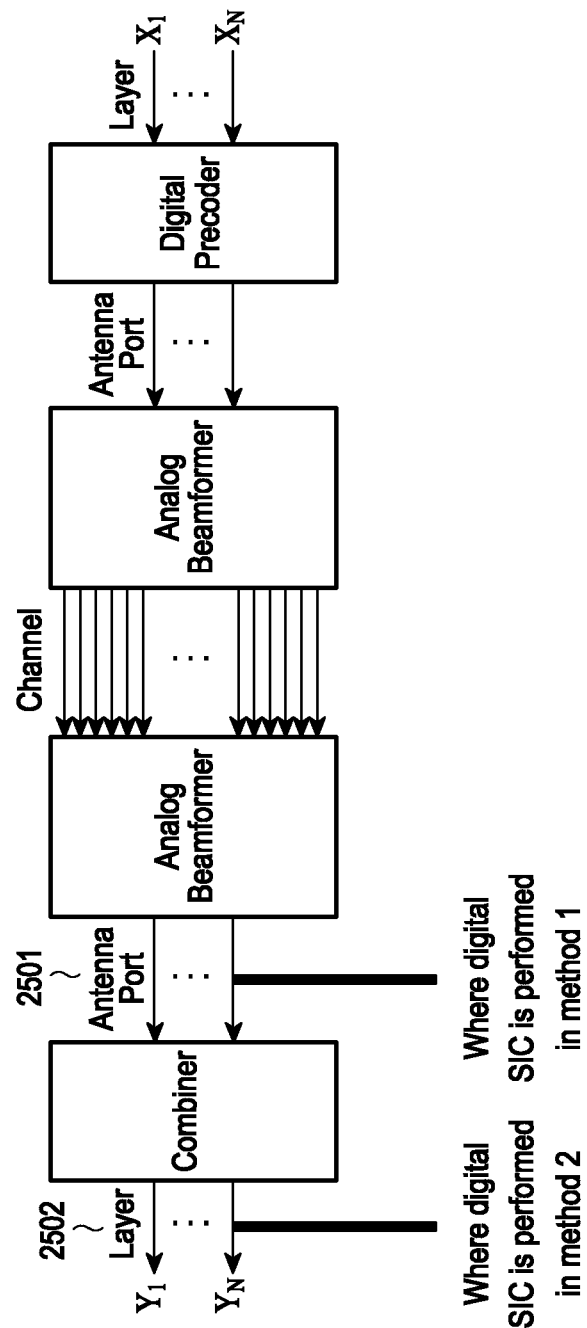
FIG. 25 illustrates a method of performing digital self-interference cancellation for a digital self-interference channel measurement, according to an embodiment.

FIG. 25 illustrates a method of performing digital self-interference cancellation for a digital self-interference channel measurement, according to an embodiment. The embodiment of FIG. 25 represents two methods exemplified depending on positions where digital self-interference cancellation is performed. The description of each component of FIG. 25 is identical to the description of FIG. 24.

The position of performing digital self-interference cancellation in the first method means that digital SIC at the antenna port level 2501 is performed. The antenna port level means canceling a self-interference signal from signals before the combiner 2404 of the reception end.

The position of performing digital self-interference cancellation in method 2 means that digital SIC at the layer level 2502 is performed. Performing digital SIC at the layer level means that digital SIC is performed after the signal passes through the combiner 2404 at the reception end. The operations of method 1 and method 2 are described below in detail with reference to the drawings.

Referring to FIG. 24, the transmission signals X 2411, ..., 2412 pass through the digital precoder $W_{D,TX}$ 2401, the transmission analog beamformer $W_{D,TX}$ 2402, the channel H 2405, the reception analog beamformer $W_{A,RX}$ 2403 and are combined through the digital combiner $W_{D,Rx}$ 2404 and received as Y 2421, ..., 2422. This process is expressed as Equation 4, below.

$$Y = W_{D,Rx} W_{A,RX} H W_{A,Tx} W_{D,TX} X \qquad \text{Equation 4}$$

Although not considered in Equation 4, interference and noise, generated upon reception, are components that should be considered for self-interference cancellation. However, these components are omitted for convenience of description.

As may be seen from the above equation, the channel $W_{A,RX} H W_{A,Tx}$ of the antenna port level 2501 and the channel $W_{D,Rx} W_{A,RX} H W_{A,Tx} W_{D,TX}$ of the antenna layer level 2502 both are varied in form if the components, e.g., self-interference channel, transmission analog beamformer, and reception analog beamformer, are changed. Therefore, the processes of methods 1 and 2, below, should be appreciated as newly performed if the analog beamformer or self-interference channel is varied.

Method 1 will now be described.

Figure 26:
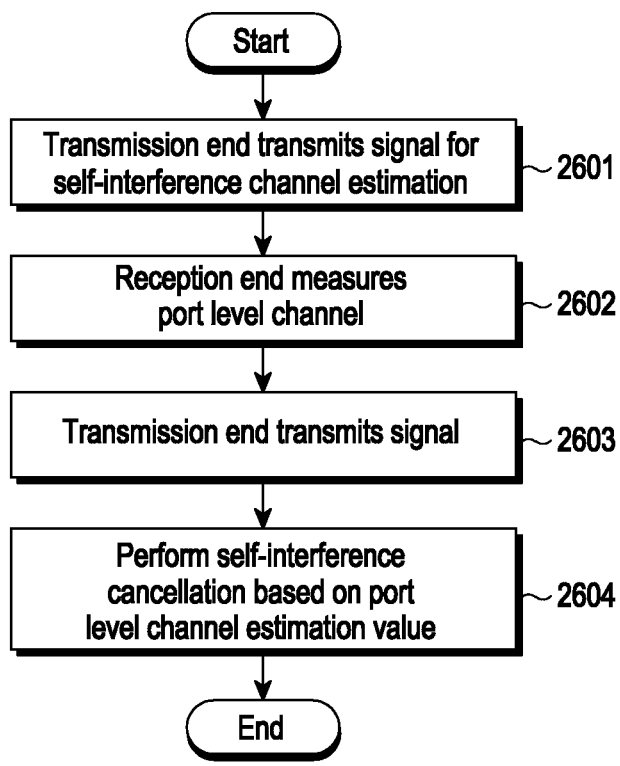
FIG. 26 illustrates an operation process for self-interference cancellation at an antenna port level, according to an embodiment.

FIG. 26 illustrates an operation process for self-interference cancellation at an antenna port level, according to an embodiment. Self-interference cancellation should be performed based on the self-interference signal and self-interference channel. Accordingly, the transmission end should transfer the self-interference signal to the reception end. The method of FIG. 26 may be performed by the base station (or an IAB node or IAB donor) including the transmission end and the reception end.

Referring to FIG. 26, the transmission end transmits a signal for self-interference channel estimation in step 2601. In step 2602, the channel is estimated at the antenna port level of the reception end. In step 2603, the transmission end transmits a signal. In step 2604, self-interference cancellation is performed based on the channel estimation value at the antenna port level.

Specifically, in step 2601 of FIG. 26, the transmission end transfers the signal $W_{D,TX}X$, which has passed through the digital precoder, as a signal for self-interference channel estimation, to the reception end. In step 2602, the antenna reception end estimates the self-interference channel based on the $W_{D,TX}X$ signal and the received signal Y as in Equation 4. In this case, the self-interference channel estimates the channel $W_{A,RX} H W_{A,Tx}$ of the signal that has passed through the analog beamformer of the reception end and the analog beamformer of the transmission end. For convenience of description, channel $W_{A,RX} H W_{A,Tx}$ is denoted as $H_{AP}$.

To estimate the reception signal Y and the transmission signal $W_{D,TX}X$, an inverse matrix for channel estimation should be obtained. For example, to estimate the reception signal $W_{D,RX}^{-1}Y$ seen at the antenna port level, the reception signal should be multiplied by the inverse matrix of the reception digital combiner. In this process, an inverse matrix for estimating the reception signal should be obtained. Further, to estimate the channel from $W_{D,RX}^{-1}Y$ and the transmission signal $W_{D,TX}X$, the inverse matrix $(W_{D,TX}X)^{-1}$ of $W_{D,TX}X$ should be obtained. By the above-described process, it is possible to estimate the channel $\dot{H}_{AP}$ of the signal that has passed through the analog beamformer of the reception end and the analog beamformer of the transmission end.

In the above process, X and Y should be appreciated as matrixes composed of several signals for channel estimation while several channels are not changed. When 2T2R is applied to select two antenna groups from among multiple antenna groups and perform transmission, and select two antenna groups from among multiple antenna groups and perform reception, two or more signals may be gathered to constitute X and Y, thereby performing channel estimation. When 4T4R is applied to select four antenna groups from among multiple antenna groups and perform transmission, and select four antenna groups from among multiple antenna groups and perform reception, four or more signals may be gathered to constitute X and Y, thereby performing channel estimation.

Thereafter, in step 2603 of FIG. 26, the reception end of the base station receives the self-interference signal $W_{D,TX}X'$ from the transmission end to cancel self-interference when the transmission end of the base station transmits a signal. In this case, the reception end may estimate/reproduce the self-interference signal using the estimated channels $\dot{H}_{AP}$ and $W_{D,TX}X$.

In step 2604 of FIG. 26, the reception end performs self-interference cancellation from the reception signal using the estimated self-interference channel signal.

Figure 27:
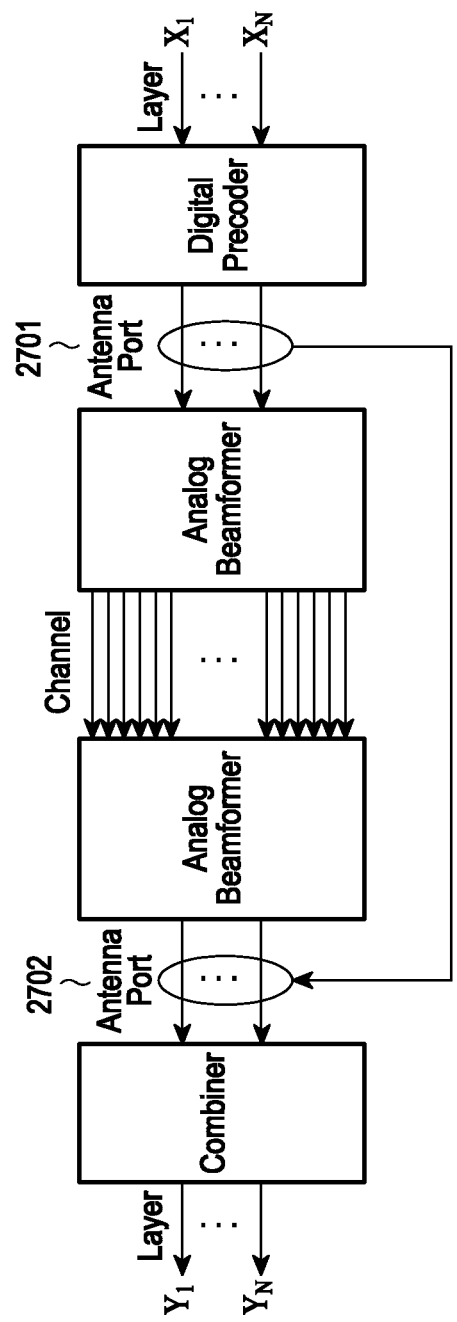
FIG. 27 illustrates an antenna port level view of a direction of transferring a self-interference signal from a transmitter to a receiver, according to an embodiment.

FIG. 27 illustrates an antenna port level view of a direction of transferring a self-interference signal from a transmitter to a receiver (e.g., method 1), according to an embodiment.

Referring to FIG. 27, the port level transmission unit self-interference signal may be transferred to the reception unit. FIG. 27 illustrates a process in which the self-interference signal of the antenna port level 2701 after the digital precoder 2401 of the transmission end is transferred to the antenna port level 2702 before the combiner 2404 of the reception unit.

Method 2 will now be described.

Figure 28:
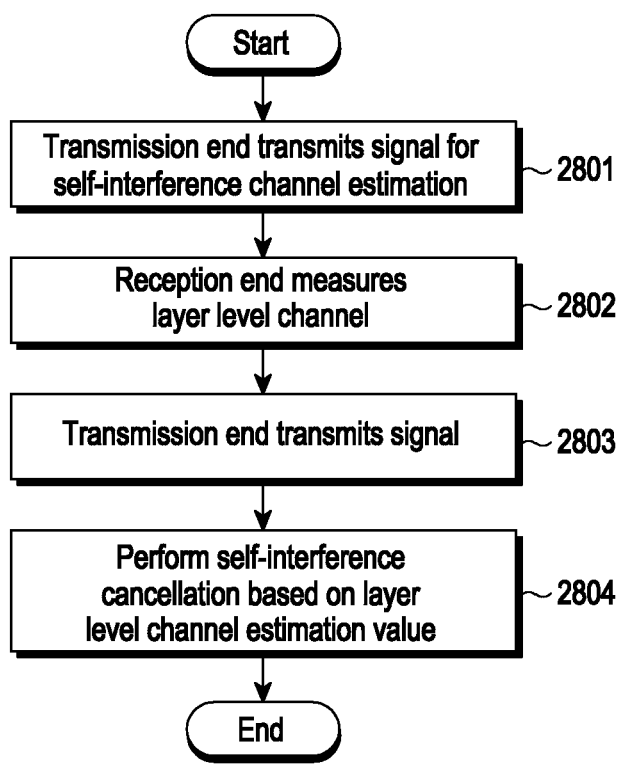
FIG. 28 illustrates an operation process for self-interference cancellation at a layer level, according to an embodiment.

FIG. 28 illustrates an operation process for self-interference cancellation at a layer level, according to an embodiment. Self-interference cancellation should be performed based on the self-interference signal and self-interference channel. Accordingly, the transmission end should transfer the self-interference signal to the reception end. The method of FIG. 28 may be performed by the base station (or an IAB node or IAB donor) including the transmission end and the reception end.

Referring to FIG. 28, the transmission end transmits a signal for self-interference channel estimation in step 2801. In step 2802, the channel is measured at the layer level of the reception end. In step 2803, the transmission end transmits a signal. In step 2804, self-interference cancellation is performed based on the channel estimation value at the layer level.

Figure 29:
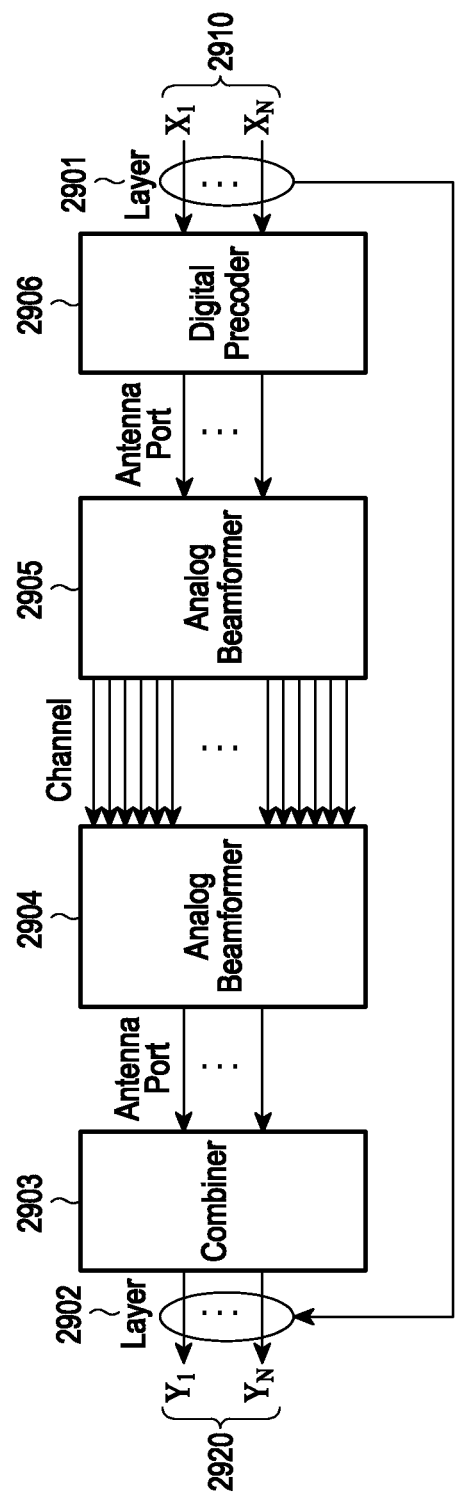
FIG. 29 illustrates a direction of transferring a self-interference signal from a transmitter to a receiver, according to an embodiment.

FIG. 29 illustrates a direction of transferring a self-interference signal from a transmitter to a receiver (e.g., method 2), according to an embodiment.

Referring to FIG. 29, the transmission end 2901 transfers X 2910 to the reception end 2902. The reception end may estimate the self-interference channel based on the x signal and the received signal Y 2920. In this case, the estimated self-interference channel estimates the channel $W_{D,Rx}W_{A,Rx}H\ W_{A,Tx}W_{D,Tx}$ including the analog beamformer 2904 of the reception end, the digital combiner 2903, the analog beamformer 2905 of the transmission end, and the digital precoder 2906. In the following description, for convenience of description, the channel $W_{D,Rx}W_{A,Rx}H\ W_{A,Tx}W_{D,Tx}$ is denoted as $H_{LA}$.

To estimate the reception signal Y 2920 and the transmission signal X 2910, an inverse matrix for channel estimation should be obtained. To estimate channel from Y and the transmission signal X, the inverse matrix $(X)^{-1}$ of X should be obtained. Through the above-described process, the interference channel may estimate the channel $\dot{H}_{LA}$ including the analog beamformer of the reception end, the digital combiner, the analog beamformer of the transmission end, and the digital precoder.

In the above process, X and Y should be appreciated as matrixes composed of several signals for channel estimation while several channels are not changed. For example, in the case of 2T2R transmission, two or more signals are gathered to constitute X and Y, thereby performing channel estimation. For example, in the case of 4T4R transmission, four or more signals are gathered to constitute X and Y, thereby performing channel estimation.

Thereafter, in step 2803 of FIG. 28, for example, the reception end of the base station receives the self-interference signal X' from the transmission end to cancel self-interference when the transmission end of the base station transmits a signal. In this case, the reception end may estimate/reproduce the self-interference signal using the estimated channels $\dot{H}_{LA}$ and X.

In step 2804 of FIG. 28, for example, the reception end of the base station performs self-interference cancellation from the reception signal using the estimated self-interference channel signal.

Referring again to FIG. 29, the transmission unit self-interference signal of the layer level 2901 may be transferred to the reception unit 2902.

For example, in a communication system supporting MIMO, the transmission end may simultaneously transmit multiple different signals using multiple layers, and the number of different transmitted signals may correspond to layers. If the maximum number of layers supported in the communication system is 4, the transmission end may transmit signals to the UE using one, two, or four layers.

Unlike method 1, method 2 may be considered as a means to reduce complexity when the transmission unit performs layer transmission using fewer layers than the maximum number of layers.

For example, when the transmission unit performs transmission using fewer layers than the maximum number of layers, upon channel estimation, rather than directly estimating $\dot{H}_{LA}$, the channel where the signal after the channel components are combined by the analog beamformer and the digital combiner is seen may be estimated and used. For example, an equation for when 2 layer transmission is performed in 2T2R when N=2, and an equation for a reception signal of one layer (less than two, which is the maximum number of layers) are provided below as Equations 5 and 6, respectively.

$$\begin{bmatrix} Y_1 \\ Y_2 \end{bmatrix} = \begin{bmatrix} h_{1,1}^{LA} & h_{1,2}^{LA} \\ h_{2,1}^{LA} & h_{2,2}^{LA} \end{bmatrix} \begin{bmatrix} X_1 \\ X_2 \end{bmatrix} \quad \text{Equation 5}$$

As shown in Equation 5, when 2 layer transmission is performed, the reception end should estimate all of the components of $H_{LA}$ to estimate a channel.

$$\begin{bmatrix} Y_1 \\ Y_2 \end{bmatrix} = \begin{bmatrix} h_{1,1}^{LA} & h_{1,2}^{LA} \\ h_{2,1}^{LA} & h_{2,2}^{LA} \end{bmatrix} \begin{bmatrix} X_1 \\ X_2 \end{bmatrix} = \begin{bmatrix} h_{1,1}^{LA} + h_{1,2}^{LA} \\ h_{2,1}^{LA} + h_{2,2}^{LA} \end{bmatrix} [X_1] = \begin{bmatrix} h_1'^{LA} \\ h_2'^{LA} \end{bmatrix} [X_1] \quad \text{Equation 6}$$

As shown in Equation 6, in the case where 1 layer transmission is performed, for channel estimation at the reception end, rather than estimating all of the components of $H_{LA}$, only the sum $h'_{1}{}^{LA}$ of $h_{1,1}{}^{LA}$ and $h_{1,2}{}^{LA}$ and the sum $h'_{2}{}^{LA}$ of $h_{2,1}{}^{LA}$ and $h_{2,2}{}^{LA}$ may be estimated.

Accordingly, when the digital self-interference of layer level is considered, the channel estimation coefficient may be changed according to the maximum number $N(X_1 \ldots X_n)$ of layers.

Embodiment 6 concerns an operation method of transforming the transmission signal as a means to reduce complexity upon self-interference channel estimation.

Upon transmitting a transmission signal in method 1 of embodiment 5, for the transmitter 2701 capable of up to N port transmissions, if signals [Z, 0, 0, . . . , 0, 0] to [0, 0, 0, . . . , 0, Z] are transmitted in order, $\hat{H}_{LA}$ may be obtained from the signal received from the reception end without inverse matrix computation. In the transmission signal, Z is a placeholder indicating that an arbitrary signal may be transmitted. Further, if signals may be clearly known by the reception end, although not transmitted in order, an effect as if the signals are recombined and transmitted may be obtained.

This effect is described in greater detail using the example, below. As shown in Equations 7 and 8, below, in the case where [X,0], [0,X] is transmitted in 2T2R, the components of the channel may be obtained by simply dividing the reception signal by X.

$$\begin{bmatrix} Y_1 \\ Y_2 \end{bmatrix} = \begin{bmatrix} h_{1,1}^{LA} & h_{1,2}^{LA} \\ h_{2,1}^{LA} & h_{2,2}^{LA} \end{bmatrix} \begin{bmatrix} X \\ 0 \end{bmatrix} = \begin{bmatrix} h_{1,1}^{LA} \\ h_{2,1}^{LA} \end{bmatrix} [X] \quad \text{Equation 7}$$

$$\begin{bmatrix} Y_3 \\ Y_4 \end{bmatrix} = \begin{bmatrix} h_{1,1}^{AP} & h_{1,2}^{AP} \\ h_{2,1}^{AP} & h_{2,2}^{AP} \end{bmatrix} \begin{bmatrix} 0 \\ X \end{bmatrix} = \begin{bmatrix} h_{1,2}^{LA} \\ h_{2,2}^{LA} \end{bmatrix} [X] \quad \text{Equation 8}$$

For example, in transmitting a transmission signal in method 1 of embodiment 5, for the transmitter 2701 capable of up to N port transmissions, if signals W_1 to W_N are transmitted in order, $\hat{H}_{LA}$ may be obtained from the signal received from the reception end without inverse matrix computation. In the transmission signals, W_n is an nth column component of the N-direct Fourier transform (DFT) and has orthogonal characteristics. Further, if signals may be clearly known by the reception end but not transmitted in order, an effect as if the signals are recombined and transmitted may be obtained.

This effect is described in greater detail using the following example. In the case where [X,X], [X', −X'] is transmitted in 2T2R as shown in Equations 9 and 10 below, since the inverse matrix of the transmission signal is already known, channel estimation may be performed, as shown below in Equation 11.

$$\begin{bmatrix} Y_1 \\ Y_2 \end{bmatrix} = \begin{bmatrix} h_{1,1}^{LA} & h_{1,2}^{LA} \\ h_{2,1}^{LA} & h_{2,2}^{LA} \end{bmatrix} \begin{bmatrix} X \\ X \end{bmatrix} \quad \text{Equation 9}$$

$$\begin{bmatrix} Y_3 \\ Y_4 \end{bmatrix} = \begin{bmatrix} h_{1,1}^{LA} & h_{1,2}^{LA} \\ h_{2,1}^{LA} & h_{2,2}^{LA} \end{bmatrix} \begin{bmatrix} X^* \\ -X^* \end{bmatrix} \quad \text{Equation 10}$$

Further, as a method for obtaining the same effect as the matrix of the DFT, a method using the following Alamouti coding may also be considered. For example, for two antennas at the transmitter, the maximum transmit (spatial) diversity gain may be provided through Alamouti coding, and the transmission data which are orthogonal to each other using Alamouti code technology may be transmitted as two pieces of data. Typically, a 4-symbol Alamouti code by two antennas may be considered as a symbol-level Alamouti code. The signal of the data channel may be processed to estimate a channel as a means to reduce complexity in the step of estimating the self-interference channel.

Although it has been described that the self-interference cancellation methods according to embodiments 5 and 6 are performed by the base station, the self-interference cancellation methods may also be performed by the UE in the same manner.

Figure 30:
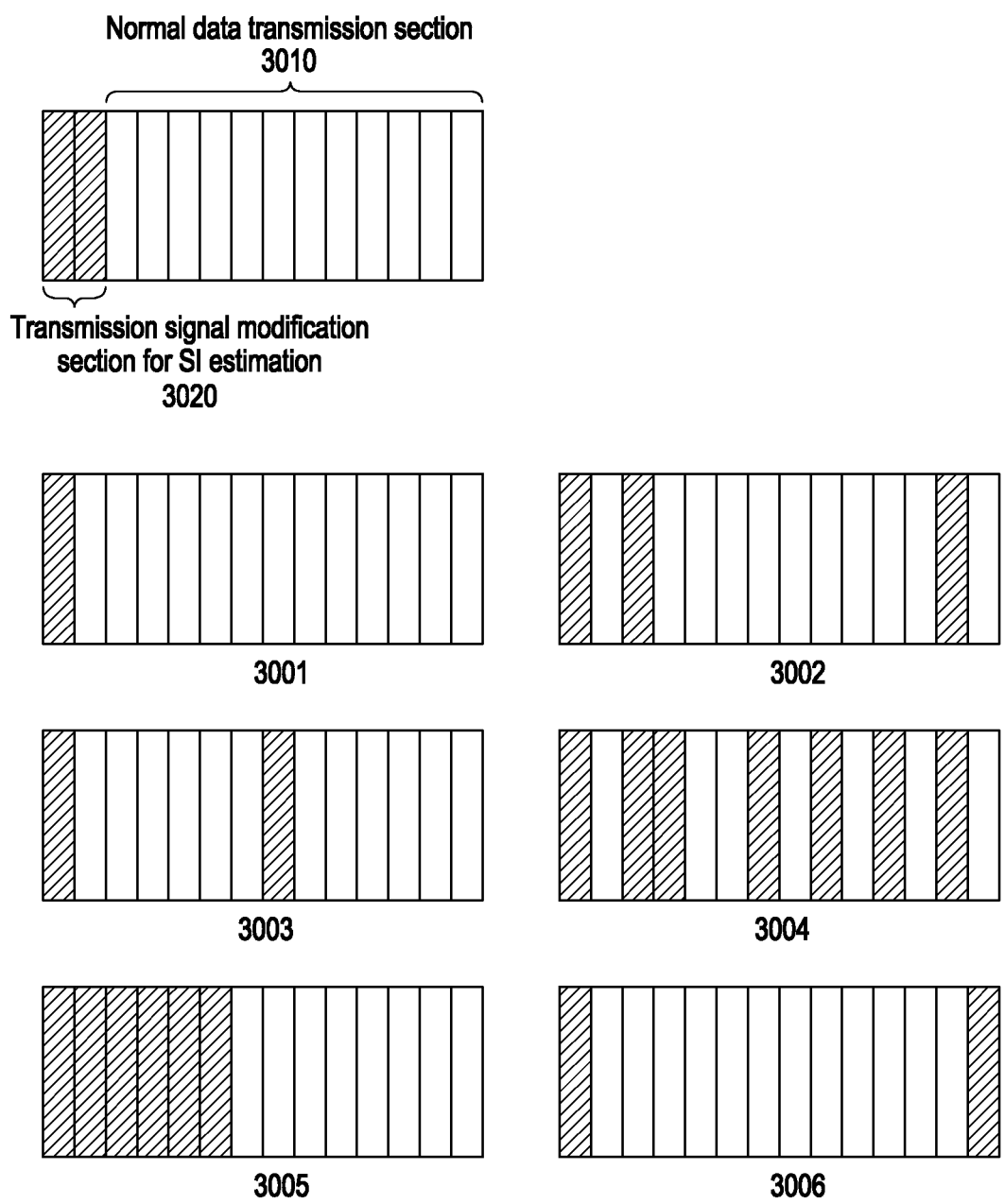
FIG. 30 illustrates a slot structure for implementing operations, according to an embodiment.

FIG. 30 illustrates a slot structure for implementing operations (e.g., embodiment 6), according to an embodiment.

Figure 31:
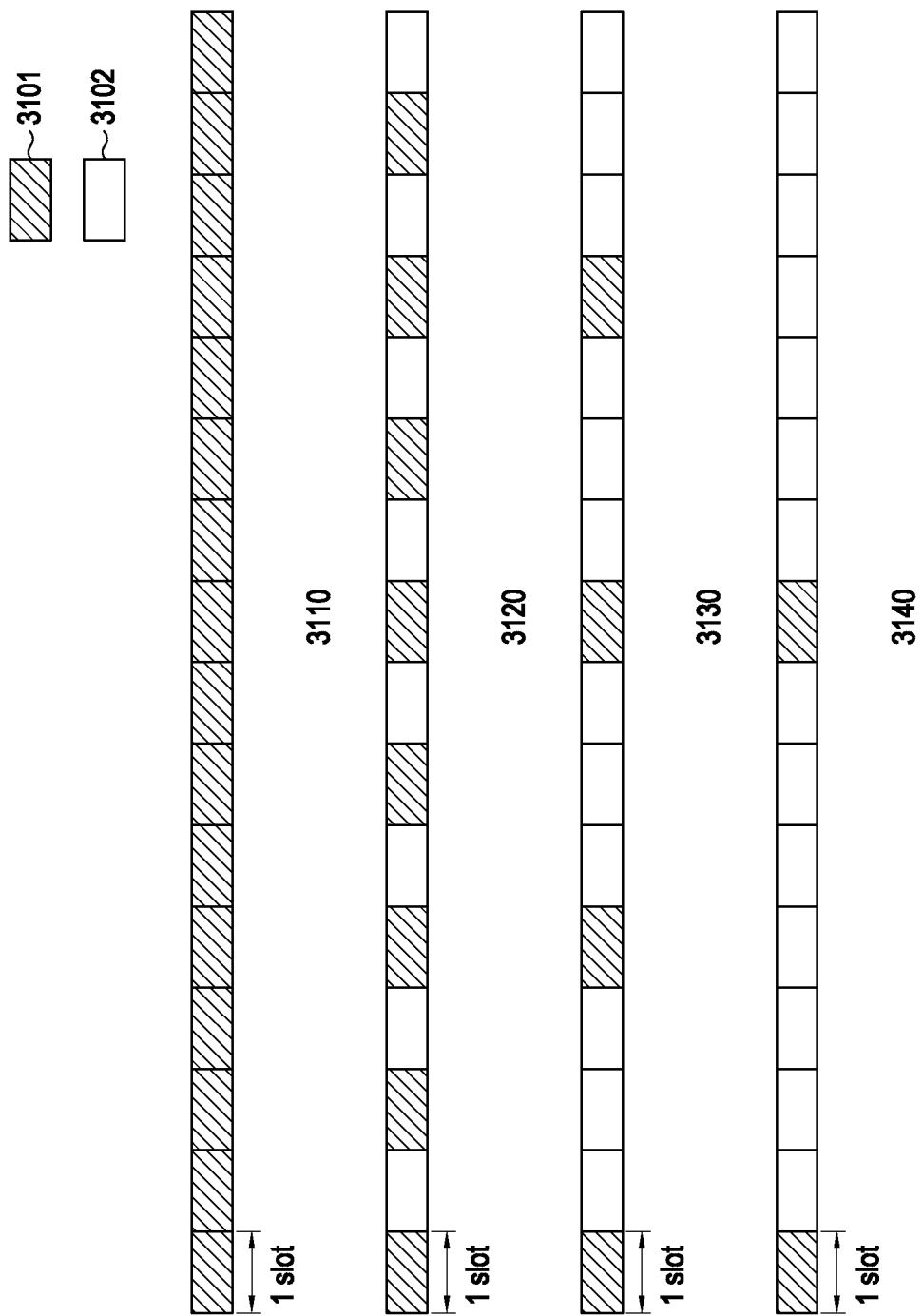
FIG. 31 illustrates a subframe structure for implementing operations, according to an embodiment.

FIG. 31 illustrates a subframe structure for implementing operations (e.g., embodiment 6), according to an embodiment.

FIG. 30 depicts a transmitted frame in which some symbols in a general slot structure have been modified as a signal for self-interference estimation. In the case of data assigned to one UE in a general system, the same type of signal in the slot is assigned, but to more smoothly perform digital self-interference cancellation, the frame structure of FIG. 30 or 31 may be considered. The entity of transmitting the frame structure of FIG. 30 or 31 may be the base station.

Referring to FIG. 30, in a transmission signal modification section 3020 for self-interference estimation, signal transmission may reduce complexity considered in embodiment 6, above. Further, in a general data transmission section 3010, the signal may be transmitted in a conventional manner. For example, in the transmission signal modification section (e.g., a first signal transmission section 3020) for self-interference estimation, 1 layer transmission (e.g., a first transmission scheme) (e.g., using DFT) may be performed and, in the general data transmission section (e.g., a second signal transmission section 3010), 2 or more layer transmission (e.g., a second transmission scheme) may be performed. As shown above in Equation 6, when 1 layer transmission is performed in the transmission signal modification section for self-interference estimation, the reception end may estimate only the sum of the elements in the same row, rather than estimating all elements, for channel estimation. Thus, the slot design may include the first signal transmission section and the second signal transmission section in one slot and further facilitate self-interference channel estimation through the first transmission scheme and the second transmission scheme. In the first signal transmission section and the second signal transmission section, "section" may be used interchangeably with terms such as interval, period, or region.

The structure of FIG. 30 may be designed considering the following method. As shown in FIG. 30, the number of symbols used for self-interference channel estimation in a frame may be arbitrarily changed according to the configuration of the base station, which is the entity of estimating the self-interference channel. In this case, the base station may consider the number of symbols for estimating the self-interference channel and the repetition period, considering the characteristics of the self-interference channel, the rate of change of the channel, and the accuracy of estimating the components of the self-interference channel.

Various slot structures 3001 to 3006 shown in FIG. 30 may be considered. Further, the hatched section may be used for self-interference estimation by modifying some symbols in the slot structure 3020. Specifically, FIG. 30 illustrates an example of the arrangement of various symbols for self-interference estimation among 14 symbols in a slot. Illustrated are slots 3001 and 3005 having a transmission signal modification section for self-interference estimation in at least one symbol from the first symbol, or a slot 3006 having a transmission signal modification section for self-interference estimation in the first symbol and the last symbol, or slots 3002, 3003, and 3004 having a signal modification section for self-interference estimation for at least one arbitrarily determined symbol in a slot.

Referring to FIG. 30, it is possible to modify multiple contiguous or non-contiguous symbols and perform transmission according to the number of symbols necessary for self-interference estimation by the base station. For example, if the number of symbols necessary for self-interference estimation is 1, the base station may modify and use only one symbol in the slot. If one or more self-interference channel estimation symbols are required by the base station, the base station may modify and use several symbols in the slot. Besides those additionally shown in FIG. 30, the base station may modify and use one or more symbols as necessary.

Referring to FIG. 31, a series of slots are illustrated including a slot 3101 including a first signal transmission section and a slot 3102 including a second signal transmission section. FIG. 31 shows an example of arrangement and allocation of slots including a signal modification section in a configuration example of slots. The configuration example of the slot 3101 including at least the first signal transmission section in FIG. 31 may be applied to various numerologies in the same/similar manner in the NR system. It should be noted that the arrangement and allocation of the signal modification section for self-interference estimation is not limited to the example of FIG. 31.

Referring to 3110 of FIG. 31, 16 slots of a subframe may be configured as slots 3101 including the first signal transmission section. The slots 3101 including the first signal transmission section may be transmitted with a specific slot interval. The slots 3101 including the first signal transmission section and the slots 3102 including the second signal transmission section are arranged with a first slot interval 3120, when the interval with which the slots 3101 including the first signal transmission section is repeated is four slots 3130, and when arrangement and allocation are made with a repetition interval of eight slots 3140.

Referring to FIGS. 30 and 31, although such a case is illustrated in which the transmission signal modification section for self-interference estimation is positioned at the head (e.g., position of number 0) of the slot or subframe, the transmission signal modification section may be set in any position depending on the configuration of the base station. For example, slots 3002, 3003, and 3004 having an arbitrary transmission signal modification section of FIG. 30 may be considered. Further, a structure for self-interference channel estimation with a specific time interval as shown in FIG. 31 may be considered. Further, the transmission signal modification section may be configured and operated to include a transmission signal modification section for self-interference estimation in a particular frequency band, subcarrier, BW, RB, RE, or BWP.

If the transmission signal modification section for self-interference estimation is configured with an interval of one slot, each slot includes a modification section for self-interference channel measurement, as described above. According to various embodiments, if the base station desires to increase the self-interference channel estimation symbol slot repetition interval through the determination, this may be known through higher layer signaling or L1 signaling (e.g., FIG. 38). The UE, receiving this signaling, may identify the position of the modification section for self-interference estimation in the frame received by the UE as shown in FIGS. 30 and 31.

In the disclosure, higher layer signaling may be signaling corresponding to at least one or a combination of one or more of the following types of signaling:

MIB;
SIB (System Information Block) or SIB X(X=1, 2, . . . );
RRC; and
MAC (Medium Access Control) CE (Control Element).

Further, L1 signaling may be signaling corresponding to at least one or a combination of one or more of the following physical layer channels or signaling methods:

PDCCH;
DCI;
UE-specific DCI;
Group common DCI;
Common DCI;
Scheduling DCI (e.g., DCI used for scheduling downlink or uplink data);
Non-scheduling DCI (e.g., DCI not for the purpose of scheduling downlink or uplink data);
PUCCH; and
UCI (Uplink Control Information).

According to various embodiments, the number of symbols used for self-interference channel estimation by the base station is associated with accuracy of self-interference channel estimation required upon self-interference cancellation. In addition, the number of symbols is related to the size of self-interference remaining before self ADC(that is, analog to digital converter). Additionally, the number of symbols is associated with the proportion occupied by the non-linear components among the self-interference components. If self-interference is large or if non-linear components are more common components, more accurate self-interference channel estimation should be performed. Accordingly, it may be assumed that the base station performs self-interference channel estimation using more symbols. Thus, the number of self-interference channel estimation symbols may be increased and used.

As an example, the signal modification section for self-interference estimation by the base station shown in the drawings is applied when the characteristics of self-interference cancellation are considered for every slot, but it may be restricted at a specific time or operated periodically depending on the preference of the base station. For example, if the self-interference channel changes rapidly, the symbol modification section for self-interference channel estimation may be transmitted at a shorter period. In addition, if a temperature change in a base station element occurs, a change in base station beam, or a change in base station self-interference channel environment is more frequent. If such a change has a meaningful influence on self-interference channel changes, the base station may operate the modification section for self-interference channel measurement more frequently than transmitting, for every slot, a signal change for self-interference channel estimation. Additionally, if the base station may be sure that the self-interference channel is not changed for a specific time, the base station may operate the modification section for self-interference channel measurement only in some slots, rather than performing, for every slot, a signal change for self-interference channel estimation. Such an intermittent operation of the signal modification section may be considered when the base station maintains beam transmission for a predetermined time and the transmission maintaining period is shorter than the coherent time of the channel.

According to an embodiment, if a transmission beam previously used is used at another time, the modification section for self-interference estimation may not be used. For example, if a specific nth slot (here, n is a natural number) is the self-interference cancellation modification signal section and if the same beam is used in the delta T time shorter than the coherent time of the channel, the base station may consider signal transmission without using the modification section for self-interference estimation.

Figure 32A:
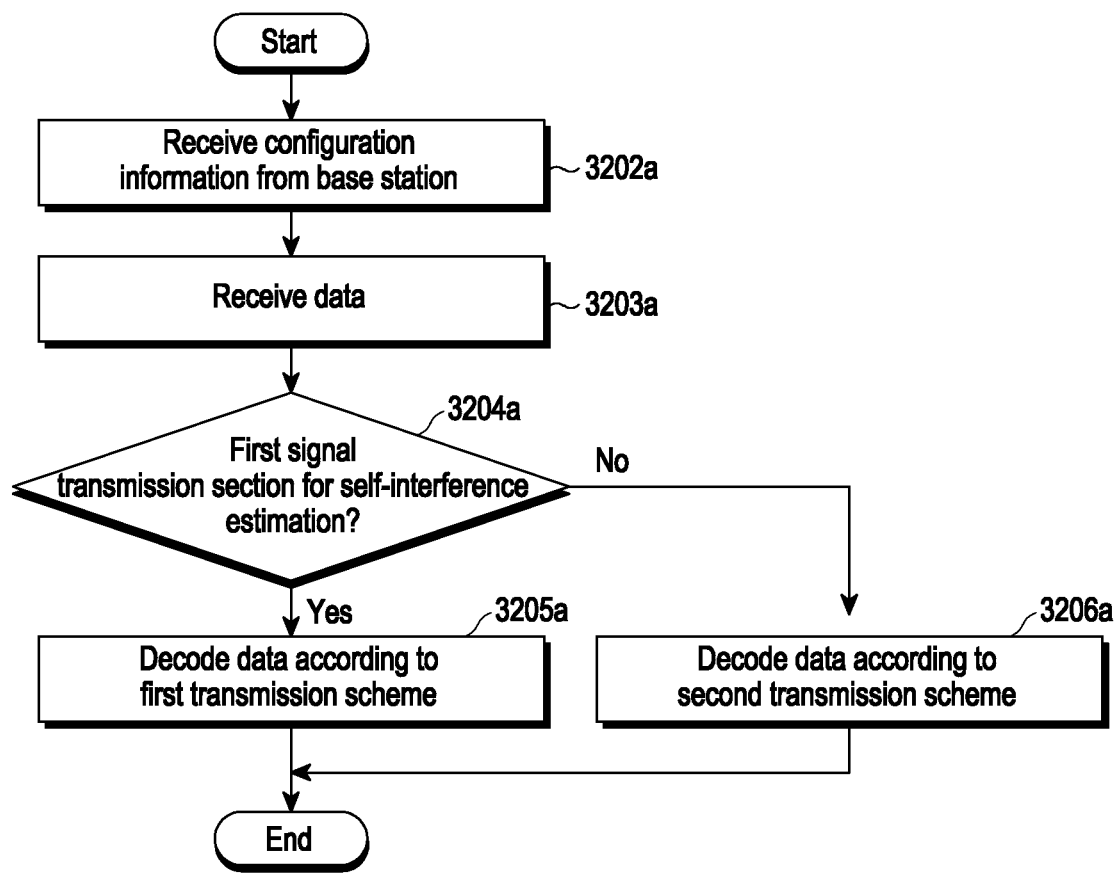
FIGS. 32A and 32B illustrate reception processes of a UE and a base station, according to an embodiment.
Figure 32B:
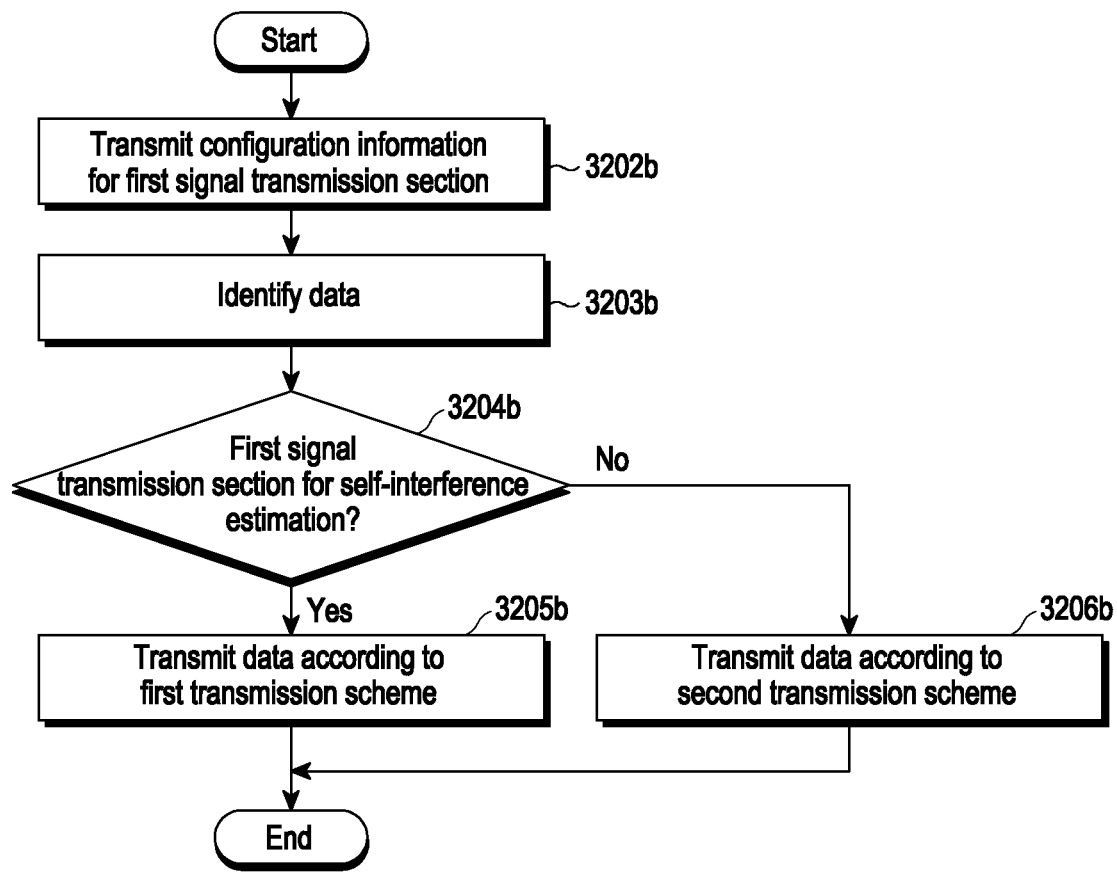

FIGS. 32A and 32B illustrate reception processes of a UE and a base station (e.g., embodiment 6), according to an embodiment. In the above-described embodiment, the UE may be operated under the assumption that the transmission signal from the base station is a signal transmitted for the base station to perform self-interference channel estimation.

Referring to FIGS. 32A-32B, the base station explicitly informs the UE of the specific position, as a signal section for self-interference channel estimation, through DCI, MAC CE, or RRC signal, the UE receives, from the base station, configuration information including information on the signal section for self-interference channel estimation in step 3202a. In step 3203a, the UE receives data. In step 3204a, the UE determines whether the corresponding section is a signal for self-interference estimation. If some section in the received data corresponds to a section (e.g., the first signal transmission section) for self-interference channel estimation, the UE may decode data according to a first transmission scheme (e.g., 1 layer transmission) using the MCS for the corresponding section in step 3205a. The base station may inform the UE of a specific time, specific RE position, and signal type for self-interference estimation by informing the UE of the specific position. If the section is not for self-interference estimation (e.g., the second signal transmission section), the UE regards the corresponding section as normal data using a different MCS and decodes it according to the second transmission scheme (e.g., 2 or more layer transmission) in step 3206a.

When the UE receives data from the base station, in the section for self-interference estimation as shown in FIGS. 30 and 31 (or the first signal transmission section), the UE may receive a modified signal through the layer used for transmission of the transmission signal modification section according to the first transmission scheme, decode data using the MCS applied to the corresponding section, and more smoothly perform self-interference estimation through other layer transmission in one slot. Other than the first signal transmission section, the UE may regard the remaining data as normal data according to the second transmission scheme and decode it according to the second transmission scheme.

Referring to FIG. 32B, in the operation of the base station transmitting data to the UE, the base station transmits configuration information including information on a first signal transmission section for self-interference estimation in step 3202b. In step 3203b, the base station identifies data to be transmitted in a first signal transmission section for self-interference estimation and a second signal transmission section used for normal data transmission. In step 3204b, the UE determines whether the first signal transmission section is for self-interference estimation. If the first signal transmission section is for self-interference estimation, data is transmitted according to a determined first transmission scheme in the first signal transmission section in step 3205b. If the first signal transmission section is not for self-interference estimation, data is transmitted according to a determined second transmission scheme in a second signal transmission section for normal data transmission in step 3206b.

In addition, the base station may operate without separately informing the UE of signal transmission for self-interference channel estimation. For example, in the case where the base station transmits PDSCH or PDCCH, the signal may be transmitted in the form of information transmission for self-interference channel estimation as described above.

Embodiment 7 represents an operation method for directly estimating a channel H or all $W_{A,Rx}H\,W_{A,Tx}$ unlike those described in connection with embodiments 5 and 6.

As represented in Equation 4, above, the self-interference channel shown at the antenna port and the self-interference channel shown at the layer are varied as the analog beam or channel is varied, so that a new estimation may be performed whenever the channel is varied as described in connection with embodiments 5 and 6. However, in the case where the change of H is significantly slow, a value indexed per beam in channel estimation may be used and operated. If channel estimation is performed using the value indexed per beam, embodiments 1 to 4, described above, may apply.

Figure 33:
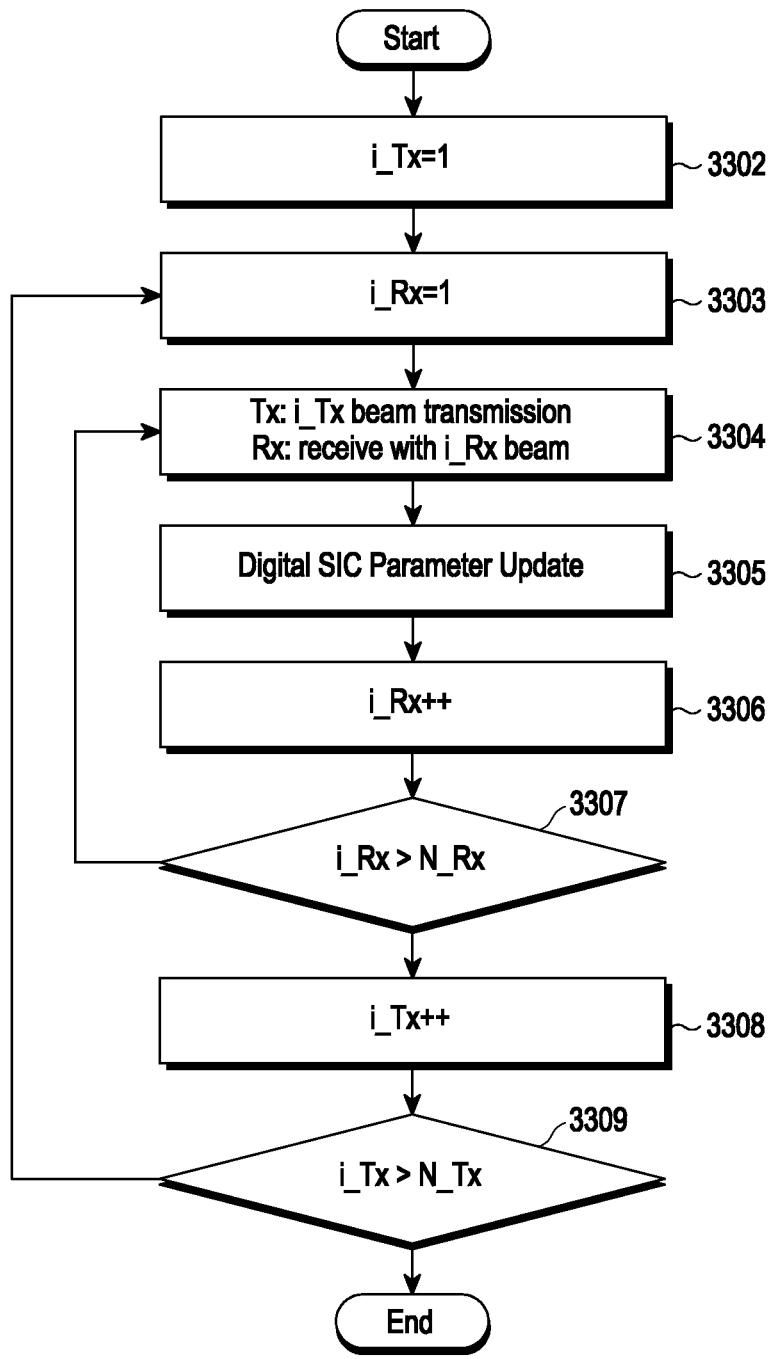
FIG. 33 illustrates a self-interference channel storage method usable when a variation speed is slow, according to an embodiment.

FIG. 33 illustrates a self-interference channel storage method usable when a variation speed (H is slow, according to an embodiment.

The method in FIG. 33 is a method for the base station to store information on the self-interference channel to estimate the self-interference channel in advance, in order to utilize the self-interference channel. The base station may estimate a plurality of channels for combinations of directions of analog transmission beams and analog reception beam available in the base station, and store information about the estimated channels.

Referring to FIG. 33, i_Tx denotes the transmission beam number of the base station. i_Rx denotes the reception beam number of the base station. As shown in FIG. 33, the base station performs channel estimation while changing the used analog beam one by one. In step 3302, i_Tx is set to 1, and in step 3303, i_Rx is set to 1. Transmission is performed in the beam i_Tx and reception is performed in the beam i_Rx in step 3304. In addition, a channel is estimated from the signal received from the reception end. The channel estimation method used at this time may be the channel estimation methods of embodiments 5 and 6. Then, the base station stores the estimated self-interference channel by updating the digital SIC parameter in step 3305. This process may be performed in all cases of transmission beams and reception beams that may be used by the base station. The digital self-interference channel parameter is updated (3306 to 3309 of FIG. 33 for signals transmitted in the i_Tx beam and received in the i_Rx beam while increasing the i_Tx beam number and the i_Rx beam number one by one.

Specifically, the base station may update digital SIC parameters while sequentially increasing a beam number of a reception beam from 1 to N_Rx for a transmission beam of a beam number i_Tx=1, and store the updated digital SIC parameters corresponding to the beam numbers(beam indices) of the transmission and reception beams. For example, a digital SIC parameter measured by a combination of the transmission beam number i_Tx=1 and a receive beam number i_Rx=3 may be stored as a digital SIC parameter 1-3. According to operations of 3304 to 3307 shown in FIG. 33, the base station may update digital SIC parameters from a digital SIC parameter 1-1 to a digital SIC parameter 1-N_Rx according to the flowchart shown in FIG. 33. (loops from 3304 to 3307)

In addition, the base station may update digital SIC parameters for all transmission beams while the base station increases a beam number of the transmission beam from 1 to N_Tx. (loops from 3303 to 3309). As shown in FIG. 33, the base station may update the digital SIC parameters for all transmission and reception beam combinations. Also, although not shown in the FIG. 33, in an alternative embodiment, the base station may update the digital SIC parameters by limiting only one or more combinations of transmission and reception beams required for actual transmission.

After the channel storage process of FIG. 33, the base station may perform self-interference cancellation using the stored information. For example, if the base station transmits data using the Nth beam and receives data using the Mth beam, it may bring the channel stored in the prior process and use it for self-interference cancellation.

For each operation of embodiments 1 to 7, the base station may use a conventional beam sweeping process to perform the methods of FIGS. 32 and 33. The base station may use the section where the UE transmits no signal to perform the methods of FIGS. 32 and 33. Further, the base station may intentionally induce the UE to transmit no signal. Also, the base station may operate using a conventional signal structure. For example, the base station may use DMRS and CSI-RS signals for layer level channel estimation or port level channel estimation. Further, the base station may use its transmission data, e.g., a PDSCH, a primary synchronization signal (PSS), and a secondary synchronization signal (SSS), for self-interference channel estimation.

Embodiment 8 will now be described.

Figure 34:
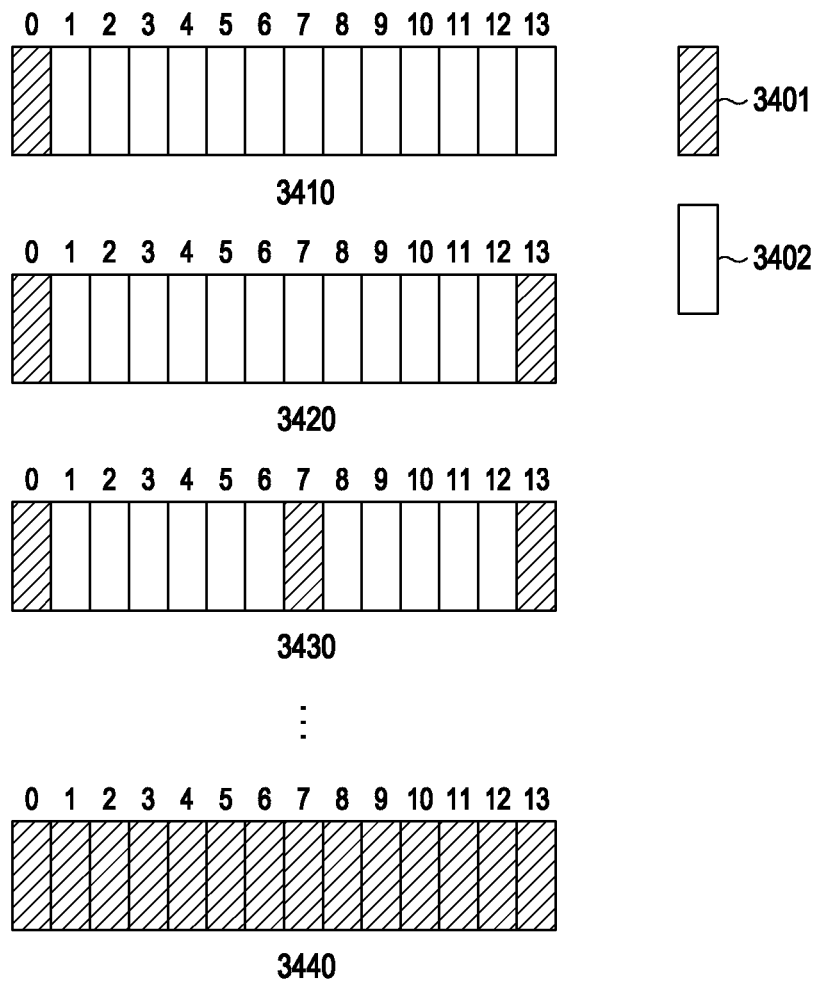
FIG. 34 illustrates a slot structure for self-interference channel estimation, according to an embodiment.
Figure 35:
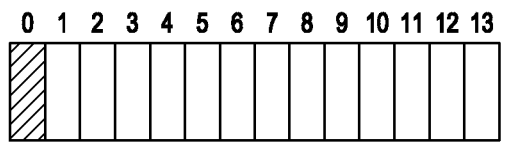
FIG. 35 illustrates a slot structure for self-interference channel estimation, according to an embodiment.
Figure 35:
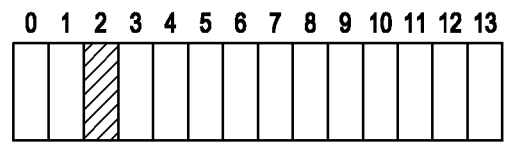
Figure 35:
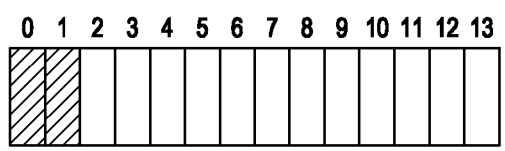
Figure 35:
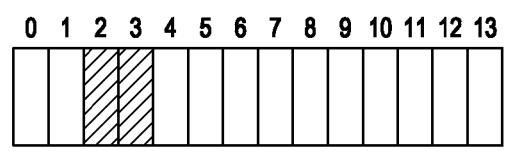
Figure 35:
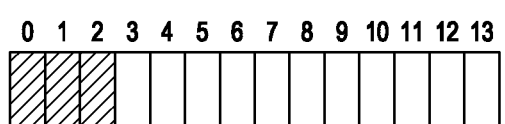
Figure 35:
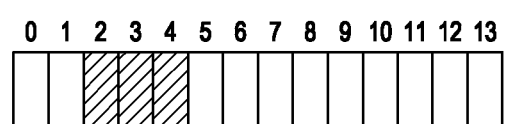
Figure 35:
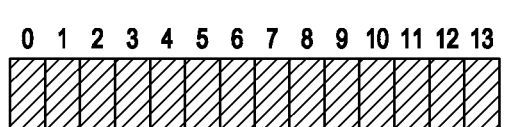
Figure 35:
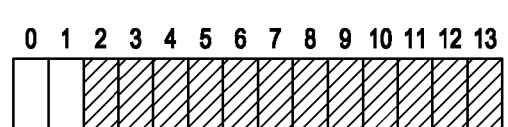
Figure 36:
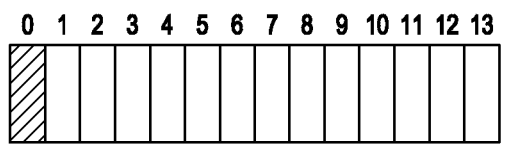
FIG. 36 illustrates a slot structure for self-interference channel estimation, according to an embodiment.
Figure 36:
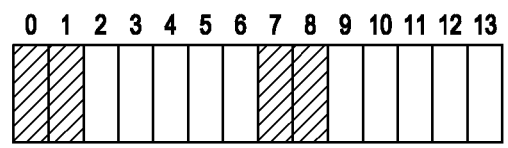
Figure 36:
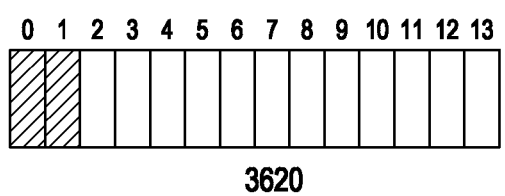
Figure 36:
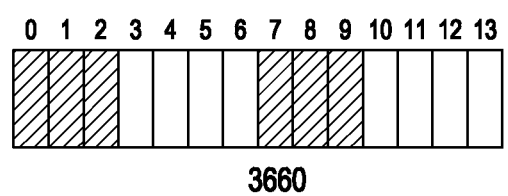
Figure 36:
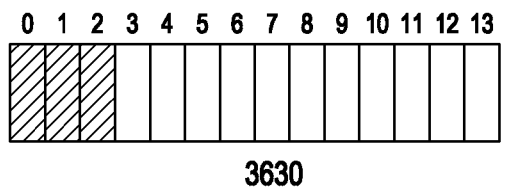
Figure 36:
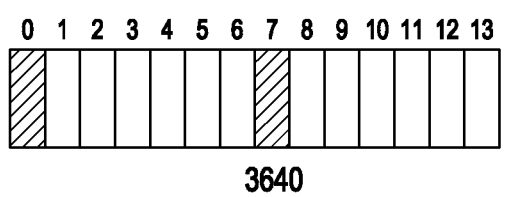

FIGS. 34 to 36 are views illustrating a slot structure for self-interference channel estimation, according to an embodiment. The base station may notify the UE of the area for self-interference estimation. An entity performing self-interference cancellation (corresponding to the base station in this embodiment) may inform another entity receiving signals (corresponding to the UE in this embodiment) that its signal is partially modified and allows the signal receiving entity a different signal reception method based on the modified signal. The area for self-interference estimation may be an area in which symbols are positioned in the slot. The base station may use a method for informing the UE of a specific time domain or frequency domain resource to indicate the signal modified area for self-interference estimation.

Specifically, FIG. 34 illustrates a method in which the base station transfers a signal modified area for self-interference estimation in a bitmap type.

When the base station informs the UE whether the signal for self-interference channel estimation of each symbol is modified in the bitmap type, a symbol modification for self-interference channel estimation may be known using a slot composed of 14 symbols as shown in 3401 to 3402 of FIG. 34. Symbol positions in the slot may be numbered 0 to 13, and the symbol for SI estimation may be numbered as 1, and the existing symbols may be numbered as 0s. In 3401 of FIG. 34, since among the symbol positions numbered 0 to 13, a symbol for self-interference estimation is included in the first position (e.g., number 0 in 3410 to 3440), and the remaining symbols are existing symbols, the bitmap may be expressed as 10000000000000. In 3402 of FIG. 34, since symbols for self-interference estimation are positioned in the first and last sections of the slot, and existing symbols are positioned in the remaining sections, the bitmap may be expressed as 10000000000001. In 3403 of FIG. 34, the bitmap may be expressed as 10000001000001, and 3404 of FIG. 34 may be expressed as a bitmap filled with 14 1s. Since 0 and 1 in the bitmap denote information indicating where the symbol for self-interference estimation is positioned, the base station may inform the UE of the self-interference channel estimation modification area in the bitmap type. If receiving a bit expressed as 1, the UE may assume that it is a symbol for self-interference estimation in the position corresponding to the bit and receive the signal.

FIG. 35 illustrates a method in which the base station transfers a signal modification section for self-interference estimation with a starting point of the section and number of symbols. The descriptions of 3401 and 3402 of FIG. 34 may be applied to denote the symbols used in FIG. 35.

If the signal modification section for self-interference estimation is composed of contiguous symbols, the base station may inform the UE of the starting point of a signal modification section and the number of contiguous symbols. FIG. 35 illustrates slots in which symbols for self-interference estimation are hatched. In 3510, 3530, 3550, and 3570 of FIG. 35, the starting point where the symbol for self-interference estimation is positioned may be set to the point which is the first section of the slot (e.g., the point denoted by 0 among sections 0 to 13 in the slot). 3520, 3540, 3560, and 3570 of FIG. 35 depict that the starting point where the modified symbol for channel estimation is positioned may be set to the point which is the third section of the slot (e.g., the point denoted by 2 among sections 0 to 13 in the slot). The base station may inform the UE whether each symbol to be used for self-interference estimation is modified through information related to the starting point and the number of symbols for self-interference estimation. The UE may receive signals under the assumption that the section for self-interference estimation and the position of each symbol corresponding thereto are symbols for self-interference channel estimation. In the case where the slot 3560 of FIG. is used, if the base station transfers information indicating that the starting point is the third section, and three symbols are used, the UE may be aware of the section of self-interference estimation.

The base station may previously inform the UE of the section for self-interference estimation. The base station may inform the UE of a plurality of patterns (e.g., FIG. 36) forming a section for self-interference estimation, and the UE may select a specific pattern from among the plurality of patterns and operate. The base station and the UE may previously have a plurality of patterns according to their mutual agreement. The UE may set one of a plurality of patterns including 3610 to 3660 of FIG. 36 as a default value. For example, if there is no other configuration for a first pattern 3601 of FIG. 36, signals may be received with the first pattern 3601 assumed to be a pattern where a symbol for self-interference estimation is positioned. If the base station selects one pattern and configures through other signals, such as DCI, MAC, CE, or RRC, the UE may assume that the position corresponding thereto is a section where a modified symbol for self-interference estimation is included and receive signals. If the third pattern 3630 of FIG. 36 is configured in the above example, the UE may interpret the symbols positioned at the 0th, 1st, and 2nd points of the slot as modified symbols for self-interference estimation and operate. In addition, if the UE receives an indicator for the third pattern 3630, the UE may recognize that the third pattern 3630 is a pattern where the modified symbol for SI estimation is positioned and receive signals in a different manner from the corresponding point, at the symbols positioned at the 0th, 1st, and 2nd points.

The base station may provide a specific pattern so that the base station and the UE may use a predefined pattern and change the predefined pattern into another pattern through, e.g., an RRC message, and use the other pattern. The method of informing of the changed pattern may consider a scheme of transferring symbols by at least one or a combination of the bitmap types shown in FIGS. 34 to 36 and a scheme of transferring the starting point and the number of symbols.

An indicator corresponding to each of the plurality of patterns may be designated, and the specific pattern may be allowed to be recognized through the indicator. If 3610 to 3660 of FIG. 36 are designated as patterns 1 to 6, and an indicator corresponding to each pattern is set, and the base station and the UE are previously aware of information about each pattern and corresponding indicator, the specific pattern where the modified symbol for self-interference estimation is positioned may be recognized by providing the specific indicator. If the UE receives the indicator corresponding to pattern 3, the UE may be activated by pattern 3, and the previous pattern is deactivated so that pattern 3 may be recognized as the pattern where the modified symbol for self-interference estimation is positioned, and signals may be received.

The base station may fix the specific pattern and operate. For example, the base station and the UE may fix the pattern where the symbol for self-interference estimation is positioned through the specific pattern or a predefined symbol position and operate. Similar to FIG. 31, the base station may transmit a modified symbol for self-interference channel estimation always in the specific position for the slot where the symbol for self-interference channel estimation is positioned.

Figure 37:
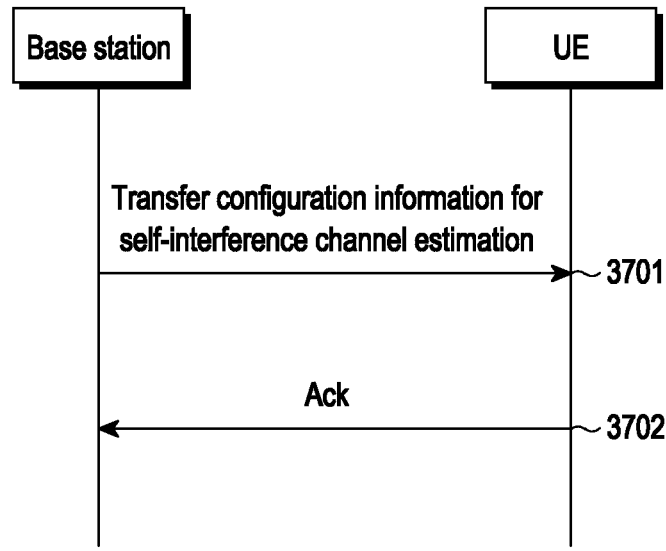
FIG. 37 illustrates an operation of a base station transferring configuration information for self-interference channel estimation, according to an embodiment.

FIG. 37 illustrates an operation of a base station transferring configuration information for self-interference channel estimation, according to an embodiment.

Figure 38:
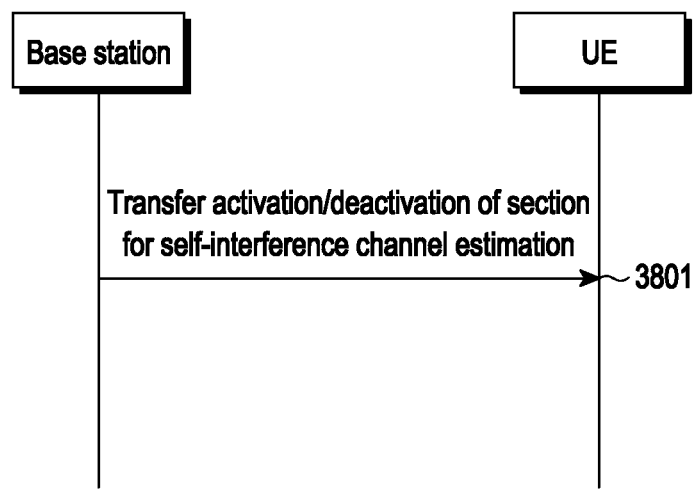
FIG. 38 illustrates an operation of a base station transferring information about whether a period for self-interference channel estimation is activated, according to an embodiment.

FIG. 38 illustrates an operation of a base station transferring information about whether a period for self-interference channel estimation is activated, according to an embodiment.

According to various embodiments, the base station provides the UE with configuration information about the modified symbol or slot for self-interference estimation in step 3701. The base station may inform the UE of the specific position or pattern where the symbol or slot for self-interference channel estimation is positioned. Referring to embodiment 6 or FIG. 30, the UE may receive signals in a different manner in the resource section corresponding to the transmission signal modification section for self-interference estimation in one slot or one subframe/frame.

The base station may inform the UE of the period of a symbol or position of a symbol for self-interference estimation in step 3701. The base station may transmit information related to the symbol or slot for self-interference estimation through a control channel and data channel, such as DCI, MAC CE, or RRC. The UE may configure a transmission signal modification section or specific pattern for self-interference estimation through the received information. In step 3702, the UE transmits, to the base station, a reply (ack) for acknowledging that the symbol or slot-related information for self-interference estimation has been received.

Referring to FIG. 38, the base station may configure a specific pattern composed of a transmission signal modification section for previous self-interference estimation according to the method described in connection with FIGS. 34 to 36 and then inform the UE whether to recognize the configured specific pattern as the transmission signal modification section for self-interference estimation or to deactivate and not recognize it.

If the base station no longer needs to perform self-interference cancellation, the base station may inform the UE that the symbol for self-interference estimation is not used (inactive). The base station informs the UE whether to active or deactivate the section including the symbol for self-interference in step 3801 (e.g., using DCI).

Embodiment 9 relates to a method for coexistence with a control channel when a frame including a transmission signal modification section for self-interference estimation includes a control channel signal.

In general, the control channel signal may perform rank 1 transmission unlike the data signal, to smooth the UE's reception. Although rank 1 transmission including transmission of a control channel is performed including a transmission signal modification section for self-interference estimation, the UE may recognize the transmission signal modification section for self-interference estimation. RI indicates the maximum number of layers spatially divided, and rank 1 transmission denotes, e.g., a state in which a signal may be transmitted through one antenna or one layer. In rank 1 transmission, when the base station transmits data to the UE, a section for control channel transmission and a section for self-interference estimation may co-exist in the subframe or slot. The description made in connection with FIG. 5 may be applied to the UE informing the base station what transmission scheme the UE is to conduct when transmitting data to the base station.

The base station may use transmission data, such as PDSCH, PSS, and SSS, for self-interference estimation using a conventional signal structure. In the section for self-interference estimation, 1 layer transmission considering DFT may be performed and, in the normal data transmission section, 2 layer transmission may be performed. Despite including the control channel to be transmitted to the UE, the UE and the base station may operate according to embodiments 1 to 8, described above.

As shown in FIGS. 30 to 38, when the base station uses some symbols or slot for self-interference estimation, the modification sections for self-interference estimation and control channel may coexist. In other words, the base station may perform self-interference channel estimation using the modification section for self-interference estimation and the symbols where the control channel is transmitted. However, when the control channel coexists in the frame including the transmission signal modification section for self-interference estimation, the base station estimating self-interference should keep the PDSCH and control channel in the same beam direction.

Figure 39:
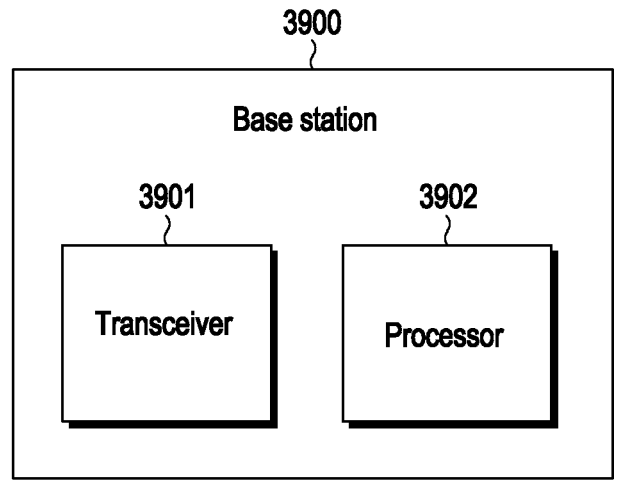
FIG. 39 illustrates a basic configuration of a base station of a full-duplex system, according to an embodiment.
Figure 40:
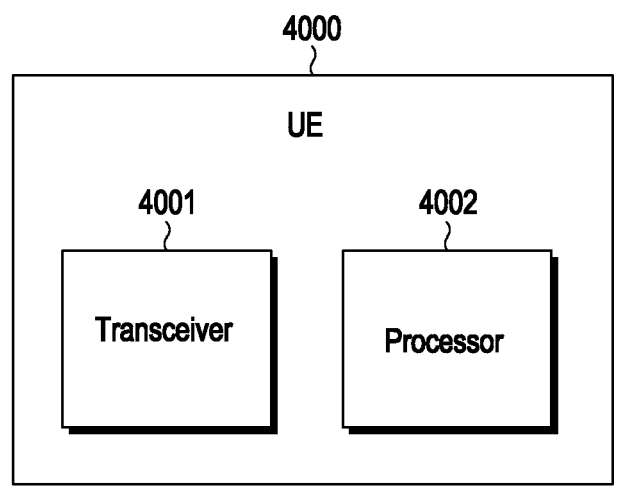
FIG. 40 illustrates a basic configuration of a UE of a full-duplex system, according to an embodiment.

FIG. 39 illustrates a basic configuration of a base station of a full-duplex system, according to an embodiment. FIG. 40 illustrates a basic configuration of a UE of a full-duplex system, according to an embodiment.

The operations according to embodiments, described in connection with FIGS. 1 to 38 may be performed by a transmission/reception device having an interference cancellation function, e.g., a base station and/or a UE.

Referring to FIG. 39, a base station 3900 includes a transceiver 3901 and a processor 3902. The processor 3902 may transmit and receive wireless signals through the transceiver 3901. The processor 3902 may control the overall operation of the base station according to schemes described in connection with at least one or a combination of the embodiments of FIGS. 1 to 38.

Referring to FIG. 40, a UE 4000 includes a transceiver 4001 and a processor 4002. The processor 4002 of the UE may transmit and receive wireless signals through the transceiver 4001. The processor 4002 may control the overall operation of the UE according to schemes described in connection with at least one or a combination of the embodiments of FIGS. 1 to 38.

While the disclosure has been particularly shown and described with reference to embodiments thereof, it will be understood by those skilled in the art that various changes in form and details may be made therein without departing from the scope of the subject matter as defined by the appended claims and their equivalents.

What is claimed is:

1. A method performed by a user equipment (UE), the method comprising:
   receiving, from a base station, configuration information for self-interference channel estimation in the base station, the configuration information including bitmap information indicating where at least one symbol for the self-interference channel estimation is positioned and modified;
   receiving, from the base station, downlink data in a slot including a first signal transmission section and a second signal transmission section;
   identifying whether the received downlink data includes a first data in the first signal transmission section for the self-interference channel estimation in the base station, based on the configuration information;
   in case that the received downlink data includes the first data in the first signal transmission section, decoding the first data using a first transmission scheme for the first signal transmission section; and
   in case that the received downlink data includes a second data in the second signal transmission section, decoding the second data using a second transmission scheme for the second signal transmission section,
   wherein a number of one or more layers for the first transmission scheme is less than a number of two or more layers for the second transmission scheme, and
   wherein at least one symbol in the first signal transmission section is modified for the self-interference channel estimation in the slot, based on the bitmap information.

2. The method of claim 1, further comprising:
   transmitting a first signal for self-interference channel estimation of the UE; and
   estimating a self-interference channel of the UE based on the first signal.

3. The method of claim 2, wherein the first signal is transmitted in an antenna port level of the UE, and
   wherein the self-interference channel is estimated in the antenna port level of the UE.

4. The method of claim 2, wherein the first signal is transmitted in a layer level of the UE, and
   wherein the self-interference channel is estimated in the layer level of the UE.

5. The method of claim 2, wherein the first signal is transmitted by the UE having up to a predetermined number of ports, and
   wherein a number of ports used for transmission of the first signal is less than a number of ports used for transmission of a second signal which is transmitted from the UE to the base station.

6. The method of claim 2, wherein the first signal is transmitted from the UE having up to a predetermined number of layers, and
   wherein a number of layers used for transmission of the first signal is less than a number of layers used for transmission of a second signal which is transmitted from the UE to the base station.

7. A method performed by a base station, the method comprising:
   transmitting, to a user equipment (UE), configuration information for self-interference channel estimation in the base station, the configuration information including bitmap information indicating where at least one symbol for the self-interference channel estimation is positioned and modified;
   identifying downlink data to be transmitted to the UE in a slot including a first signal transmission section for the self-interference channel estimation and a second signal transmission section, based on the configuration information;
   in case that the downlink data includes a first data in the first signal transmission section, transmitting the first data using a first transmission scheme for the first signal transmission section; and
   in case that the downlink data includes a second data in the second signal transmission section, transmitting the second data using a second transmission scheme for the second signal transmission section,
   wherein a number of one or more layers for the first transmission scheme is less than a number of two or more layers for the second transmission scheme, and
   wherein at least one symbol in the first signal transmission section is modified for the self-interference channel estimation in the slot, based on the bitmap information.

8. The method of claim 7, wherein the at least one symbol in
   the second signal transmission section is not modified in a same manner as the modified at least one symbol among symbols in the slot.

9. The method of claim 7, further comprising:
   receiving the first data for the self-interference channel estimation in the base station;
   estimating a self-interference channel based on the first data; and
   performing self-interference cancellation based on the estimated self-interference channel.

10. The method of claim 9, wherein the first data is transmitted in either an antenna port level or a layer level of the base station, and
    wherein the self-interference channel is estimated in either the antenna port level or the layer level of the base station.

11. The method of claim 9, wherein the first data is transmitted from an antenna port level of the base station,
    wherein the self-interference cancellation is performed before a combiner of the base station based on a value of the estimated self-interference channel in the antenna port level of the base station, and
    wherein the estimated self-interference channel is a channel of a signal passing through an analog beamformer of the base station.

12. The method of claim 9, wherein the first data is transmitted from a layer level of the base station, wherein the self-interference cancellation is performed after a digital combiner of the base station based on a value of the estimated self-interference channel in the layer level of the base station, and wherein the estimated self-interference channel is a channel of a signal passing through an analog beamformer of the base station and the digital combiner of the base station.

13. The method of claim 9, wherein the first data is transmitted from the base station having up to a predetermined number of ports, and wherein a number of ports used for transmission of the first data is less than a number of ports used for transmission of the second data.

14. The method of claim 9, wherein the first data is transmitted from the base station having up to a predetermined number of layers.

15. The method of claim 9, further comprising configuring antenna panels used for transmission of the first data, wherein the antenna panels have a structure in which a plurality of antennas are arrayed, wherein a barrier rib structure is included between the antenna panels, and wherein the self-interference cancellation is performed at the barrier rib structure.

16. A base station in a wireless communication system, the base station comprising:

a transceiver; and a processor configured to:

transmit, through the transceiver, to a user equipment (UE), configuration information for self-interference channel estimation in the base station, the configuration information including bitmap information indicating where at least one symbol for the self-interference channel estimation is positioned and modified, identify downlink data to be transmitted to the UE in a slot including a first signal transmission section for the self-interference channel estimation and a second signal transmission section, based on the configuration information, in case that the downlink data includes a first data in the first signal transmission section, transmit, through the transceiver, the first data using a first transmission scheme for the first signal transmission section, and in case that the downlink data includes a second data in the second signal transmission section, transmit, through the transceiver, the second data using a second transmission scheme for the second signal transmission section, wherein a number of one or more layers for the first transmission scheme is less than a number of two or more layers for the second transmission scheme, and wherein at least one symbol in the first signal transmission section is modified for the self-interference channel estimation in the slot, based on the bitmap information.

17. The base station of claim 16, wherein the processor is further configured to:

receive, through the transceiver, the first data for self-interference channel estimation of the base station, estimate a self-interference channel based on the first data, and perform self-interference cancellation based on the estimated self-interference channel.

18. A user equipment (UE) in a wireless communication system, the UE comprising:

a transceiver; and a processor configured to:

receive, through the transceiver, from a base station, configuration information for self-interference channel estimation in the base station, the configuration information including bitmap information indicating where at least one symbol for the self-interference channel estimation is positioned and modified, receive, through the transceiver, from the base station, downlink data in a slot including a first signal transmission section and a second signal transmission section, identify whether the received downlink data includes a first data in the first signal transmission section for the self-interference channel estimation in the base station, based on the configuration information, in case that the received downlink data includes the first data in the first signal transmission section, decode the first data using a first transmission scheme for the first signal transmission section, and in case that the received downlink data includes a second data in the second signal transmission section, decode the second data using a second transmission scheme for the second signal transmission section, wherein a number of one or more layers for the first transmission scheme is less than a number of two or more layers for the second transmission scheme, and wherein at least one symbol in the first signal transmission section is modified for the self-interference channel estimation in the slot, based on the bitmap information.

* * * * *